(12) United States Patent
Adachi et al.

(10) Patent No.: US 7,710,412 B2
(45) Date of Patent: May 4, 2010

(54) LIQUID CRYSTAL DISPLAY DEVICE

(75) Inventors: Shigeo Adachi, Chiba (JP); Katsumi Matsumoto, Mobara (JP); Akira Ogura, Nagara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 978 days.

(21) Appl. No.: 11/477,471

(22) Filed: Jun. 30, 2006

(65) Prior Publication Data

US 2007/0001148 A1 Jan. 4, 2007

(30) Foreign Application Priority Data

Jul. 1, 2005 (JP) ............................. 2005-193306

(51) Int. Cl.
*G09G 5/00* (2006.01)

(52) U.S. Cl. ..................... 345/206; 345/204; 349/149

(58) Field of Classification Search ................ 345/87, 345/90–93, 95, 96, 204, 206, 209–210, 212; 349/129, 147, 149, 158; 257/207, 208, 635

See application file for complete search history.

(56) References Cited

U.S. PATENT DOCUMENTS

| 2001/0046011 | A1* | 11/2001 | Yasukawa | ................... 349/113 |
| 2003/0206444 | A1* | 11/2003 | Matsuda et al. | ........ 365/185.18 |
| 2003/0222838 | A1* | 12/2003 | Iida et al. | ...................... 345/87 |
| 2004/0135621 | A1* | 7/2004 | Sumita et al. | ............... 327/534 |

* cited by examiner

*Primary Examiner*—Amare Mengistu
*Assistant Examiner*—Hong Zhou
(74) *Attorney, Agent, or Firm*—Antonelli, Terry, Stout & Kraus, LLP.

(57) ABSTRACT

The present invention realizes a liquid crystal display device which can be driven with a low voltage while preventing the degradation of liquid crystal by reducing a residual charge of a pixel electrode even when a drive circuit is abnormally stopped. As a field effect transistor which is formed on a pixel, a field effect transistor in a depletion mode which is turned on in a state that an OFF signal is not applied to a gate terminal of the transistor is used. A substrate voltage supply line which supplies a substrate voltage to pixel regions is provided, and the substrate voltage is supplied via a through hole formed in the pixel portion thus controlling an optimum threshold value in response to an input signal. Wiring is made in a peripheral portion of a display region such that video signal lines and the substrate voltage supply line intersect each other.

3 Claims, 30 Drawing Sheets

LIQUID CRYSTAL DISPLAY DEVICE

BACKGROUND OF THE INVENTION

Field of the Invention

The present invention relates to a liquid crystal display device, and more particularly to a technique which is effectively applicable to a reflection-type liquid crystal display device which mounts drive circuits and reflection electrodes on a semiconductor substrate.

Recently, a liquid crystal display device has been popularly used in various applications covering a miniaturized display device and a display terminal of a so-called OA equipment and the like. The liquid crystal display device is basically constituted such that between a pair of insulating substrates at least one of which is made of a transparent substrate (for example, a glass plate or a plastic substrate or the like), a layer made of liquid crystal composition (liquid crystal layer) is sandwiched thus forming a so-called liquid crystal panel (also referred to as a liquid crystal display element or a liquid crystal cell).

In this liquid crystal panel, a voltage is selectively applied to various electrodes for forming pixels so as to change the orientation direction of liquid crystal molecules constituting the liquid crystal composition of given pixel portions whereby images are displayed. There has been known a liquid crystal panel which forms a display part by arranging pixels in a matrix array. The liquid crystal panel in which the pixels are arranged in a matrix array is largely classified into two types consisting of a single matrix type and an active matrix type. The single matrix type forms a pixel at a crossing point of two stripe-shaped electrodes which are respectively formed on a pair of insulating substrates and cross each other. On the other hand, the active matrix type includes pixel electrodes and active elements (for example, thin film transistors) for selecting pixels, wherein by selecting the active element, the pixel is formed by the pixel electrode which is connected to the active element and a reference electrode which faces the pixel electrode in an opposed manner.

The active matrix type liquid crystal display device has been popularly used as a display device of a notebook type personal computer or the like. In general, the active matrix type liquid crystal display device adopts a so-called vertical field type in which an electric field for changing the orientation direction of a liquid crystal layer is applied between electrodes formed on one substrate and electrodes formed on another substrate. Further, a so-called lateral field type (also referred to as IPS (In-Plane Switching) type) liquid crystal display device which arranges the direction of an electric field applied to a liquid crystal layer substantially parallel to a surface of a substrate has been practically used.

On the other hand, as a display device which uses the liquid crystal display device, a liquid crystal projector is practically used. In this liquid crystal projector, an illumination light radiated from a light source is irradiated to a liquid crystal panel and an image of the liquid crystal panel is projected to a screen. While the liquid crystal panel used for the liquid crystal projector is classified into a reflection type and a transmission type, the transmission-type liquid crystal projector which uses the above-mentioned active matrix type liquid crystal display device has been popularly used. On the other hand, when the liquid crystal panel adopts the reflection type, by forming a reflection surface using the pixel electrodes and by providing constitutions such as wiring below the pixel electrodes, it is possible to use the substantially whole region of a display part as an effective reflection surface and hence, the reflection type is advantageous compared to the transmission type in view of miniaturization, enhancement of high definition and enhancement of brightness of the liquid crystal panel. Accordingly, the development for the mass production of the reflection-type liquid crystal projector is in progress.

Further, as the active matrix type liquid crystal display device for a liquid crystal projector, in view of an advantage that the miniaturized high-definition liquid crystal display device can be realized, a so-called drive circuit integral type liquid crystal display device which also forms drive circuits for driving the pixel electrodes on a substrate on which the pixel electrodes are formed has been known.

Further, with respect to the drive circuit integral type liquid crystal display device, a reflection type liquid crystal display device (also referred to as Liquid Crystal On Silicon (LCOS)) which forms pixel electrodes, switching elements for pixels and drive circuits on a semiconductor substrate in place of an insulating substrate has been known.

The liquid crystal display device which uses the LCOS has been proposed in U.S. Pat. No. 6,784,956 and the like. Further, a driving method of the LCOS has been proposed in Japanese Patent Laid-open 2003-344824.

SUMMARY OF THE INVENTION

Currently, the LCOS has been attracting an attention as a display element of a rear projection television receiver set (TV). To use the LCOS for the TV which is a general-purpose product, the LCOS is required to perform a normal operation even when the LCOS is used in an unpredicted manner. For example, the LCOS is required to cope with the sudden breakdown of a power source or the like.

The liquid crystal display device, in view of a fact that liquid crystal is degraded when a DC voltage is applied to the liquid crystal, adopts AC driving during an operation thereof. Further, the liquid crystal display device adopts a technique which prevents the retention of charge in pixel electrodes when the driving of the liquid crystal display device is stopped. That is, the sequence and times for cutting the supply of power source to respective driving circuits is strictly controlled thus reducing charge remaining in the pixel electrodes (hereinafter referred to as residual charge).

However, when the power source breakdown occurs suddenly, it is impossible to execute the sequence to stop the power source and hence, the residual charge is generated and degrades the liquid crystal. Further, it has been difficult to strictly control the power source stop sequence for reducing the residual charge.

The present invention has been made to overcome the above-mentioned drawbacks of the related art and it is an object of the present invention to provide the constitution which can reduce a residual charge in a liquid crystal display device. It is another object of the present invention to provide a technique which can reduce the residual charge without strictly controlling the power source stop sequence.

The above-mentioned object and novel features of the present invention will become apparent from the description of this specification and attached drawings.

To briefly explain the summary of typical inventions among inventions disclosed in this specification, they are as follows.

A field effect transistor in a depletion mode is used as pixel-use switching elements of a liquid crystal display device thus establishing an electrically conductive state between pixel electrodes and signal lines when a power source is cut off.

Further, a substrate voltage supply line is provided to supply a substrate voltage to a pixel portion thus allowing transistors to be sufficiently turned on and off in response to a scanning signal within a range of amplitude of an input video signal during a normal operation.

According to the present invention, even when a drive circuit is abnormally stopped, a residual charge of pixel electrodes is reduced and hence, the degradation of liquid crystal can be prevented thus realizing a liquid crystal display device which can be driven with a low voltage.

BRIEF DESCRIPTION OF THE DRAWINGS

FIG. 19A and FIG. 19B are view showing an inverter circuit used in the pixel potential control circuit of the liquid crystal display device of the embodiment of the present invention, wherein FIG. 19A is a schematic cross-sectional view of the inverter circuit and FIG. 19B is a timing chart showing an operation of the inverter circuit.

FIG. 27A and FIG. 27B are views showing a terminal portion of the liquid crystal display device of the embodiment of the present invention, wherein FIG. 27A is a plan view showing an external connection terminal in an enlarged form and FIG. 27B is a cross-sectional view taken along a line C-C in FIG. 27A.

DETAIL DESCRIPTION OF THE PREFERRED EMBODIMENTS

In a liquid crystal display device of the present invention, as pixel-use switching elements of the liquid crystal display device, a field effect transistor in a depletion mode is used so as to establish an electrically conductive state between pixel electrodes and signal lines when a power source is cut off.

Further, a substrate voltage supply line is provided for supplying a substrate voltage to a pixel portion thus allowing transistor to be turned on or off in response to a scanning signal within a range of amplitude of an input video signal during a normal operation.

Further, in forming the substrate voltage supply line and video signal lines on the same layer, wiring is performed such that the substrate voltage supply line and the video signal lines intersect each other on a peripheral portion of a display region.

Preferred embodiments of a liquid crystal display device according to the present invention are explained in detail hereinafter in conjunction with drawings. In all drawings which are served for explaining the embodiments of the present invention, parts having the same functions are indicated by same symbols and their repeated explanation is omitted.

Figure 1:
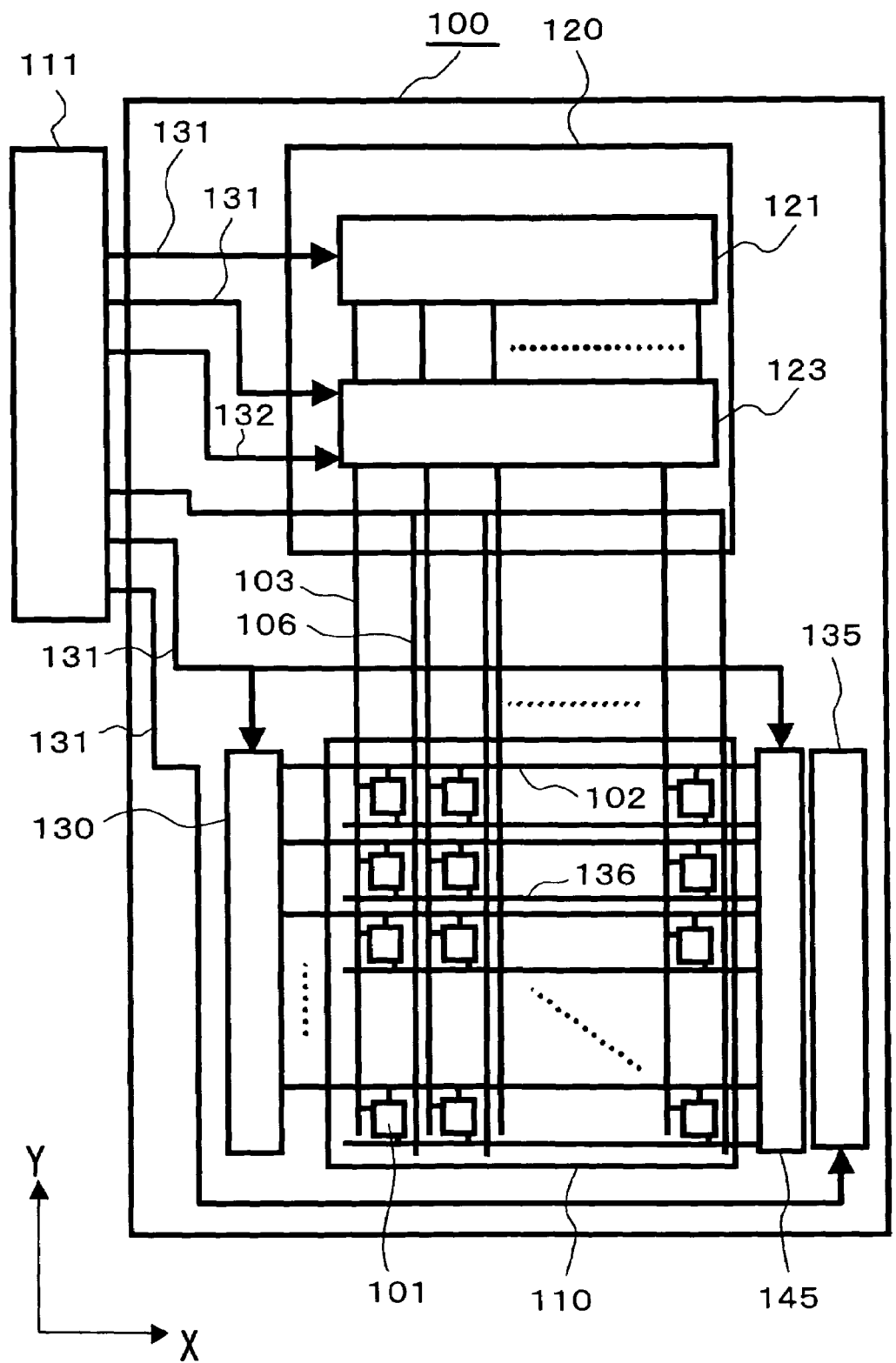
FIG. 1 is a block diagram showing the schematic constitution of a liquid crystal display device of an embodiment of the present invention.

FIG. 1 is a block diagram showing the schematic constitution of the liquid crystal display device of the embodiment of the present invention.

The liquid crystal display device of this embodiment is constituted of a liquid crystal panel (liquid crystal display element) 100 and a display control device 111. The liquid crystal panel 100 includes a display part 110 (also referred to as a display region) on which pixel portions 101 are formed in a matrix array, a horizontal drive circuit (a video signal line drive circuit) 120, a vertical drive circuit (a scanning signal line drive circuit) 130, a pixel potential control circuit 135 and an auxiliary circuit 145. Further, the display part 110, the horizontal drive circuit 120, the vertical drive circuit 130, the pixel potential control circuit 135 and the auxiliary circuit 145 are formed on the same substrate.

A display control device 111 controls the horizontal drive circuit 120, the vertical drive circuit 130 and the pixel potential control circuit 135 in response to control signals such as clock signals, display timing signals, horizontal synchronizing signals or vertical synchronizing signals which are transmitted from the outside. Further, the display control device 111 supplies display signals to be displayed on the liquid crystal panel to the horizontal drive circuit 120. Numeral 131 indicates a control signal line for outputting control signals from the display control device 111 and numeral 132 indicates a display signal line.

A plurality of video signal lines (also referred to as drain signal lines or vertical signal lines) 103 extend in the vertical direction (the y direction in the drawing) from the horizontal drive circuit 120. Further, the plurality of video signal lines 103 are arranged in parallel in the horizontal direction (the X direction). A plurality of scanning signal lines (also referred to as gate signal lines or horizontal signal lines) 102 extend in the horizontal direction (the x direction) from the vertical drive circuit 130. Further, the plurality of scanning signal lines 102 are arranged in parallel in the vertical direction (the Y direction). A plurality of pixel potential control lines 136 extend in the horizontal direction (the X direction) from the pixel potential control circuit 135. Further, the plurality of pixel potential control lines 136 are arranged in parallel in the vertical direction (the Y direction). Further, a plurality of substrate voltage supply lines 106 extend from the horizontal drive circuit 120 in the vertical direction and are arranged in parallel to the video signal lines 103. A substrate voltage is supplied to a semiconductor substrate on which pixel portions 101 are formed via the substrate voltage supply line 106. Here, the detail of the substrate voltage is explained later.

Although the pixel portion 101 is schematically shown as a square, the pixel portion 101 indicates a region which is surrounded by two neighboring scanning signal lines 102 and two neighboring video signal lines 103 and in which pixel electrodes are formed. FIG. 1 readily shows that the pixel portions 101 which have the same constitution are formed in a matrix array and constitute pixels for forming an image to be displayed. In the pixel portion 101, a pixel electrode, a counter electrode, and a liquid crystal layer which is sandwiched between both electrodes are provided (not shown in the drawing), wherein a display is performed by making use of a phenomenon that when a voltage is applied between the pixel electrode and the counter electrode, the orientation direction of liquid crystal molecules or the like is changed and the property of the liquid crystal layer with respect to light is changed correspondingly.

On a side portion of the display part 110 opposite to the vertical drive circuit 130, an auxiliary circuit 145 is mounted. The scanning signal lines 102 pulled out from the vertical drive circuit 130 are also connected to the auxiliary circuit 145.

The horizontal drive circuit 120 is constituted of a horizontal shift register 121 and a voltage selection circuit 123. The control signal line 131 and the display signal line 132 pulled out from the display control device 111 are connected to the horizontal shift register 121 and the voltage selection circuit 123, wherein the control signals and the display signals are transmitted to the horizontal shift register 121 and the voltage selection circuit 123.

Here, as the display signals, both of analogue signals and digital signals are available. Further, although power source/voltage lines of respective circuits are omitted from the drawings, it is assumed that the necessary voltage is applied.

When the vertical synchronizing signal is inputted from the outside and, thereafter, the first display timing signal is inputted, the display control device 111 outputs a start pulse to the vertical drive circuit 130 through a control signal line 131. Then, in response to the horizontal synchronizing signal, the display control device 111 outputs shift clocks to the vertical drive circuit 130 such that the scanning signal lines 102 are sequentially selected every one horizontal scanning time (hereinafter referred to as 1 h). In accordance with the shift clocks, the vertical drive circuit 130 selects the scanning signal lines 102 and outputs the scanning signals to the scanning signal lines 102. That is, the vertical drive circuit 130 outputs the signals for selecting the scanning signal lines 102 for one horizontal scanning time 1 h sequentially from the top in FIG. 1.

Further, when a display timing signal is inputted to the display control device 111, the display control device 111 judges this inputting as starting of display and outputs the display signals to the horizontal drive circuit 120. Although the display signals are sequentially outputted from the display control device 111, the horizontal shift register 121 outputs the timing signals in response to the shift clocks transmitted from the display control device 111. The timing signals indicate timings for fetching the display signals which the voltage selection circuit 123 has to output to the respective video signal lines 102.

When the display signals are analogue signals, the voltage selection circuit 123 fetches fixed voltages out of the analogue signals as the display signals (gray scale voltages) in accordance with the timing signals and outputs the fetched gray scale voltages to the video signal lines 103 as the video signals. When the display signals are digital signals, the voltage selection circuit 123 fetches the display signals in accordance with the timing signal and selects (decodes) the gray scale voltages based on the display signals (the digital data) and outputs the gray scale voltages to the video signal lines 103. The gray scale voltages outputted to the video signal lines 103 are written in the pixel electrodes of the pixel portions 101 in accordance with the timing that the scanning signals are outputted from the vertical drive circuit 130 as the video signals.

As mentioned previously, in the liquid crystal display device, to prevent the degradation of the liquid crystal composition, the AC driving which inverts the polarity of pixel electrode with respect to the counter electrode is performed. Accordingly, as a voltage which is outputted as the video signal, a signal which is inverted with respect to the voltage of the counter electrode at a fixed cycle is supplied. In this specification, a case in which the AC driving is performed by inverting the polarity of the signal written in the pixel portion in response to a pixel potential control signal is explained.

In response to the control signals from the display control device 111, the pixel potential control circuit 135 controls the voltage of video signals written in the pixel electrodes. The gray scale voltages written in the pixel electrodes from the video signal lines 103 have a certain potential difference with respect to the reference voltage of the counter electrodes. The pixel potential control circuit 135 supplies the control signals to the pixel portions 101 so as to change the potential difference between the pixel electrodes and the counter electrodes. The pixel potential control circuit 135 will be explained in detail later.

The auxiliary circuit 145 has output thereof connected to the scanning signal lines 102 and is operated to make the scanning signal lines 102 assume the specific voltage. As described previously, although the scanning signals are outputted to the scanning signal lines 102 from the vertical drive circuit 130, the auxiliary circuit 145 is a circuit which functions such that the auxiliary circuit 145 assists the outputting of signals from the vertical drive circuit 130 and dissipates the difference in scanning signals (rounding of waveforms) which occurs on the scanning signal lines 102 due to the wiring resistance. In case that auxiliary circuit 145 assists the vertical drive circuit 130 when the output from the vertical drive circuit 130 is of a high-voltage, the auxiliary circuit 145 constitutes a pull up circuit, while in case that auxiliary circuit 145 assists the vertical drive circuit 130 when the output from the vertical drive circuit 130 is of a low voltage, the auxiliary circuit 145 constitutes a pull down circuit. The auxiliary circuit 145 will be explained in detail later.

Here, the present invention is effectively applicable to the liquid crystal display device which uses the pixel potential control circuit 135 for lowering of voltage. The present invention is also effectively applicable to the liquid crystal display device which uses the auxiliary circuit 145 for reducing the rounding of waveforms. However, the embodiment of the present invention is not limited to the liquid crystal display device which includes the pixel potential control circuit 135 and the auxiliary circuit 145.

Next, a residual charge is explained. As a method for preventing the residual charge, when the driving of the liquid crystal display device is stopped, the scanning signal which allows the pixel electrode and the video signal line 103 to be conductive with each other is supplied to the scanning signal line 102 thus bringing the pixel electrode and the video signal line 103 into a conductive state thus moving the charge of the pixel electrode to the video signal line 103 and, thereafter, operations of the respective drive circuits are stopped thus reducing the residual charge of the pixel electrode. Here, as an ideal case, if it is possible to connect a ground potential to all of the video signal line 103, the pixel electrode and the counter electrode, the degradation of the liquid crystal attributed to the residual charge can be reduced. However, in the general-purport product such as a TV, the possibility that a situation occurs in which drive circuits are stopped without a chance of supplying the scanning signal to the scanning signal line 102 is increased. Accordingly, a new countermeasure different from the control method when the light source is turned off is requested.

Figure 2:
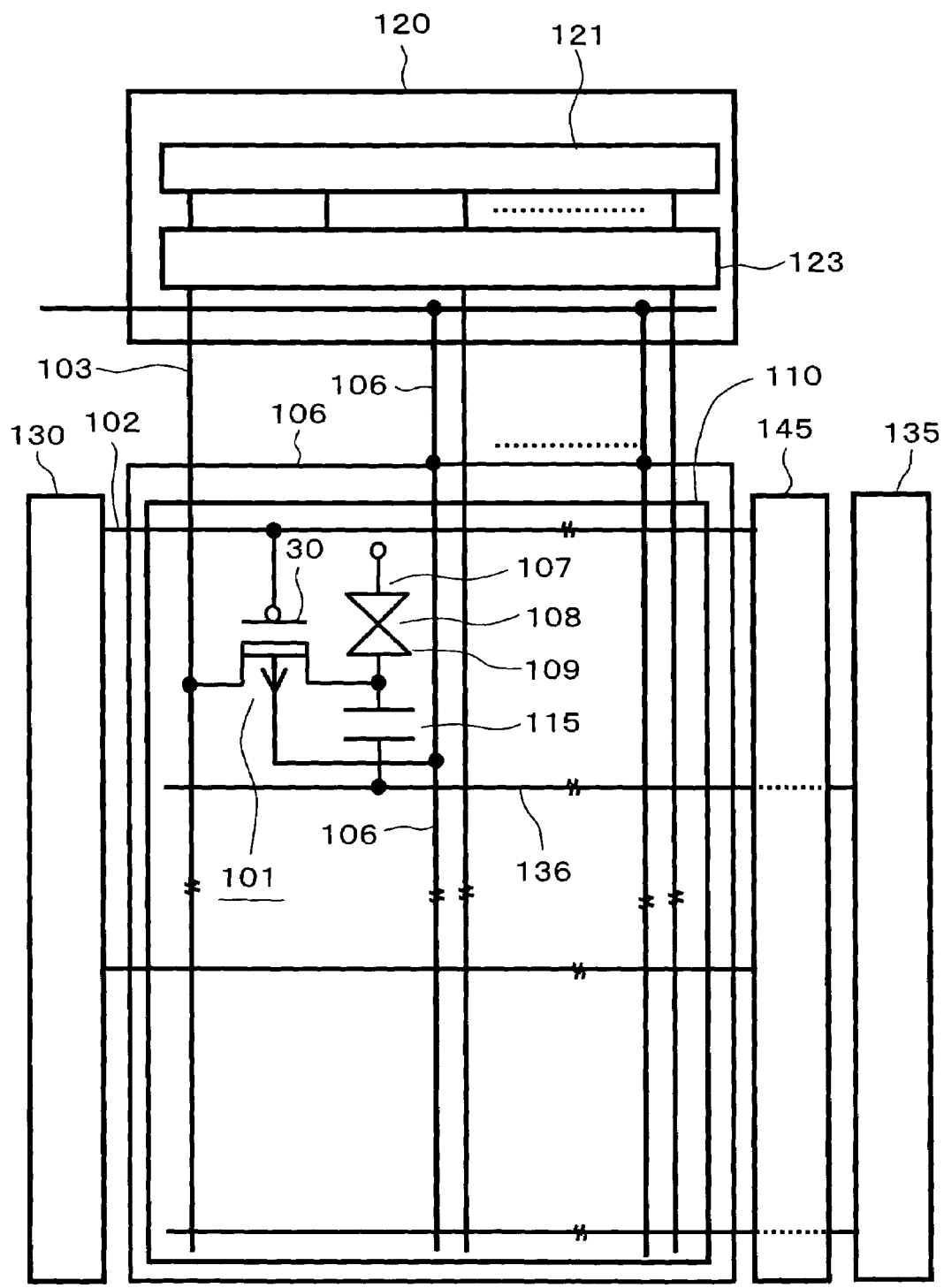
FIG. 2 is a block diagram showing one example of a liquid crystal panel of the embodiment of the present invention.

Subsequently, the pixel portion 101 of the liquid crystal panel 100 which constitutes one embodiment of the present invention is explained in conjunction with FIG. 2. FIG. 2 is a circuit diagram showing an equivalent circuit of the pixel portion 101. Each pixel portion 101 is provided to a region where two neighboring scanning signal lines 102 and two neighboring video signal lines 103 cross each other (a region surrounded by four signal lines) in the display part 110 and these pixel portions 101 are arranged in a matrix array in the display part 110. Further, the substrate voltage supply lines 106 are arranged in parallel to the video signal lines 103.

However, to simplify the drawing, only one pixel portion 101 is shown in FIG. 2. Each pixel portion 101 includes an active element 30 (also referred to as a switching element of the pixel portion) and a pixel electrode 109. Further, a pixel capacitance 115 is connected to the pixel electrode 109. The pixel capacitance 115 has one electrode thereof connected to the pixel electrode 109 and another electrode connected to a pixel potential control line 136. On the other hand, the pixel potential control line 136 is connected to the pixel potential control circuit 135.

In this embodiment, the active element 30 is an element which assumes a conductive state (ON) when an OFF signal is not applied to a control terminal. For example, as the active element 30, it may be possible to use, for example, a field effect transistor (hereinafter referred to as a MIS transistor or MIS) in a depletion mode which implants impurities in a channel region thereof. In FIG. 2, although the active element 30 may be formed of a p-type transistor, the active element 30 may be formed of an n-type transistor.

As mentioned previously, the scanning signals are outputted to the scanning signal lines 102 from the vertical drive circuit 130. Turning on and off of the active element 30 is controlled in response to the scanning signals. The gray scale voltage is supplied to the video signal lines 103 as video signals. When the active element 30 is turned on, the gray scale voltage is supplied to the pixel electrode 109 from the video signal line 103. The counter electrode (common electrode) 107 is arranged to face the pixel electrode 109 in an opposed manner and a liquid crystal layer (not shown in the drawing) is formed between the pixel electrode 109 and the counter electrode 107, and an electric field is applied to the liquid crystal layer.

Here, the circuit diagram shown in FIG. 2 is illustrated such that the liquid crystal capacitance 108 is equivalently connected between the pixel electrode 109 and the counter electrode 107. By applying a voltage between the pixel electrode 109 and the counter electrode 107, the orientation direction or the like of the liquid crystal molecules is changed and, correspondingly, the property of the liquid crystal layer with respect to light is changed whereby the transmissivity (reflectivity) of light of each pixel can be changed in combination with a polarizing element. To give the gray scales to the images, the voltages (gray scale voltages) are applied to the pixel electrodes corresponding to the transmissivity of light.

As mentioned previously, as the active element 30, the MIS transistor in a depletion mode is used. Accordingly, when an OFF signal is not supplied to a gate terminal, the active element 30 assumes a conductive state. Accordingly, when the drive circuit is stopped and hence, the supply of a signal is stopped, an electrically conductive state is established between the pixel electrode 109 and the video signal line 103. Accordingly, when the power source of the liquid crystal display device is turned off, a charge of the pixel electrode 109 is moved to the video signal line 103 and hence, a quantity of the charge remaining in the pixel electrode 109 can be reduced.

However, when a threshold value of the MIS transistor is changed while using the active element 30 as the MIS transistor in a depletion mode, depending on an amplitude of an input video signal, there arises a drawback that it is difficult to sufficiently bring the active element 30 into an ON state or OFF state in response to a scanning signal.

Figure 3A:
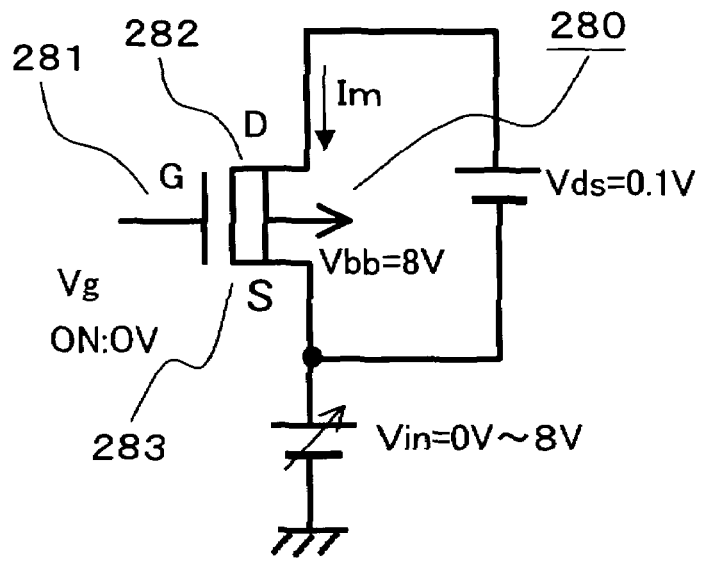
FIG. 3 is a view showing the relationship between an input signal and an ON resistance value.
Figure 3B:
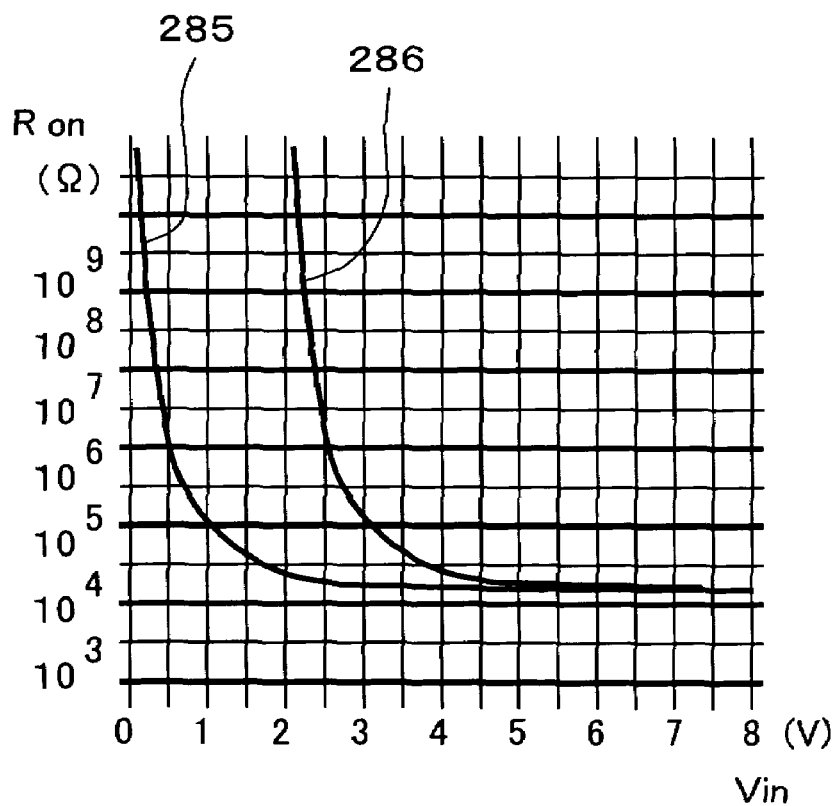

FIG. 3A and FIG. 3B show the relationship between an ON resistance value of a p-type MIS transistor and an input signal voltage when the threshold value is changed, wherein FIG. 3A shows a circuit diagram used in measurement and FIG. 3B indicates a result of the measurement. 0V is applied as an ON signal to a gate terminal 281 of the MIS transistor 280. A voltage Vds is applied to a drain 282 such that the voltage Vds is higher than a voltage applied to a source 283 by 0.1V. An input signal Vin is changed within a range from 0V to 8V. Vbb=8V is applied as a substrate voltage.

The measurement is conducted such that a current Im which flows in the drain 282 when the input signal voltage is changed is measured. An ON resistance Ron is obtained by calculation based on the source-drain voltage Vds and the current Im.

In FIG. 3B, a waveform 285 shows the ON resistance Ron of the MIS transistor due to the implantation of impurities when the threshold value is set lower than the threshold value of a waveform 286. While the ON resistance is equal to or less than $1 \times 10^5 \Omega$ when the input signal is 2V in the waveform 285, the ON resistance is $1 \times 10^6 \Omega$ or more when the input signal is 2V in the waveform 286 and hence, the MIS transistor of the waveform 285 broadens an operational range to a low voltage side compared to the MIS transistor of the waveform 286.

Here, the MIS transistors shown in FIG. 3 and FIG. 4 are formed of the transistor in a depletion mode and hence, when a power source which is supplied to the liquid crystal display device is cut off, the substrate potential becomes substantially a ground potential and an OFF voltage is not also supplied to a control terminal whereby the ON resistance value becomes sufficiently low (the above-mentioned $1 \times 10^5 \Omega$ or less) and an electrically conductive state is established between the pixel electrode and the video signal line.

Figure 4A:
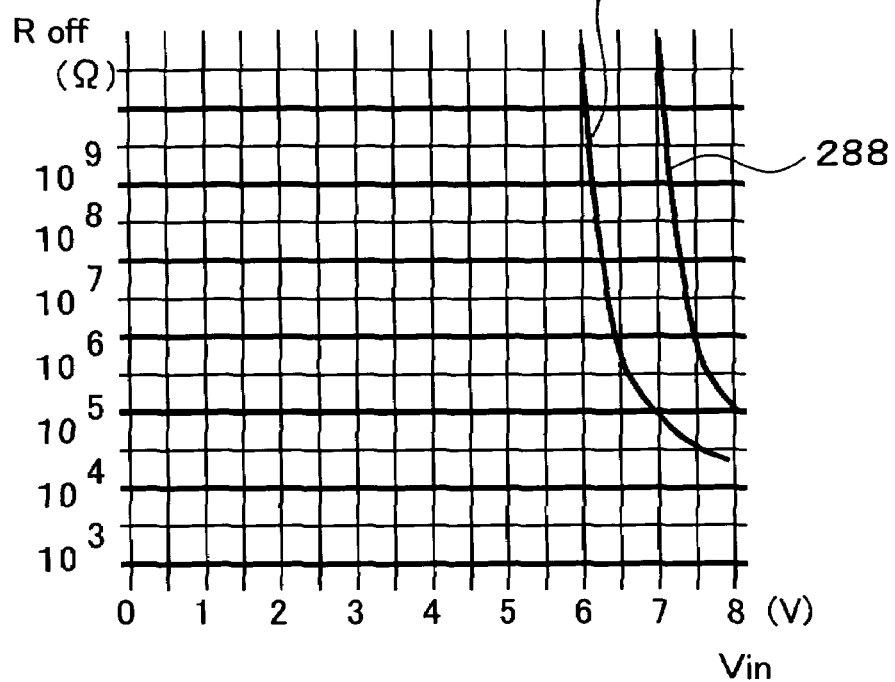
FIG. 4 is a view showing the relationship between an input signal and an OFF resistance value and the relationship between the input signal and an ON resistance value.

Next, FIG. 4A shows a result of measurement of the OFF resistance. In the MIS transistor shown in FIG. 3 which has the threshold value thereof lowered due to the implantation of impurities, a waveform 287 shows the OFF resistance when the substrate voltage is set to 7V and 7V is applied to the gate terminal as the OFF signal. The waveform 287 exhibits the OFF resistance of $1 \times 10^6 \Omega$ or less when the input signal is 6.5V and hence, it is not appropriate to set a high voltage side within a range of the input signal to 6.5V.

To the contrary, a waveform 288 shows, in the MIS transistor which has the threshold value thereof lowered by the implantation of impurities, the OFF resistance when the substrate voltage is set to 8V and 8V is applied to the gate terminal as the OFF signal. The OFF resistance is $1 \times 10^6 \Omega$ or more when the input signal is 6.5V and hence, the operational range on the high voltage side is broadened by changing the substrate voltage from 7V to 8V.

Figure 4B:
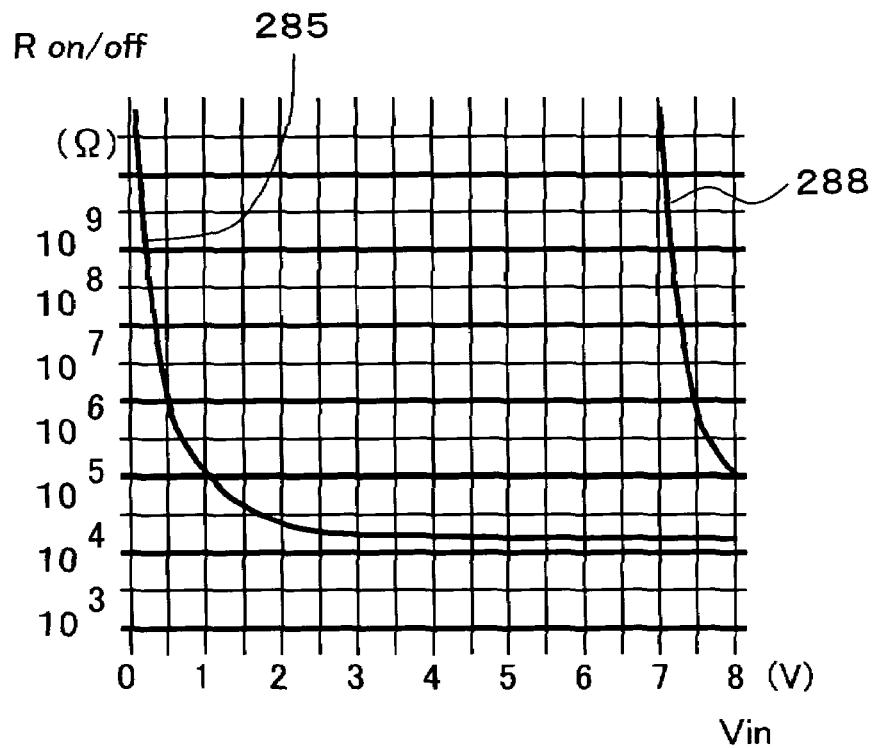

FIG. 4B shows the ON/OFF resistance value in response to the input signal when the threshold value is controlled by the implantation of impurities and the optimum substrate voltage is adjusted. In FIG. 4B, the substrate voltage is set to 8V and the ON signal of 0V and the OFF signal of 8V are applied to the gate electrode.

From FIG. 4B, when the range of the input signal is set to a range from 2V to 6.5V, the ON resistance value is set to $1 \times 10^5 \Omega$ or less and the OFF resistance value is set to $1 \times 10^6 \Omega$ or more within the range of the input signal and hence, the range from 2V to 6.5V becomes sufficiently effective input signal range.

Further, when amplitude of the input signal within the input signal range is set to 4.5V, to afford a margin of approximately 0.5V which is approximately 10% of the amplitude, the input signal is requested to have the ON resistance of $1 \times 10^5 \Omega$ or less when the input signal is 1.5V and the OFF resistance of $1 \times 10^6 \Omega$ or more when the input signal is 7.0V. It is more desirable to afford a margin of approximately 1.0V which is approximately 20% of the amplitude to the input signal such that the input signal possesses the ON resistance of $1 \times 10^5 \Omega$ or less even when the input signal is 1.0V and the OFF resistance of $1 \times 10^6 \Omega$ or more even when the input signal is 7.5V.

Accordingly, to allow the input signal to possess the sufficient ON resistance value and the OFF resistance value within the input signal amplitude range having the margin, it is necessary to control the implantation quantity of the impurities and to supply the optimum substrate voltage. In this embodiment, to supply the substrate voltage also to the active elements provided to the pixel portions, the substrate voltage supply lines 106 are provided in the inside of the display region 110.

As shown in FIG. 2, the substrate voltage supply lines 106 are arranged in parallel to the video signal lines 103 also in the inside of the display region 110. In the inside of the display region 110, the substrate voltage supply lines 106 are connected so as to supply the substrate voltage for respective pixel portions. Further, to supply the substrate voltage also to the vertical drive circuit 130 and the pixel potential control circuit 135 which are formed on a periphery of the display part 110, the substrate voltage supply lines 106 are also arranged in a periphery of the display region 110. When it is unnecessary to apply the substrate voltage to the pixel portions with an accurate voltage, it is possible to supply the substrate voltage to the pixel portions using the substrate voltage supply lines 106 in the periphery of the display region.

Figure 5:
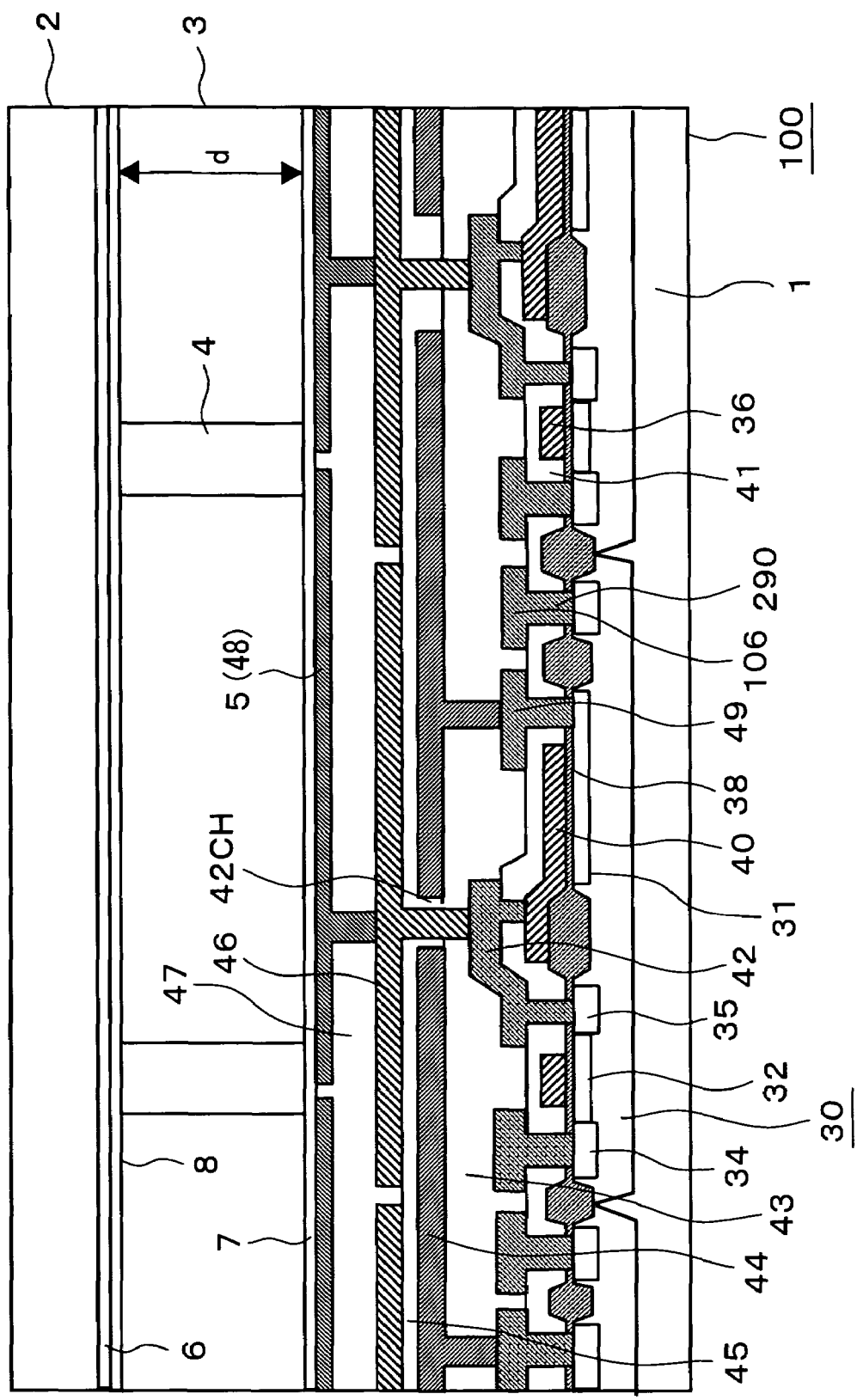
FIG. 5 is schematic cross sectional view showing a pixel portion of the liquid crystal display device of the embodiment of the present invention.

Next, the pixel portion of the reflection-type liquid crystal display device is explained in conjunction with FIG. 5. FIG. 5 is a schematic cross-sectional view of a reflection-type liquid crystal display device which constitutes one embodiment of the present invention. In FIG. 5, numeral 100 indicates a liquid crystal panel, numeral 1 indicates a drive circuit substrate which constitutes a first substrate, numeral 2 indicates a transparent substrate which constitutes a second substrate, numeral 3 indicates liquid crystal composition, and numeral 4 indicates spacers. The spacers 4 are formed so as to form a cell gap d which is a fixed gap between the drive circuit substrate 1 and the transparent substrate 2. The liquid crystal composition 3 is sandwiched in the cell gap d. Numeral 5 indicates reflection electrodes (pixel electrodes) which are formed on the drive circuit substrate 1. Numeral 6 indicates counter electrodes and voltages are applied to the liquid crystal composition 3 filled between the counter electrodes 6 and the reflection electrodes 5. Numerals 7, 8 are orientation films which orient the liquid crystal molecules in a fixed direction. Numeral 30 indicates MIS transistors which supply gray scale voltages to the reflection electrodes 5.

Numeral 32 indicates a channel region of the MIS transistor 30 and a p-type MIS transistor is described in this specification. Further, since the MIS transistor 30 is in a depletion mode, a p-type impurity region is formed on a surface of the n-well by the implantation of the impurities. Numeral 290 indicates a pixel-portion through hole and supplies the substrate voltage to the n-well of the pixel portion from the substrate voltage supply line 106 which extends to the pixel portion.

Numeral 34 indicates a source region of the MIS transistor 30, numeral 35 indicates a drain region of the MIS transistor 30 and numeral 36 indicates a gate electrode. Numeral 38 indicates an insulation film, numeral 31 indicates a first electrode which forms pixel capacitance, and numeral 40 indicates a second electrode which forms the pixel capacitance. The first electrode 31 forms an impurity diffusion region and the first electrode 31 and the second electrode 40 form capacitance by way of the insulation film 38.

In FIG. 5, the first electrode 31 and the second electrode 40 are indicated as typical electrodes which form the pixel capacitance. However, it is also possible to form the pixel capacitance provided that a conductive layer which is electrically connected to the pixel electrode and a conductive layer which is electrically connected to the pixel potential control signal line face each other while sandwiching a dielectric layer therebetween in an opposed manner.

Numeral 41 indicates a first interlayer film and numeral 42 indicates the first conductive film. The first conductive film 42 electrically connects the drain region 35 and the second electrode 40. Numeral 43 indicates a second interlayer film, numeral 44 indicates a first light shielding film, numeral 45 indicates a third interlayer film and numeral 46 indicates a second light shielding film. A through hole (interlayer connecting portion) 42CH is formed in the second interlayer film 43 and the third interlayer film 45, while the first conductive film 42 and the second light shielding film 46 are electrically connected. Numeral 47 indicates a fourth interlayer film and numeral 48 indicates a second conductive film which forms a reflection electrode 5.

The video signal line 103 is electrically connected to the source region 34 so as to supply the video signal to the MIS transistor 30. The video signal is transmitted to the reflection electrode 5 from the drain region 35 of the MIS transistor 30 through the first conductive film 42, the through hole 42CH and the second light shielding film 46.

The video signal line 103 which supplies the video signal to the MIS transistor 30 is formed on the same layer as the first conductive film 42. Further, the substrate voltage supply lines 106 are formed on the same layer as the first conductive film 42 in parallel to the video signal lines 103 and supply the substrate voltage to the n-type well regions.

Further, the first light shielding film 44 is electrically connected with the first electrode 31 which forms a capacitor and a pixel potential control signal is supplied to the first electrode 31 via the first light shielding film 44.

The liquid crystal display device of this embodiment is of a reflection type and a large quantity of light is radiated to the liquid crystal panel 100. A light shielding film prevents light from being incident on the semiconductor layer of the drive circuit substrate. In the reflection-type liquid crystal display device, the light radiated to the liquid crystal panel 100 is incident from the transparent substrate 2 side (upper side in FIG. 5), permeates the liquid crystal composition 3 and is reflected on the reflection electrodes 5. Then, again, the light permeates the liquid crystal composition 3 and the transparent substrate 2 and is irradiated from the liquid crystal panel 100. However, a portion of the light radiated to the liquid crystal panel 100 leaks into the drive circuit substrate side through gaps defined between the reflection electrodes 5. The first light shielding film 44 and the second light shielding film 46 are provided such that the light is not incident on the active element 30. In this embodiment, the light shielding films are formed of a conductive layer. Further, by electrically connecting the second light shielding film 46 with the reflection electrode 5 and by supplying the pixel potential control signal to the first light shielding film 44, the light shielding films also function as a portion of the pixel capacitance.

Here, between the second light shielding film 46 to which the gray scale voltage is supplied when the pixel potential control signal is supplied to the first light shielding film 44 and a first conductive layer 42 which forms the video signal line 103 or a conductive layer which forms the scanning signal line 102 (a conductive layer formed on the same layer as the gate electrode 36), it is possible to form the first light shielding film 44 as an electrically shielding layer. Accordingly, it is possible to reduce a parasitic capacitance component between the first conductive layer 42, the gate electrode 36 or the like and the second light shielding film 46 or the reflection electrode 5. Although it is necessary to ensure the sufficiently large pixel capacitance CC for the liquid crystal capacitance CL, by providing the first light shielding film 44 as the electric shielding layer, the parasitic capacitance which is connected in parallel to the liquid crystal capacitance CL is also decreased thus realizing an effective operation. Further, it is also possible to reduce the jumping of noises from the signal lines.

When the liquid crystal display element is formed of a reflection type and the reflection electrodes 5 are formed on a surface of the drive circuit substrate 1 at the liquid crystal composition 3 side, it is possible to use an opaque silicon substrate or the like as the drive circuit substrate 1. Further, it is possible to mount the active elements 30 and the wiring below the reflection electrodes 5 and hence, the reflection electrodes 5 which constitute the pixels can be widened thus giving rise to an advantageous effect that a so-called high numerical aperture can be realized. Further, it is also possible to obtain an advantageous effect that heat generated due to the light radiated to the liquid crystal panel 100 can be dissipated from a back surface of the drive circuit substrate 1 (also referred to as the silicon substrate).

In this embodiment, by using the MIS transistor in a depletion mode as the active element 30, when the drive circuit is stopped, the active element 30 assumes a conductive state thus reducing the residual charge of the pixel electrode. In such an operation, to acquire the sufficient ON resistance value and OFF resistance value within the input signal amplitude by accurately controlling the threshold value voltage of the active element 30, a through hole 290 which supplies the substrate voltage also to the pixel portion is provided. Accordingly, to supply the substrate voltage to the pixel portion, it is necessary to extend the substrate voltage supply line 106 also in the display region 110.

Figure 6A:
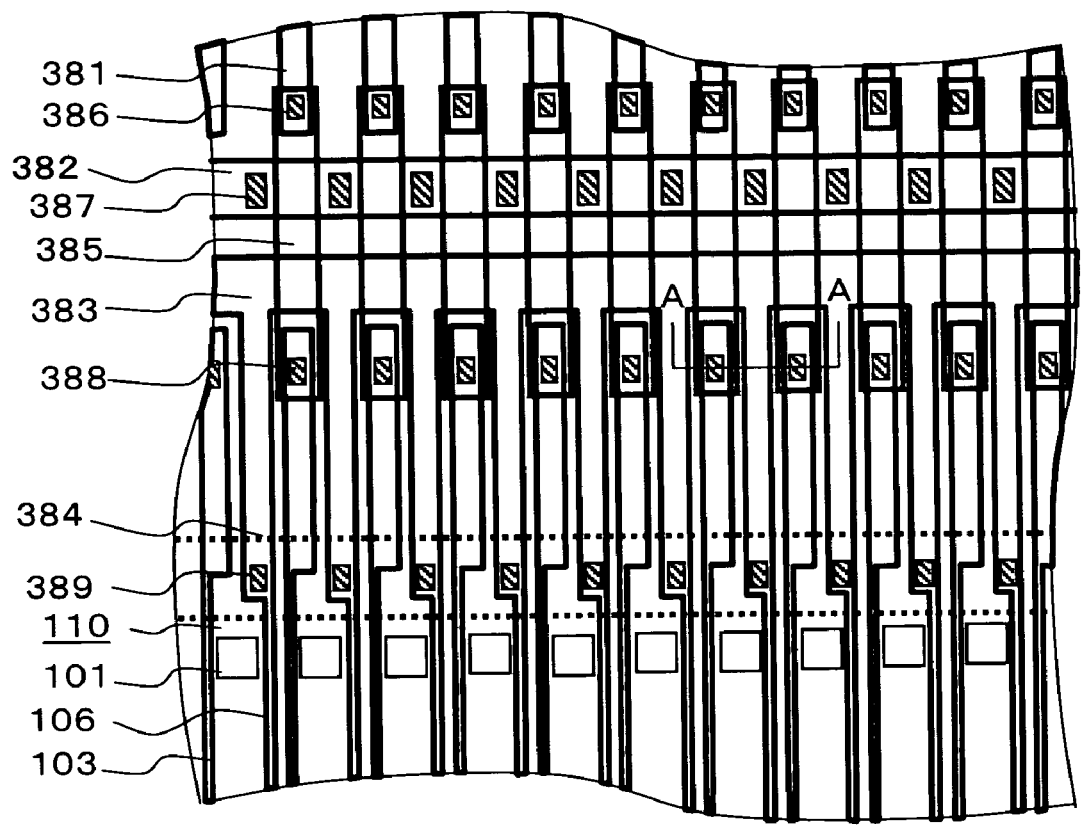
FIG. 6 is a schematic plan view showing a substrate potential supply line formed on a peripheral portion of a display circuit.
Figure 6B:
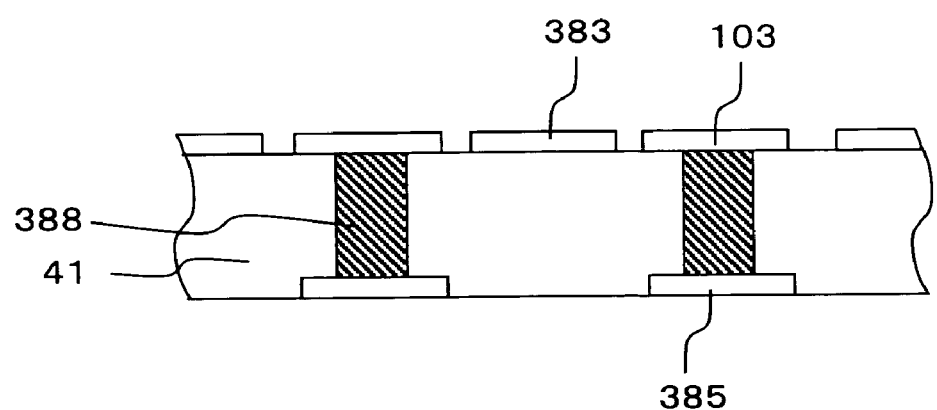

FIG. 6A and FIG. 6B show the constitution which extends the substrate voltage supply lines 106 to the inside of the display region from the periphery of the display region 110, wherein FIG. 6A is a schematic plan view showing the periphery of the display region and FIG. 6B is a schematic cross-sectional view taken along a line A-A in FIG. 6A. Although FIG. 6A shows the periphery of the display region, there is no boundary line around the display region 110. The pixel portions 101 are formed on the display region 110 and the horizontal drive circuit 120 is formed on the peripheral portion.

The horizontal drive circuit 120 includes a first substrate voltage supply line 382 which constitutes the substrate voltage supply lines for horizontal drive circuit, through holes 387 of the horizontal drive circuit portion which supplies a voltage to the substrate from the first substrate voltage supply line 382 and video signal output lines 381. Video signals are supplied to the video signal output lines 381.

The pixel portions 101, the video signal lines 103 and the substrate voltage supply lines 106 are formed on the display region 110, wherein the video signal lines 103 and the substrate voltage supply lines 106 are arranged in parallel and are constituted of conductive films on the same layer.

Between the display region 110 and the horizontal drive circuit 120, a second substrate voltage supply line 383 is formed of a conductive film which is formed on the same layer as the video signal lines 103, wherein the second substrate voltage supply line 383 supplies the substrate voltage to impurity regions of the semiconductor substrate by way of peripheral-portion through holes 389 formed on the peripheral portion of the display region 110.

Further, the substrate voltage supply lines 106 for pixel portions extend toward the display region 110 from the second substrate voltage supply line 383. The substrate voltage supply lines 106 for pixel portion are formed in parallel to the video signal lines 103 and supply the substrate voltage to the pixel portions 101. Since the substrate voltage supply lines 106 and the video signal lines 103 are arranged in parallel to each other in the inside of the display region 110, these signal lines do not intersect each other whereby these lines can be formed of the conductive films on the same layer.

However, since the second substrate voltage supply line 383 for the peripheral portion is arranged along the periphery of the display region 110 such that the second substrate voltage supply line 383 intersects the video signal lines 103 and hence, there arises a drawback that these lines 383, 103 cause short-circuiting when these lines 383, 103 are formed of the conductive films on the same layer. Accordingly, in this embodiment, between the video signal output terminals 381 and the video signal lines 103, a connection line 385 is formed of a conductive film different from the conductive film of the video signal lines 103.

The video signal output terminals 381 and the connection line 385 are connected with each other via output through holes 386, intersect the second substrate voltage supply line 383 on the layer different from the video signal lines 103, and the connection lines 385 and the video signal lines 103 are electrically connected with each other via video-signal-line through holes 388.

As shown in FIG. 6B, when the connection line 385 is arranged below the video signal lines 103, it is possible to form the connection line 385 on the same layer as the gate electrodes 36 shown in FIG. 5. The video-signal-line through holes 388 are provided by forming opening in the first interlayer insulation film 41.

Next, the low-voltage AC driving is explained. As a driving method of the liquid crystal display device, as mentioned previously, the AC driving is performed to prevent the DC current from being applied to the liquid crystal layer. To perform the AC driving, assume the potential of the counter electrode 107 as the reference potential, the voltage which takes the positive polarity and the negative polarity with respect to the reference potential is outputted as gray scale voltages from the voltage selection circuit 123. However, when the voltage selection circuit 123 adopts a circuit of high dielectric strength which can withstand the potential difference between the positive polarity and the negative polarity, there arises a problem that the size of the circuit including the active elements 30 is increased or a problem that the operational speed becomes slow.

Here, the inventors have studied a case in which the AC driving is performed while using signals of the same polarity with respect to the reference potential as the video signals (gray scale voltages) which are supplied to the pixel electrode 109 from the voltage selection circuit 123. For example, as the gray scale voltage which is outputted from the voltage selection circuit 123, the voltage having positive polarity with respect to the reference potential is used. After writing the voltages having the positive polarity with respect to the reference potential to the pixel electrode, by lowering the voltage of the pixel potential control signal which is applied to the electrode of the pixel capacitance 115 from the pixel potential control circuit 135, the voltage of the pixel electrode 109 can be lowered whereby it is possible to generate the voltage having negative polarity with respect to the reference potential. With the use of this driving method, the difference between the maximum value and the minimum value which the voltage selection circuit 123 outputs can be made small and hence, it is possible to adopt a circuit having low dielectric strength as the voltage selection circuit 123. Although a case in which the voltage of positive polarity is written in the pixel electrode 109 and the voltage of negative polarity is generated by the pixel potential control circuit 135 has been explained as an example, in case that the voltage of positive polarity is generated by writing the voltage of negative polarity, the AC driving can be performed by elevating the voltage of the pixel potential control signal.

Figure 7A:
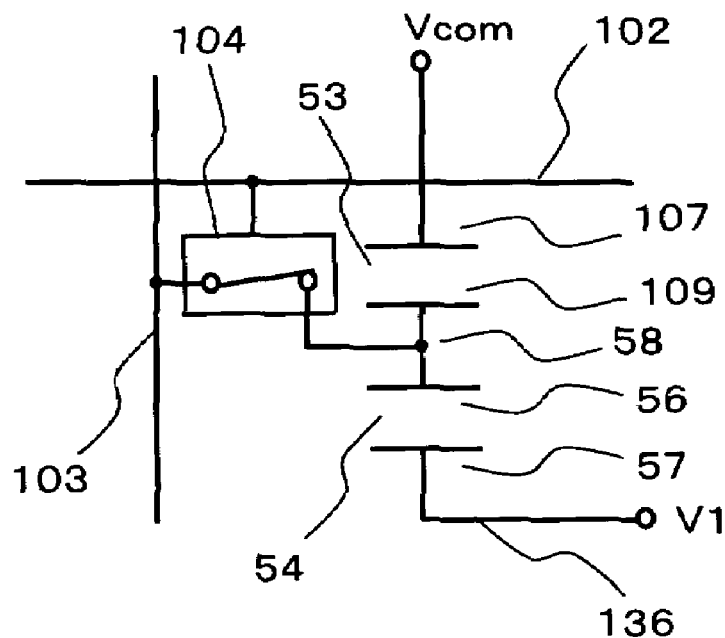
FIG. 7 is a schematic circuit diagram for explaining a method for controlling a pixel potential.
Figure 7B:
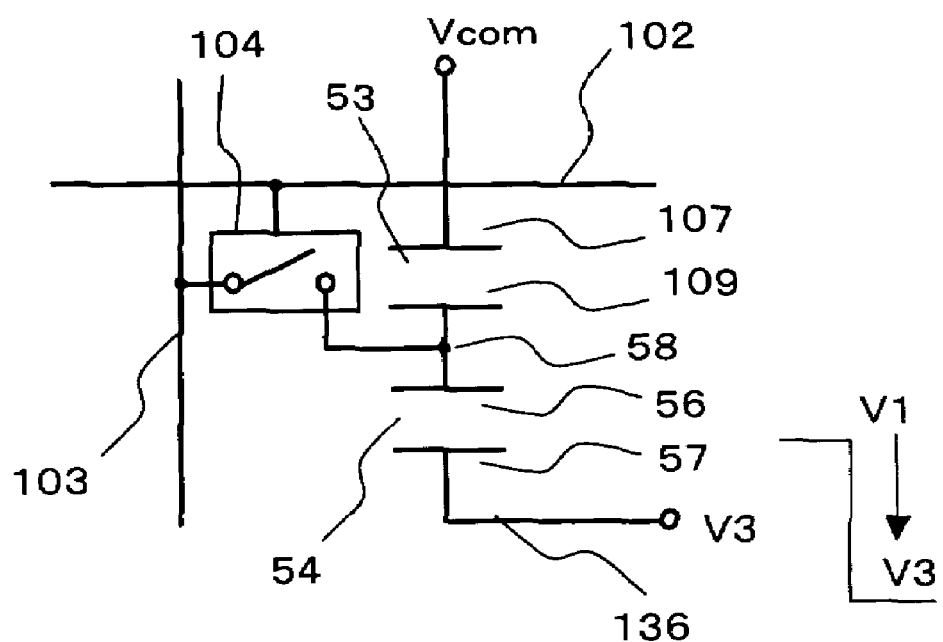

Then, the method for changing the voltage of the above-mentioned pixel electrode 109 is explained in conjunction with FIG. 7A and FIG. 7B. FIG. 7A shows an ON state of the switch 104 and FIG. 7B shows an OFF state of the switch 104. For the explanation purpose, the liquid crystal capacitance 108 is expressed as the first capacitance 53, the pixel capacitance 115 is expressed as a second capacitance 54, and the active element 30 is expressed as the switch 104. An electrode connected to the pixel electrode 109 of the pixel capacitance 115 is formed as an electrode 56 and an electrode connected to the pixel potential control circuit 136 of the pixel capacitance 115 is formed as an electrode 57. Further, a point at which the pixel electrode 109 and the electrode 56 connect each other is indicated as a node 58. Here, for the explanation purpose, other parasitic capacitances can be ignored, wherein the capacitance of the first capacitor 53 is expressed as CL and the capacitance of the second capacitor 54 is expressed as CC.

First of all, as shown in FIG. 7A, the voltage V1 is applied to the electrode 57 of the second capacitor 54 from the outside. Subsequently, when the switch 104 is turned on in response to the scanning signals, the voltages are supplied to the pixel electrodes 109 and the electrode 56 from the video signal line 103. Here, the voltage applied to the node 58 is set to V2.

Subsequently, as shown in FIG. 7B, at a point of time that the switch 104 is turned off, the voltage (pixel potential control signal) which is supplied to the electrode 57 is dropped from V1 to V3. Here, a total quantity of charge charged to the first capacitor 53 and the second capacitor 54 is not changed and hence, the voltage of the node 58 is changed and the voltage of node 58 assumes a value expressed by V2−{CC/(CL+CC)}×(V1−V3).

Here, when the capacitance CL of the first capacitor 53 is sufficiently smaller than the capacitance CC of the second capacitor 54 (CL<<CC), the relationship CC/(CL+CC)=1 is established and the voltage of the node 58 assumes V2−V1+V3. Here, assume V2=0 and V3=0, it is possible to set the voltage of the node 58 to −V1.

According to the above-mentioned method, by allowing the voltage supplied to the pixel electrode 109 from the video signal line 103 to assume the positive polarity with respect to the reference potential of the counter electrode 107, the signal of negative polarity can be produced by controlling the voltage (pixel potential control signal) applied to the electrode 57. By producing the signal of negative polarity using such a method, it is unnecessary to supply the signal of negative polarity from the voltage selection circuit 123 whereby it is possible to form the peripheral circuits using elements having low dielectric strength.

Subsequently, the operational timing of the pixel potential control circuit 135 shown in FIG. 2 is explained in conjunction with FIG. 8. In the drawing, Φ1 indicates the gray scale voltage supplied to the video signal line 103. Φ2 indicates the scanning signal supplied to the scanning signal line 102. Φ3 indicates the pixel potential control signal (voltage step-down signal) supplied to the pixel potential control signal line 136. Φ4 indicates the potential of the pixel electrode 109. The pixel potential control signal Φ3 is a signal which oscillates between the voltage V3 and the voltage V1 shown in FIG. 7.

Figure 8:
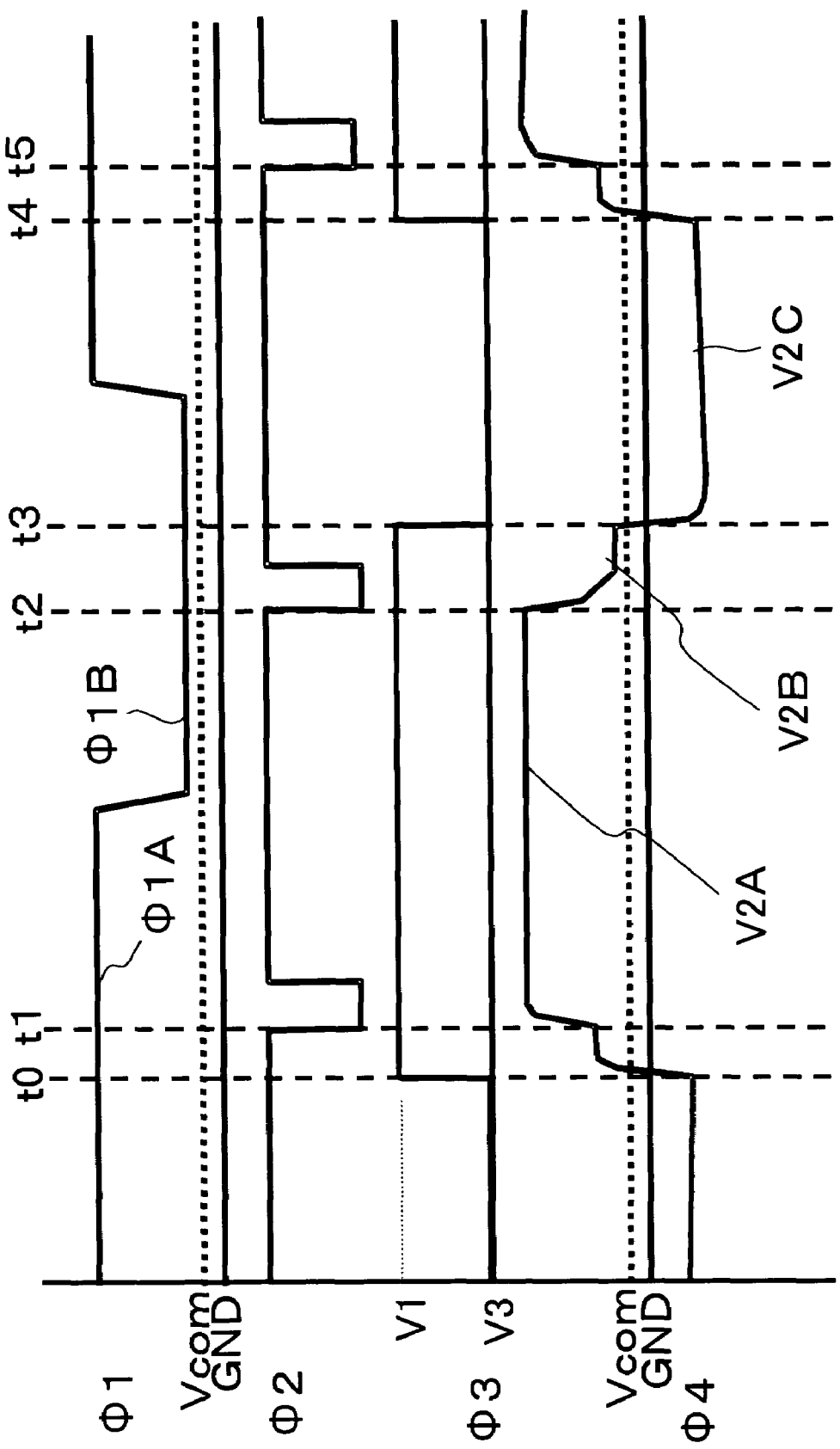
FIG. 8 is a timing chart showing a driving method of the liquid crystal panel shown in FIG. 2.

To explain the operational timing of the circuit in conjunction with FIG. 8, Φ1 is indicated as an input signal Φ1A for positive polarity and an input signal Φ1B for negative polarity. Here, "for negative polarity" means that the voltage applied to the pixel electrode is changed in response to the pixel potential control signal and assumes the negative polarity with respect to the reference potential Vcom. In this embodiment, the explanation is made with respect to a case in which as the input signal Φ1A for positive polarity and the input signal Φ1B for negative polarity which constitute the video signal Φ1, the voltages which assume the potential of positive polarity with respect to the reference potential Vcom which is applied to the counter electrode 107 are supplied.

FIG. 8 shows a case in which during a period from a point of time t0 to a point of time t2, the gray scale voltage Φ1 assumes the input signal P1A for positive polarity. First of all, at the point of time t0, the voltage V1 is outputted as the pixel control signal Φ3. Then, when the scanning signal Φ2 is selected at a point of time t1, and the scanning signal Φ2 assumes a low level, the p-type transistor 30 shown in FIG. 2 assumes the ON state and hence, the input signal Φ1A for positive polarity which is supplied to the video signal line 103 is written in the pixel electrode 109. The signal written in the pixel electrode 109 is indicated by Φ4 in FIG. 8. Further, in FIG. 8, the voltage written in the pixel electrode 109 at the point of time t1 is indicated by V2A. Subsequently, when the scanning signal Φ2 assumes the non-selected state and assumes a high level, the transistor 30 assumes the OFF state and the pixel electrode 109 assumes a state in which the pixel electrode 109 is separated from the video signal line 103 through which the voltage is supplied. The liquid crystal display device displays the gray scales in accordance with the voltage V2A written in the pixel electrode 109.

Then, a case in which the gray scale voltage Φ1 assumes the input signal Φ1B for negative polarity during a period from a point of time t2 to a point of time t4 is explained. When the gray scale voltage Φ1 assumes the input signal Φ1B for negative polarity, the scanning signal Φ2 is selected at the point of time t2 and the voltage V2B which is indicated by Φ4 is written in the pixel electrode 109. Thereafter, the transistor 30 is made to assume the OFF state and hence, at a point of time t3 after a lapse of 2 h (2 horizontal scanning time) from the point of time t2, the voltage supplied to the pixel capacitance 115 is stepped down from V1 to V3 as indicated by the pixel potential control signal Φ3. When the pixel potential control signal Φ3 is changed from v1 to V3, the pixel capacitance 115 performs a role of coupling capacitance and hence, the potential of the pixel electrode can be lowered in accordance with the amplitude of the pixel potential control signal Φ3. Accordingly, it is possible to produce the voltage V2C having negative polarity with respect to the reference potential Vcom within the pixel.

By producing the signal of negative polarity in the above-mentioned method, it is possible to form the peripheral circuits using elements having low dielectric strength. That is, the signals outputted from the voltage selection circuit 123 are signals having a narrow positive-polarity-side amplitude and hence, it is possible to form the voltage selection circuit 123 using a circuit having low dielectric strength. Further, when the voltage selection circuit 123 can be driven at the low voltage, since the horizontal shift register 120, the display control device 111 and the like which constitute other peripheral circuit are circuits having low dielectric strength, it is possible to provide the constitution formed of circuits having low dielectric strength as the whole liquid crystal display device.

Figure 9:
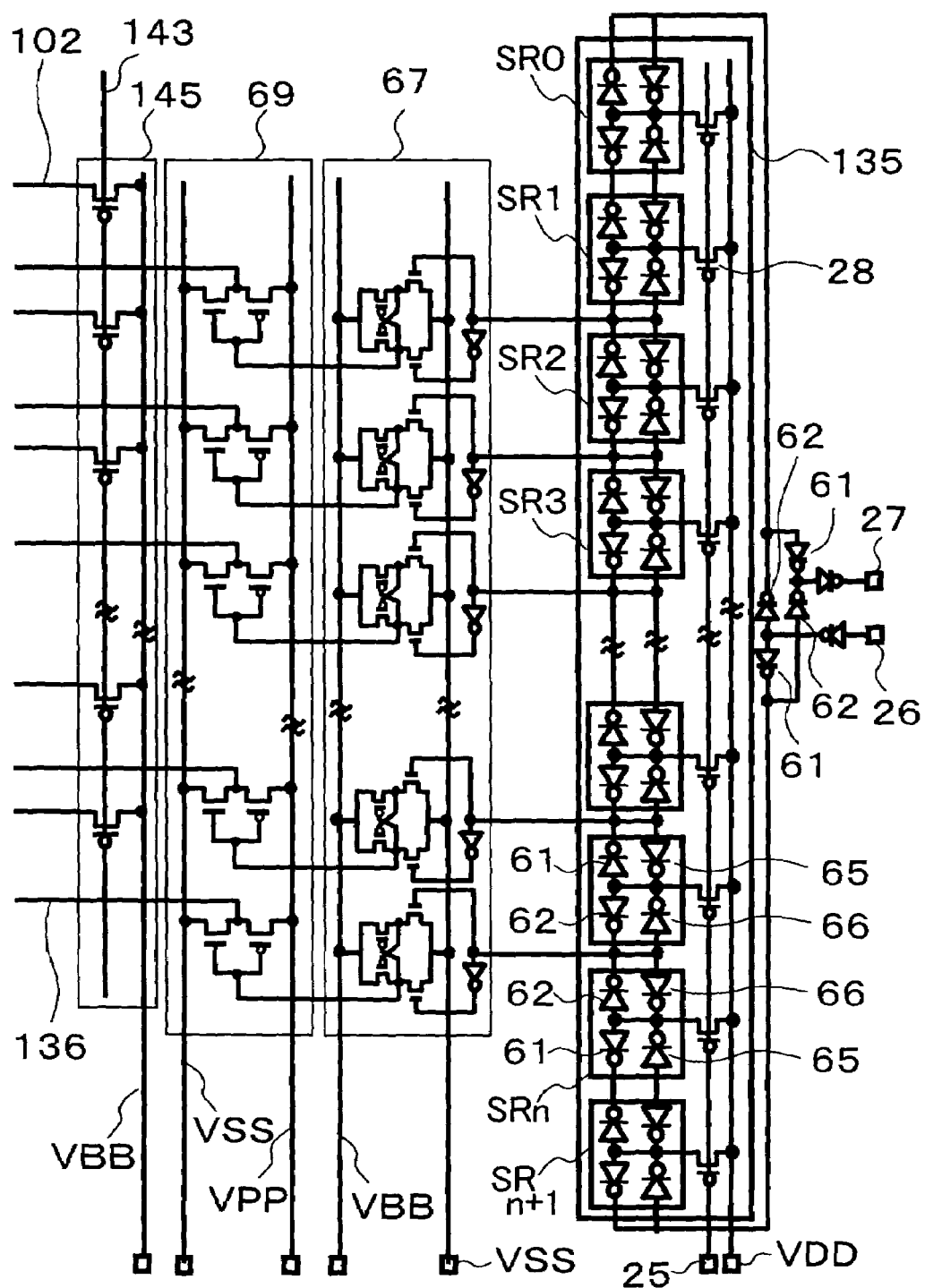
FIG. 9 is a schematic circuit diagram showing the constitution of a pixel potential control circuit of the liquid crystal display device of the embodiment of the present invention.

Next, the circuit constitution of the pixel potential control circuit 135 is explained in conjunction with FIG. 9. Symbol SR indicates a double-way shift register which is capable of shifting the signals in two ways consisting of upper and lower directions. The double-way shift register SR is constituted of clocked inverters 61, 62, 65, 66. Numeral 67 indicates a level shifter and numeral 69 indicates an output circuit. The double-way shift register SR and the like are operated using a power source voltage VDD. The level shifter 67 converts the voltage level of the signal outputted from the double-way shift register SR. From the lever shifter 67, the signal having an amplitude between the power source voltage VBB having a higher potential than the power source voltage VDD and the power source voltage VSS (GND potential) is outputted. The power source voltages VPP and VSS are supplied to the output circuit 69 and the voltages VPP and VSS are outputted to the pixel potential control line 136 in accordance with the signal from the level shifter 67. The voltage V1 of the pixel potential control signal Φ3 explained in conjunction FIG. 8 assumes the power source voltage VPP and the voltage V3 assumes the power source voltage VSS. Here, in FIG. 9, the output circuit 69 is expressed by an inverter consisting of a p-type transistor and an n-type transistor. By selecting values of the power source voltage VPP supplied to the p-type transistor and the power source voltage VSS supplied to the n-type transistor, it is possible to output the voltages VPP, VSS as the pixel potential control signals Φ3.

However, a substrate voltage VBB is supplied to a silicon substrate on which the p-type transistors are formed as explained later and hence, the value of the power source voltage VPP is set to a proper value with respect to the substrate voltage VBB.

Numeral 26 indicates a start signal input terminal through which a start signal which constitutes one of control signals is supplied to the pixel potential control circuit 135. When the start signal is inputted, the double-way shift registers SR1 to SRn shown in FIG. 9 sequentially output timing signals in accordance with the timing of clock signals supplied from the outside. In accordance with the timing signal, the level shifter 67 outputs the voltage VSS and the voltage VBB. In accordance with outputting of the level shifter 67, the output circuit 69 outputs the voltage VPP and the voltage VSS to the pixel potential control line 136. By supplying the start signal and the clock signal to the double-way shift register SR such that the timing indicated by the pixel potential control signal Φ3 in FIG. 8 can be obtained, it is possible to output the pixel potential control signal Φ3 at the desired timing from the pixel potential control circuit 315. In the drawing, numeral 25 indicates a reset signal input terminal.

Here, the positional relationship between the pixel potential control circuit 135 and the vertical drive circuit 130 is studied. As mentioned previously in the explanation of FIG. 8, the pixel potential control signal is driven in an interlocking manner with the scanning signal. Accordingly, the pixel potential control line 136 and the scanning signal line 102 are arranged in parallel. In such a constitution, it is perferable to set the position where the pixel potential control circuit 135 is formed in the vicinity of end portions of the scanning signal lines 102. However, the vertical drive circuit 130 is provided at one ends of the scanning signal lines 102 and hence, the pixel potential control circuit 135 is provided in the vicinity of end portions of the scanning signal lines 102 opposite to the vertical drive circuit 130.

Conventionally, the vertical drive circuit 130 is provided at one end portions of the scanning signal lines 102. However, when the number of pixels in the horizontal direction is increased, there arises a problem attributed to the rounding of waveform of scanning signals. As a method for solving such a problem, it may be possible to provide the vertical drive circuits 130 at both ends of the scanning signal lines 102. However, when the pixel potential control circuit 135 is formed, it has been found out that there is no tolerance or margin of area for mounting the vertical drive circuits 130 at both ends of the scanning signal lines 102 depending on the circuit size. Accordingly, a circuit having a circuit size smaller than that of the vertical drive circuits 130 is provided as an auxiliary circuit (pull-up circuit) 145 of the vertical drive circuit 130 to solve the problem caused by the rounding of waveform of the scanning signals.

As shown in FIG. 9, the pull-up circuit 145 is connected to the end potions of the scanning signal lines 102 at the pixel potential control circuit 135 side. The pull-up circuit 145 is controlled in response to signals transmitted through the control signal line 143 and functions such that the power source line having the substrate voltage VBB and the scanning signal line 102 are connected and the potential of the scanning signal line 102 assumes the substrate voltage VBB. The substrate voltage VBB is an OFF voltage of the scanning signal which makes the active element 30 (see FIG. 2) of the pixel potion assume the OFF state and the pull-up circuit 145 assists the active element 30 to assume the OFF state. That is, the pull-up circuit 145 functions such that the active element 30 which is remote from the vertical drive circuit 130 and is largely influenced by the rounding of waveform attributed to the wiring resistance sharply assumes the OFF state.

The rounding of waveform becomes apparent due to the increase of the number of pixels in the horizontal direction which becomes necessary to cope with the demand for high resolution, the increase of wiring resistance of the scanning signal lines and the deterioration of parasitic capacitance. This rounding of waveform is a phenomenon in which with respect to the signal waveform of the near end side from the output terminal of the vertical drive circuit 130 which drives the scanning signal lines, in the rise and the fall of the signal waveform of the far end side, the change of the voltage is not sharp (becomes dull). The rounding of waveform differs depending on the distance from the vertical drive circuit 130. Due to this difference in the rounding of waveform, there arises a difference in the jump potential thus giving rise to lowering of display quality such as flickers or lateral smears. The jump potential is a phenomenon in which when the scanning signal line assumes the non-selected state due to the gate terminal of the active element 30 and the parasitic capacitance of the pixel electrode, the potential of the pixel electrode is changed.

In general, due to the jump potential, the direct current component remains in the pixel electrode with respect to the voltage of the counter electrode (common voltage). To eliminate the residual direct current components, the adjustment is made to set the common potential to the optimum voltage (to eliminate the direct current component). However, when the jump potential differs between the left and right of the screen, with the mere adjustment of the common potential, it is difficult to eliminate the difference in direct current component between the left and the right of the screen. Accordingly, in the circuit shown in FIG. 9, the auxiliary circuit 145 (pull-up circuit) is provided and, to solve the problem attributed to the jump potential, the scanning signal line is driven from both ends thereof at the time of off-switching of the active element 30.

In the auxiliary circuit 145 shown in FIG. 9, to reduce difference in the rounding of waveform at the left and the right of the screen and thereby to set the jump potential at both ends of the scanning signal line to the same level, the display quality is made uniform in the horizontal direction. Further, by using the auxiliary circuit 145 as a pull-up circuit, the auxiliary circuit 145 is constituted such that one switching element is provided per one scanning signal line and hence, it is possible to form the auxiliary circuit in the narrow region.

Here, although the switching element is formed of the p-type transistor, when the active element 30 is formed of the n-type transistor thus forming the switching element which assumes the OFF state at a low voltage, the auxiliary circuit 145 can be formed of the pull-down circuit and the n-type switching element can be used.

Figure 10A:
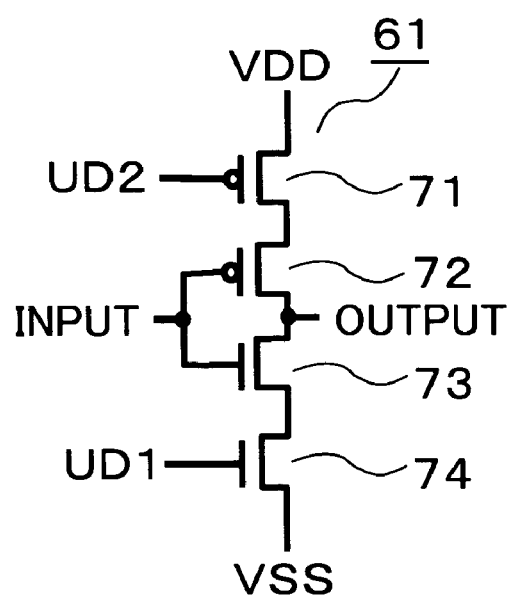
FIG. 10A, FIG. 10B, FIG. 10C and FIG. 10D are schematic circuit diagrams showing clocked inverters used in the pixel potential control circuit.
Figure 10B:
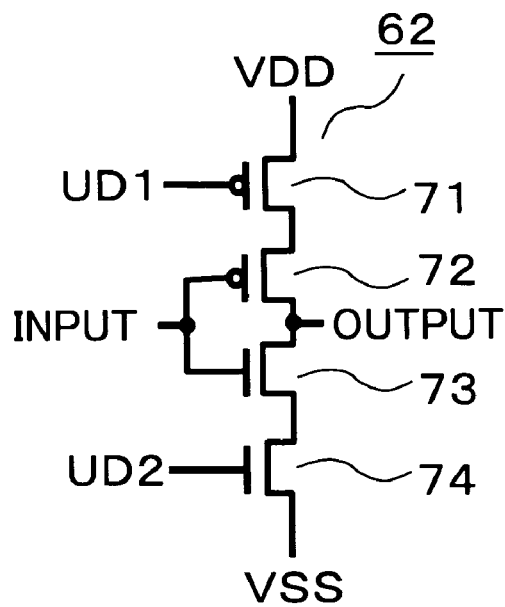

Next, the clocked inverters 61, 62 used in the double-way shift register SR are explained in conjunction with FIG. 10A and FIG. 10B. In the drawing, symbol UD1 indicates a first direction setting line and symbol UD2 indicates a second direction setting line.

The first direction setting line UD1 shown in FIG. 10A assumes an H level when the scanning is made from below to above in FIG. 9 and the second direction setting line UD2 shown in FIG. 10A assumes an H level when the scanning is made from above to below in FIG. 9. Although wiring is omitted for facilitating the understanding of the constitution in FIG. 9, both of the first direction setting line UD1 and the second direction setting line UD2 are connected to the clocked inverters 61, 62 which constitute the double-way shift register SR.

The clocked inverter 61 comprises, as shown in FIG. 10A, p-type transistors 71, 72 and n-type transistors 73, 74. The p-type transistor 71 is connected to the second direction setting line UD2, while the n-type transistor 74 is connected to the first direction setting line UD1. Accordingly, when the first direction setting line UD1 is at the H level and the second direction setting line UD2 is at the L level, the clocked inverter 61 functions as the inverter, and when the second direction setting line UD2 is at the H level and the first direction setting line UD1 is at the L level, the clocked inverter 61 functions as the high impedance.

To the contrary, in the clocked inverter 62, as shown in FIG. 10B, the p-type transistor 71 is connected to the first direction setting line UD1, while the n-type transistor 74 is connected to the second direction setting line UD2. Accordingly, the clocked inverter 62 functions as an inverter when the second direction setting line UD2 is at the H level and functions as the high impedance when the first direction setting line UD1 is at the H level.

Figure 10C:
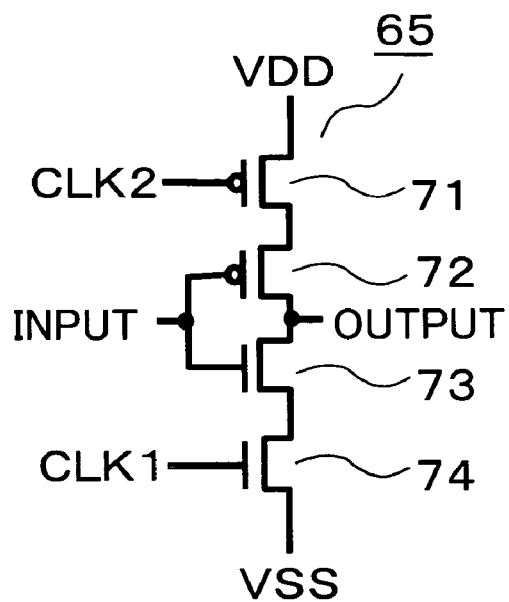

Then, the clocked inverter 65 has the circuit constitution shown in FIG. 10c, wherein when the clock signal line CLK1 is at the H level and the clock signal line CLK2 is at the L level, an input is outputted in a reversed manner, while when the clock signal line CLK 1 is at the L level and the clock signal line CLK 2 is at the H level, the clocked inverter 65 becomes the high impedance.

Figure 10D:
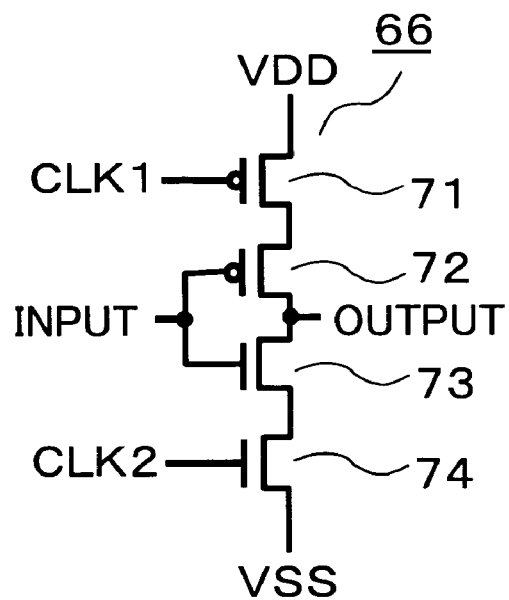

Further, the clocked inverter 66 has the circuit constitution shown in FIG. 10D, wherein when the clock signal line CLK2 is at the H level and the clock signal line CLK1 is at the L level, an input is outputted in a reversed manner, while when the clock signal line CLK 2 is at the L level and the clock signal line CLK 1 is at the H level, the clocked inverter 66 becomes the high impedance. In FIG. 10, although the wiring of the clock signal lines is omitted, the cock signal lines CLK1, CLK2 are connected to the clocked inverters 65, 66 in FIG. 10.

As explained above, since the double-way shift register SR is constituted of the clocked inverters 61, 62, 65, 66, it is possible to sequentially output the timing signals. Further, since the pixel potential control circuit 135 is constituted of the double-way shift register SR, it is possible to scan the pixel potential control signals Φ3 in two ways. That is, the vertical drive circuit 130 is also constituted of the similar double-way shift register so that the liquid crystal display device according to the present invention can perform scanning in two ways consisting of upper and lower directions.

Accordingly, when an image to be displayed is reversed up side down, the scanning direction is reversed and scanning is performed from below to above in the drawing. Accordingly, when the vertical drive circuit 130 performs scanning from below to above, the pixel potential control circuit 135 also changes setting of the first direction setting line UD1 and the second direction setting line UD2 so as to cope with scanning from below to above. Here, the horizontal shift register 121 is also constituted by the similar double-way shift register.

Figure 11:
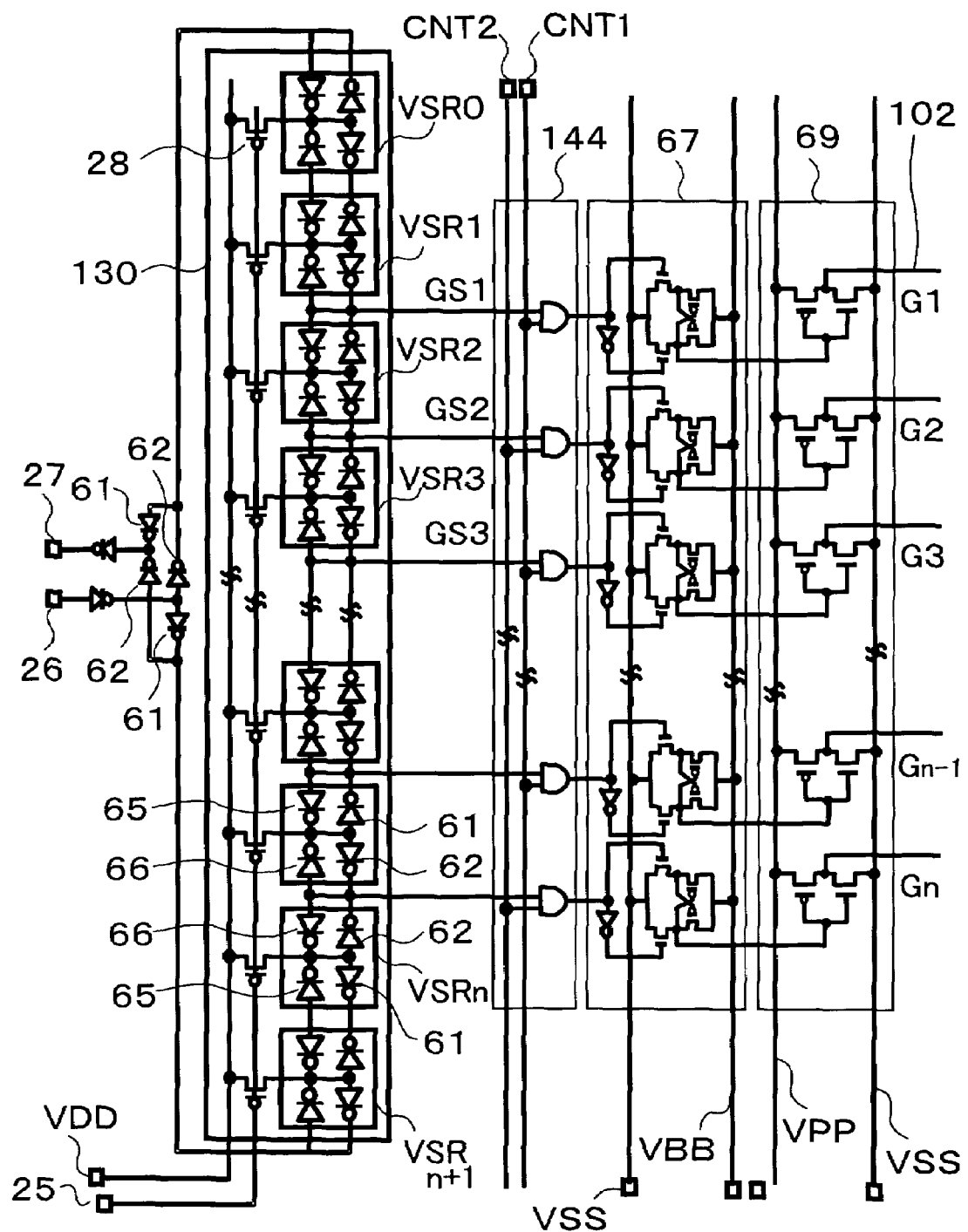
FIG. 11 is a schematic circuit diagram showing the constitution of a vertical drive circuit of the liquid crystal display device of the embodiment of the present invention.
Figure 12:
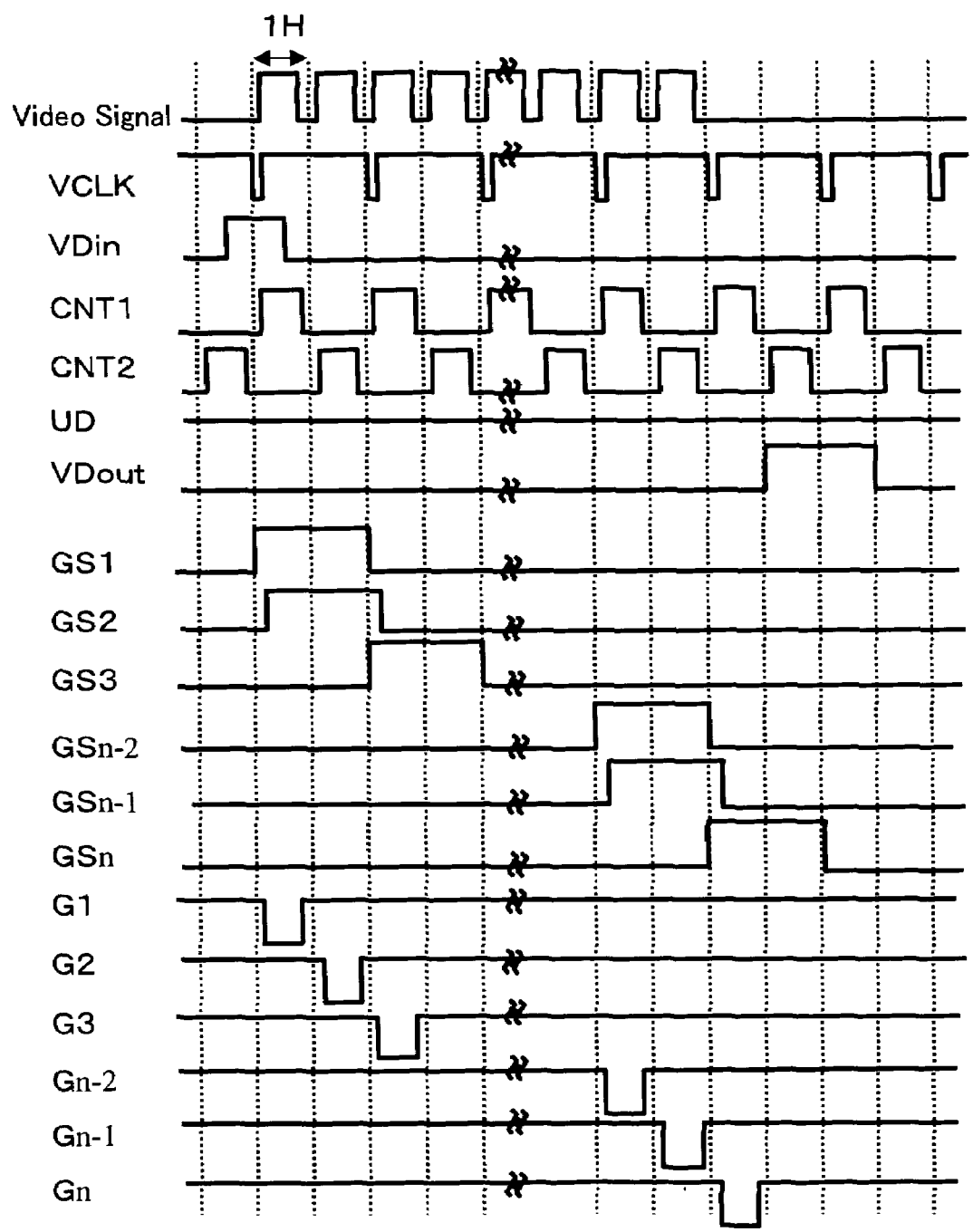
FIG. 12 is a timing chart showing an operation of the vertical drive circuit shown in FIG. 11.

Subsequently, the vertical drive circuit 130 is explained in conjunction with FIG. 11 and FIG. 12. FIG. 11 is a schematic circuit diagram of the vertical drive circuit 130 and FIG. 12 is a timing chart of the circuit shown in FIG. 11. The vertical drive circuit 130 shown in FIG. 11 is also constituted of the double-way shift register VSR and is capable of scanning in two directions. Although the vertical drive circuit 130 also has the constitution similar to the constitution of the above-mentioned pixel potential control circuit 135 in the same manner, a vertical scanning control circuit indicated by numeral 144 is added. The vertical scanning control circuit 144 controls an output GS of the double-way shift register VSR through the vertical scanning control lines CNT1 and CNT2. Upon receiving the signals through the vertical scanning control lines CNT1 and CNT2, the vertical drive circuit 130 can perform various driving including sequential scanning driving, 2 line simultaneous driving and 1 line jump scanning driving. Here, the vertical scanning control lines CNT1 and CNT2 constitute a portion of control signal lines 131 shown in FIG. 1 and the like.

FIG. 12 shows drive timing when the sequential scanning driving is performed in the normal direction from above to below in the drawing at the vertical drive circuit 130 shown in FIG. 11. As video signals, during 1 H (1 horizontal scanning period), arbitrary voltages are outputted as gray scale voltages from the horizontal drive circuit 120. To fetch the gray scale voltages into the pixel electrodes, the vertical drive circuit 130 outputs the scanning signals (G1-Gn) to make the active elements of the pixel portions assume the ON state during 1H.

Symbol VCLK indicates a clock inputted to the clocked inverters 65, 66 and corresponds to the clock CLK shown in FIG. 10. Symbol VDin indicates a scanning start signal and is inputted through the terminal 26. Symbol UD indicates a signal which determines whether scanning is in the normal direction or in the reverse direction and the normal direction is set when the signal is at the high level in FIG. 12. Symbol VDout indicates a scanning completion signal and is outputted from the terminal 27 after completion of scanning. Symbols CNT1 and CNT2 indicate signals (vertical scanning control signals) of the above-mentioned vertical scanning control lines.

The double-way shift register VSR1 holds and outputs the input signal at a falling edge of the clock VCLK and holds the value until a falling edge of next clock VCLK. Accordingly, an output from the double-way shift register VSR1 exhibits a waveform indicated by GS1. Further, the double-way shift register VSR2 holds and outputs the input signal at a rising edge of the clock VCLK and holds the value until a rising edge of next clock VCLK. Accordingly, an output from the double-way shift register VSR2 exhibits a waveform indicated by GS2. Then, the vertical scanning control signals CNT1 and CNT2 are outputted as shown in FIG. 12, are subjected to computing in an AND circuit of the vertical scanning control circuit 144, and are outputted to the scanning signal lines 102 as scanning signals G1-Gn from an output buffer 69.

Figure 13:
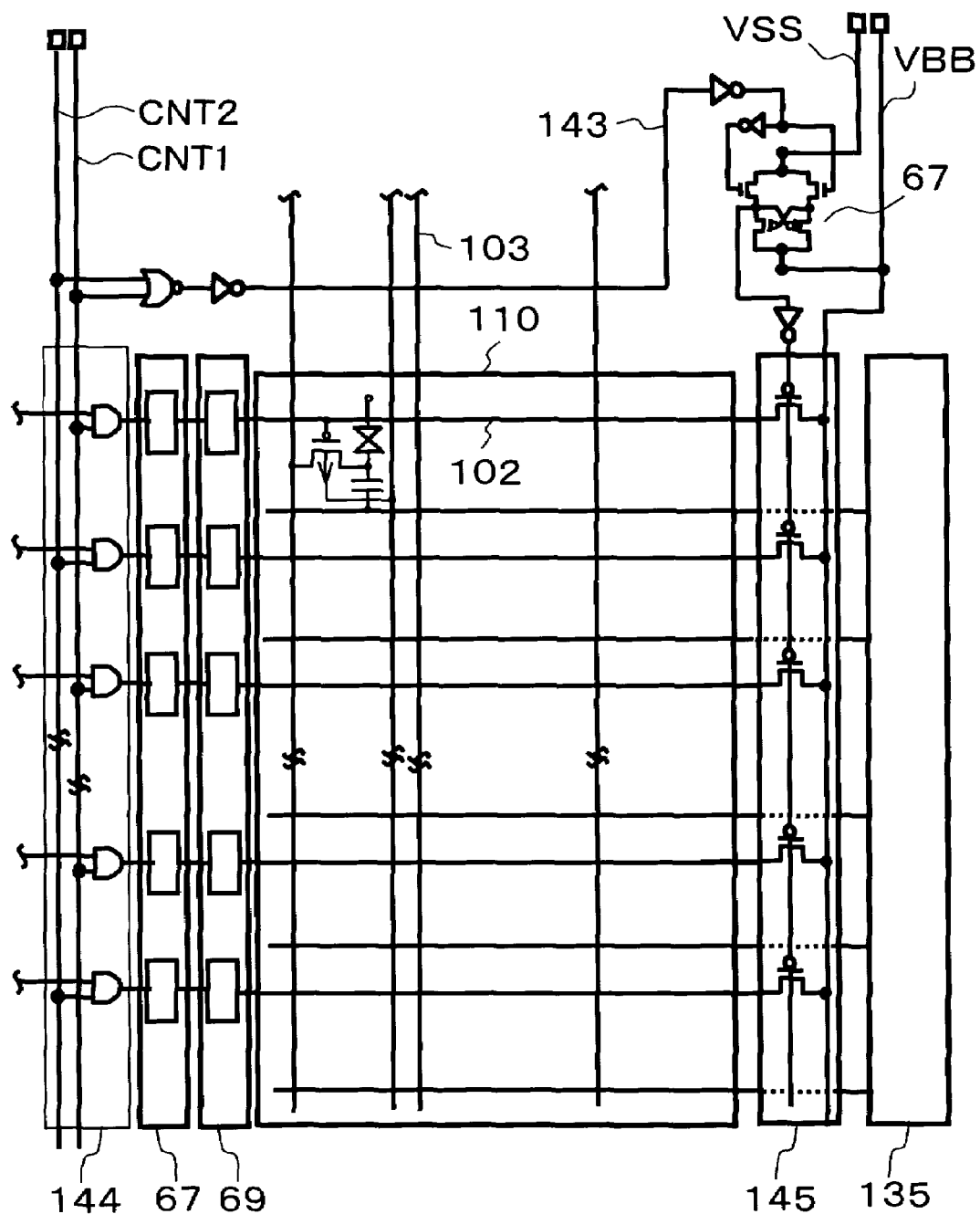
FIG. 13 is a schematic circuit diagram showing the constitution of a pull up circuit of the liquid crystal display device of the embodiment of the present invention.

Subsequently, the operation of the pull-up circuit 145 is explained in conjunction with FIG. 13 and FIG. 14. In FIG. 13, to prevent the drawing from becoming complicated, circuits on the left and right peripheries of the display part 110 are shown. The pull-up circuit 145 is controlled in response to the signals through the above-mentioned vertical scanning control lines CNT1 and CNT2. The control signal line 143 is connected to output terminals of the vertical scanning control lines CNT1 and CNT2 and is connected to an input terminal of the pull-up circuit 145. Here, the level shifter 67 converts the voltage to produce a voltage with which switching elements of the pull-up circuit 145 can be driven.

Figure 14:
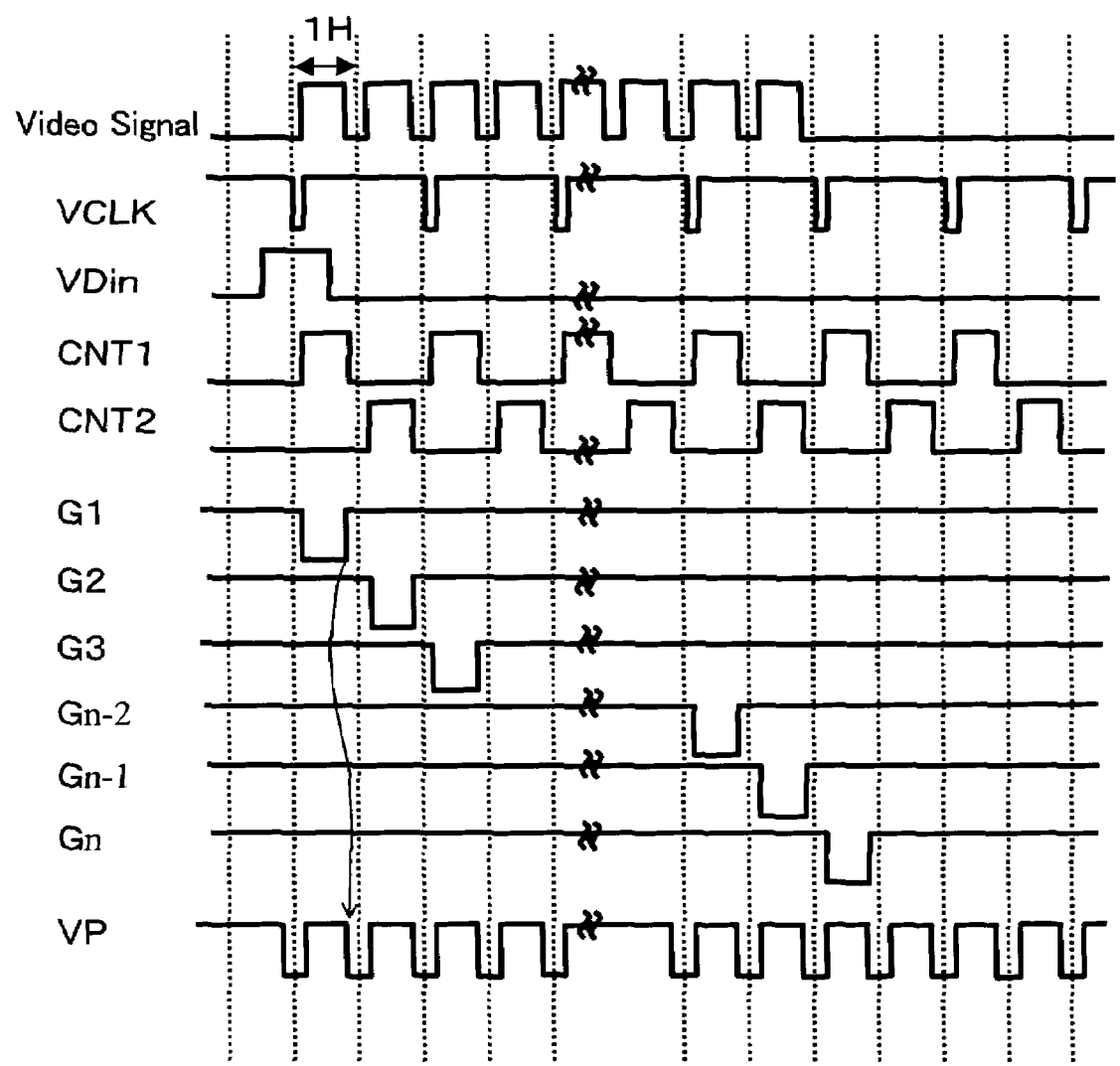
FIG. 14 is a timing chart showing the operation of the pull up circuit shown in FIG. 13.

Also in FIG. 14, the signals of the vertical scanning control lines CNT1 and CNT2 are outputted in the same manner as FIG. 12. By making the values of the vertical scanning control signals CNT1 and CNT2 subjected to NOR computing, it is possible to produce a control signal VP outputted to the control signal line 143. The control signal VP makes the switching elements of the pull-up circuit 145 assume the ON state at the timing that the scanning signals G1-Gn assume the high level.

With the provision of the pull-up circuit 145, at the time of OFF switching in which the active element 30 of the pixel portion is changed from the ON state to the OFF state, it is possible to drive the scanning signal line 103 from both ends and to make the scanning signal line 103 assume the voltage VBB. Here, the case in which the active element 30 of the pixel portion is constituted of the p-type MIS transistor in a depletion mode which assumes the ON state when the signal at the high level is not supplied to the control terminals has been explained. However, the active element 30 can be constituted of either a p-type MIS transistor or an n-type MIS transistor.

Figure 15:
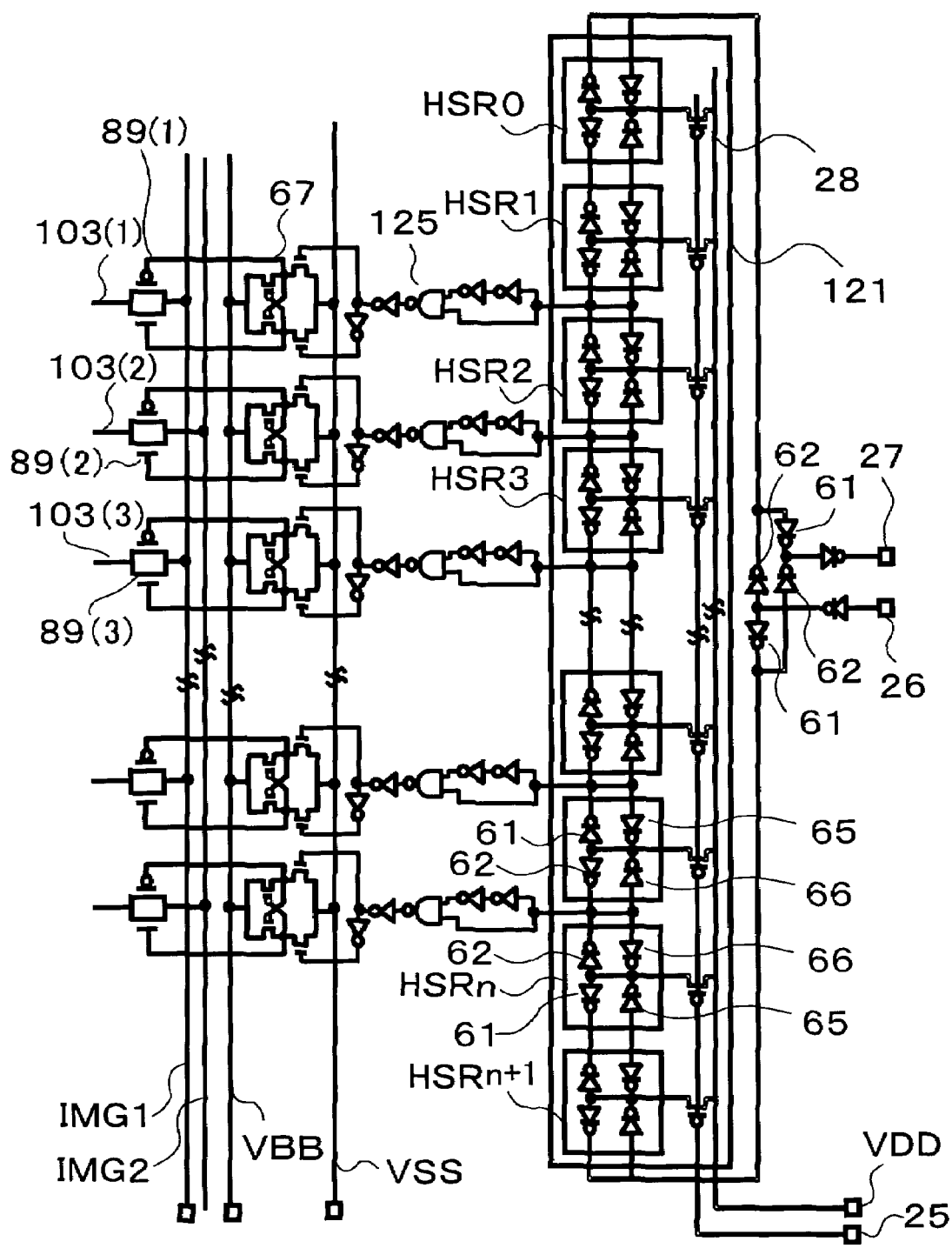
FIG. 15 is a schematic circuit diagram showing the constitution of a horizontal drive circuit of the liquid crystal display device of the embodiment of the present invention.

Subsequently, a circuit which prevents blurring of images in the horizontal direction which is called a ghost in the horizontal drive circuit 120 is explained in conjunction with FIG. 15 and FIG. 16. In FIG. 15, symbol HSR indicates a double-way shift resister which constitutes the horizontal shift resister 121 of the horizontal drive circuit 120. Symbol 125 is a delay circuit which is served for preventing the ghost by delaying an output signal from the double-way shift resister HSR by a fixed period. The delay circuit 125 receives output signals from the double-way shift resister HSR through signal lines of two systems, wherein by providing two pieces of inverters to one signal line, inputting of the output signal to the AND circuit is delayed by an amount of time which is necessary for passing the inverter. Accordingly, the rise of the output signal from the AND circuit is delayed by this delayed time.

An output of the AND circuit is inputted to a gate circuit 89. Symbols IMG1, IMG2 indicate video signal supply lines through which video signals are supplied. When the gate circuit 89 assumes the ON state, the video signal supply lines IMG1, IMG2 and the video signal line 103 assume the conductive state to each other and hence, the video signals are outputted to the video signal lines 103. The gate circuit 89 assumes the ON state when the gate circuit 89 is selected for a fixed period in response to sampling pulses outputted from the double-way shift register HSR. Here, in the circuit shown in FIG. 15, a case in which the video signals are supplied in a form that they are divided in two phases is shown. Accordingly, two signal lines consisting of video signal supply lines IMG1 and IMG2 are alternately connected to the gate circuit 89.

As one of causes of the ghost, the increase of the width of the sampling pulse is named. From the horizontal shift register 121 shown in FIG. 15, the sampling pulses are outputted as indicated by symbol DS in FIG. 16. However, when the rounding is generated in the sampling pulses DS, the width of sampling pulse is increased and hence, the video signals are simultaneously supplied to two video signal lines or the video signals to be outputted are written in the different video signal lines whereby the images are blurred thus giving rise to the ghost.

Figure 16:
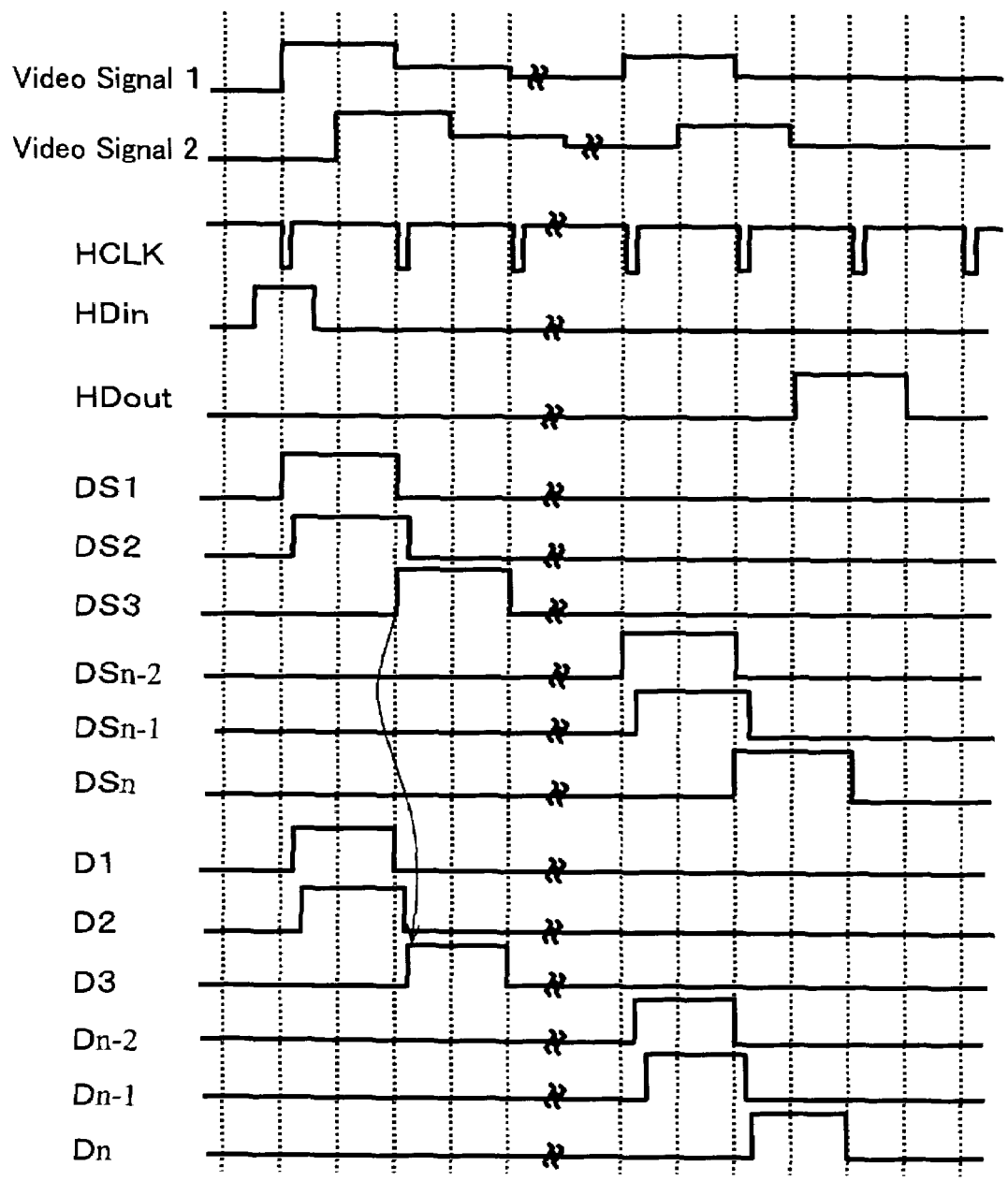
FIG. 16 is a timing chart showing an operation of the horizontal drive circuit shown in FIG. 15.

To explain the above by taking the video signal lines 103(1) and 103(3) of the circuit shown in FIG. 15 as an example, when outputs are overlapped at starting and completion of signals as in the case of pulses DS1 and DS3 in FIG. 16, at the completion of outputting of the video signals to the video signal line 103(1) and at the starting of outputting to the video signal line 103(3), in the state that the gate circuit 89(1) is not completely turned off, the gate circuit 89(3) assumes the ON state and hence, a portion of data of the video signal line 103(1) is leaked into the video signal line 103(3). Accordingly, there arises a problem that a so-called ghost phenomenon in which displays of the neighboring signal lines are observed in an overlapped manner is generated.

In the circuit shown in FIG. 15, the delay circuit is provided between the output terminal of the horizontal shift resister 121 and the gate circuit 89 so as to delay the rise of the sampling pulse. As shown in FIG. 16, with respect to the fall of the sampling pulse D1, the sampling pulse D3 rises with a delay. Accordingly, it is possible to prevent the video signal to be written in the video signal line 103(1) due to the gate circuit 89(3) which is made to assume the ON state in response to the sampling pulse D3 from being written in the video signal line 103(3) which is different from the video signal line 103(1).

When the video signals are transmitted in a form that the video signal is developed in a plurality of phases, the video signals which are erroneously written constitute video signals which are separated by several lines and hence, the ghost which is generated due to the rounding of sampling pulse becomes apparent. For example, when the number of gate circuit 89 which the double-way shift register HSR controls is 6, the ghost phenomenon is generated at an interval of 6 rows and hence, there arises a problem that the display quality is remarkably degraded. Here, besides the delay circuit described in FIG. 15, it may be possible to adopt the constitution in which the rising speed at the time of turning on the circuit (for example, the level shift circuit 67) provided between the double-way shift resister HSR and the gate circuit 89 is delayed and the falling speed at the time of turning off the circuit is increased.

Figure 17:
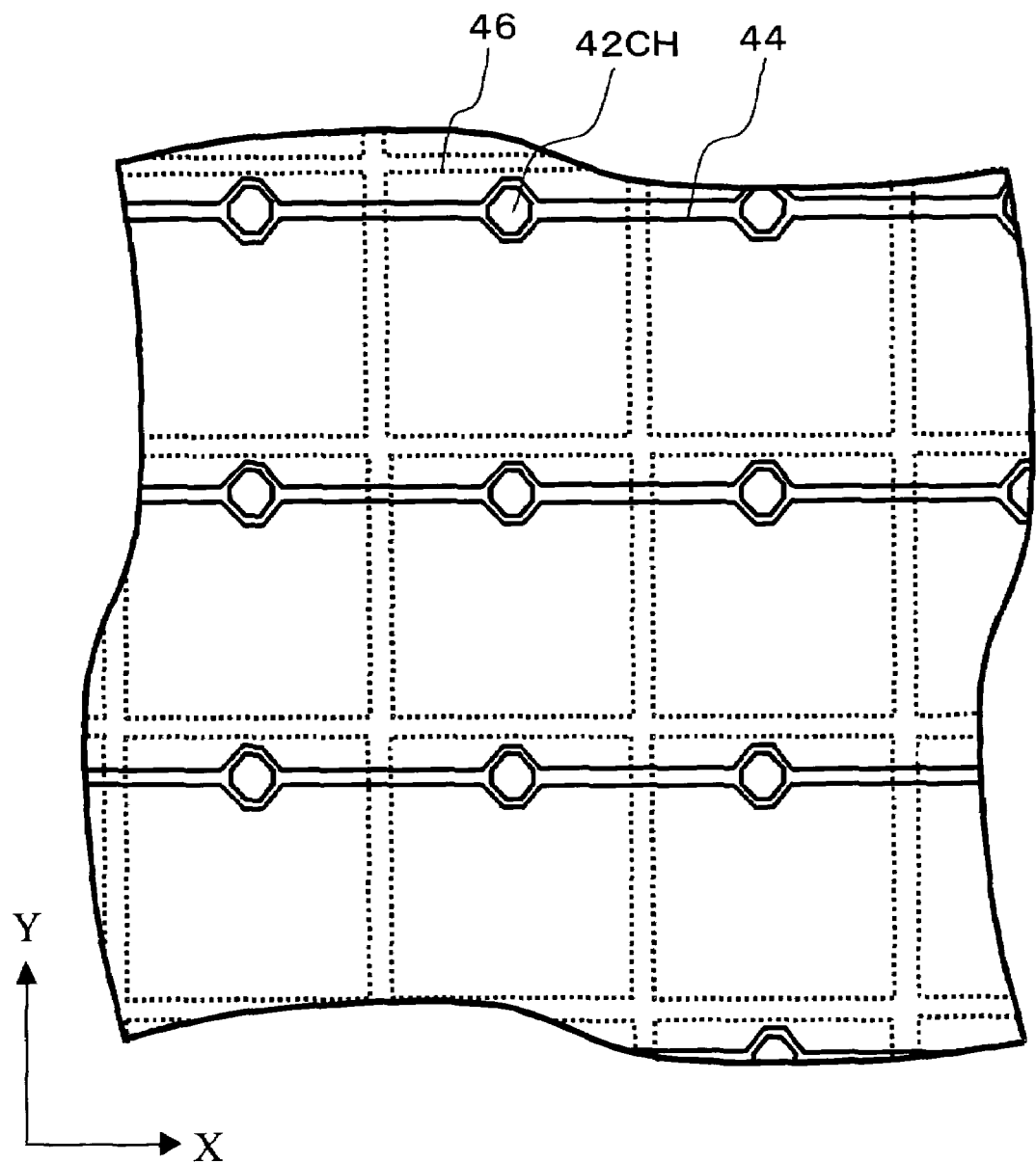
FIG. 17 is a schematic plan view showing the constitution for forming a pixel potential control line using a light shielding film.

Then, the constitution of the utilization of the first light shielding film 44 as the pixel potential control line 136 is explained in FIG. 17. As shown in FIG. 5, the first light shielding film 44 and the second light shielding film 46 face each other in an opposed manner while sandwiching a third interlayer film 45 therebetween and form a portion of the pixel capacitance. Numeral 49 indicates a conductive layer which forms a portion of the pixel potential control line 136. The first electrode 31 and the first light shielding film 44 are electrically connected by the conductive layer 49. Further, it is also possible to form wiring from the pixel potential control circuit 135 to the pixel capacitance using the conductive layer 49. In this embodiment, however, the first light shielding film 44 is used as the pixel potential control line.

FIG. 17 is a plan view showing the arrangement of the first light shielding film 44. Although numeral 46 indicates the second light shielding film, to show the position thereof, they are shown in a dotted line. Numeral 42CH indicates the through holes which are provided for connecting the first conductive film 42 and the second light shielding film 46. Here, in FIG. 17, for facilitating the understanding of the first light shielding films 44, other constitutions are omitted. The first light shielding films 44 have a function of the pixel potential control line 136 and are formed continuously in the X direction in the drawing. Although the first light shielding films 44 are configured to cover the entire surface of the display region so as to function as the light shielding film, to allow the first light shielding films 44 to have also the function of the pixel potential control line 136, the first light shielding films 44 are formed linearly such that they extend in the X direction (the direction parallel to the scanning signal line 102), are arranged in parallel in the Y direction and are connected to the pixel potential control circuit 135. Further, since the first light shielding film 44 also functions as the electrode of the pixel capacitance, the first light shielding film 44 is formed such that the first light shielding film 44 is overlapped to the second light shielding film 46 with an area as large as possible. Furthermore, as the light shielding film which can reduce leaking of light, a gap between the neighboring first light shielding films 44 is set as narrow as possible.

However, when the gap between the neighboring first light shielding films 44 is narrowed as shown in FIG. 17, a portion of the first light shielding film 44 is overlapped to the second light shielding film 46 arranged close to the first light shielding film 44. As mentioned previously, the liquid crystal display device of the present invention is capable of performing scanning in two ways. Accordingly, when the pixel potential control signals are scanned in two ways, there arise a case in which the first light shielding film 44 is overlapped to the second light shielding film 46 of next stage and a case in which the first light shielding film 44 is not overlapped to the second light shielding film 46 of next stage. In the case shown in FIG. 17, when the scanning is performed from above to below in the drawing, the first light shielding film 44 is overlapped to the second light shielding film 46 of next stage.

Figure 18A:
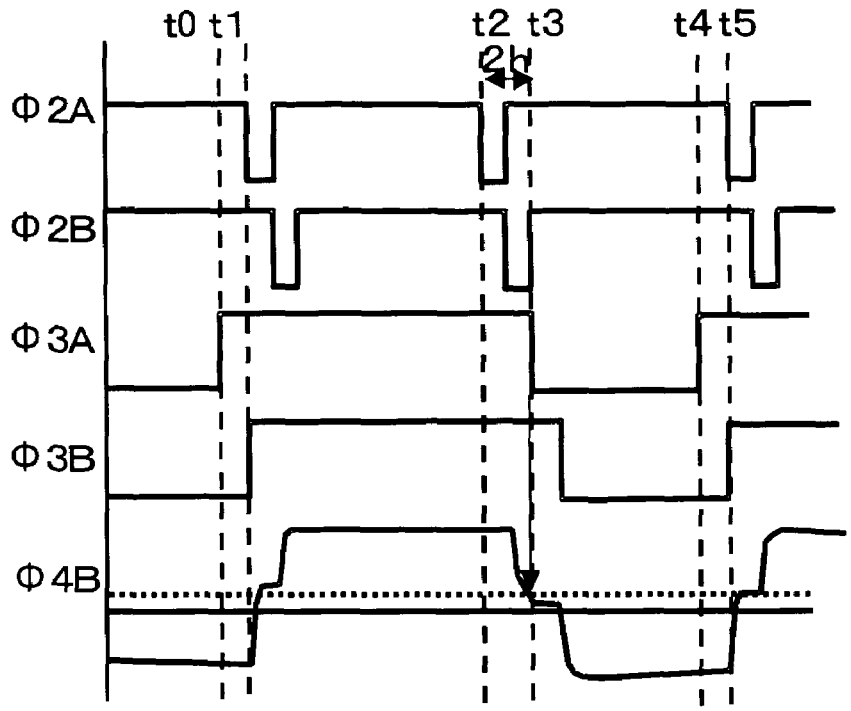
FIG. 18A and FIG. 18B are timing charts showing a driving method of the liquid crystal display device of the embodiment of the present invention.
Figure 18B:
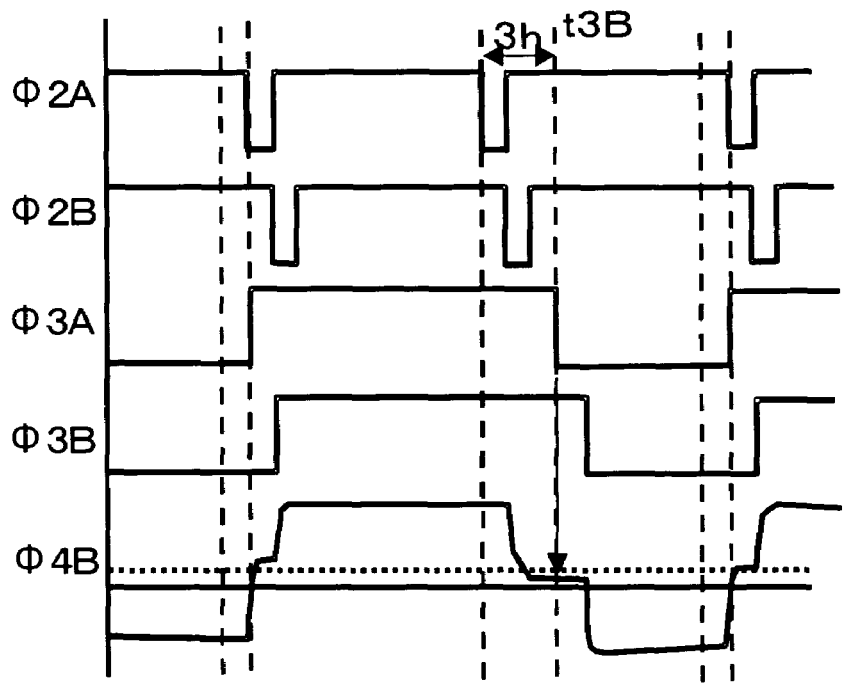

Using FIG. 18A and FIG. 18B, a drawback attributed to overlapping of the portion of the first light shielding film 44 to the second light shielding film 46 of the next stage and a method for solving such a drawback are explained. FIG. 18A is a timing chart for explaining the drawback. $\Phi 2A$ indicates a scanning signal of an arbitrary row and is assumed as the scanning signal of the Ath row. $\Phi 2B$ indicates the scanning signal of next-stage row and is assumed as the scanning signal of the Bth row. Here, a period from a point of time t2 to a point of time t3 in which the drawback arises is explained and the explanation of other periods is omitted.

In FIG. 18A, in the Ath row, the pixel potential control signal $\Phi 3A$ is changed at a point of time t3 after a lapse of 2 h (2 horizontal scanning time) from the point of time t2. After a lapse of 1 h from the point of time t2, outputting of the scanning signal $\Phi 2A$ is completed and hence, the active elements 30 of the Ath row driven by the scanning signal $\Phi 2A$ assume the OFF state and the pixel electrodes 109 of the Ath row are separated from the video signal lines 103. At the point of time t3 after a lapse of 2 h from the point of time t2, even when the delay caused by changeover of signals or the like is taken into consideration, the active elements 30 of the Ath row are sufficiently set to the OFF state. However, the point of time t3 is a point of time that the scanning signal $\Phi 2B$ of the Bth row is changed over.

Since the first light shielding film 44 of the Ath row and the second light shielding film 46 of the Bth row are overlapped to each other, the capacitance is generated between the pixel electrodes of the Bth row and the pixel potential control signal lines of the Ath row. Since the point of time t3 is a point of time that the active elements 30 of the Bth row are changed over to the OFF state and hence, the pixel electrodes 109 of the Bth row are not sufficiently terminated from the video signal lines 103. When the pixel potential control signals Φ3A of the Ath row having a capacitance component are changed over between the pixel electrodes 109 of the Bth row and the pixel potential control signals Φ3A at this point of time, since the pixel electrodes 109 and the video signal lines 103 are not sufficiently terminated, charge is moved between the video signal lines 103 and the pixel electrodes 109. That is, the changeover of the pixel potential control signals Φ3A of the Ath row gives an influence to the voltage Φ4B written in the pixel electrodes 109 of the Bth row.

When the scanning direction of the liquid crystal display device is fixed, the influence attributed to the pixel potential control signals Φ3A becomes uniform and hence, it is not apparent. However, when liquid crystal display devices are provided for respective colors of red, green, blue and the like and color display is performed by superposing outputs of respective liquid crystal display devices, due to a reason based on an optical arrangement of the liquid crystal display devices, for example, scanning from below to above is performed only with respect to one liquid crystal display device and scanning is performed from above to below with respect to other liquid crystal display devices. In this manner, when there exist the liquid crystal display devices which differ in scanning directions out of a plurality of liquid crystal display devices, the display quality becomes non-uniform and hence, the aesthetic appearance is damaged.

Next, the method for solving the above-mentioned drawback is explained in conjunction with FIG. 18B. The pixel potential control signal Φ3A of the Ath row is configured to be outputted 3 h later from starting of the scanning signal Φ2A of the Ath row. In this case, the scanning signal Φ2B of the Bth row is already changed over so that the active elements 30 of the Bth row are sufficiently held in the OFF state and hence, the influence that the pixel potential control signal Φ3A of the Ath row gives to the voltage Φ4B written in the pixel electrodes 109 of the Bth row is reduced.

Although the period in which an input signal for negative polarity is written is shortened by 3 h with respect to an input signal for positive polarity, when the number of scanning signal lines 102 exceeds 100, for example, this takes a value equal to or less than 3%. Accordingly, the difference in effective value between the input signal for negative polarity and the input signal for positive polarity can be adjusted based on the value of the reference potential Vcom or the like.

Figure 19A:
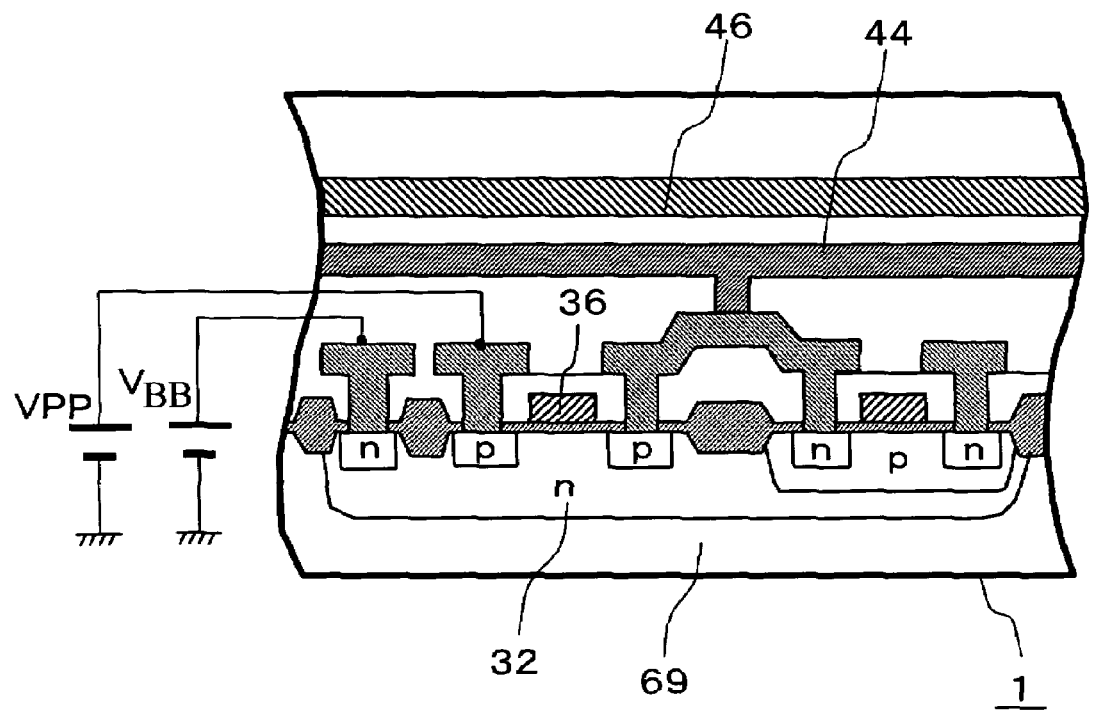
Figure 19B:
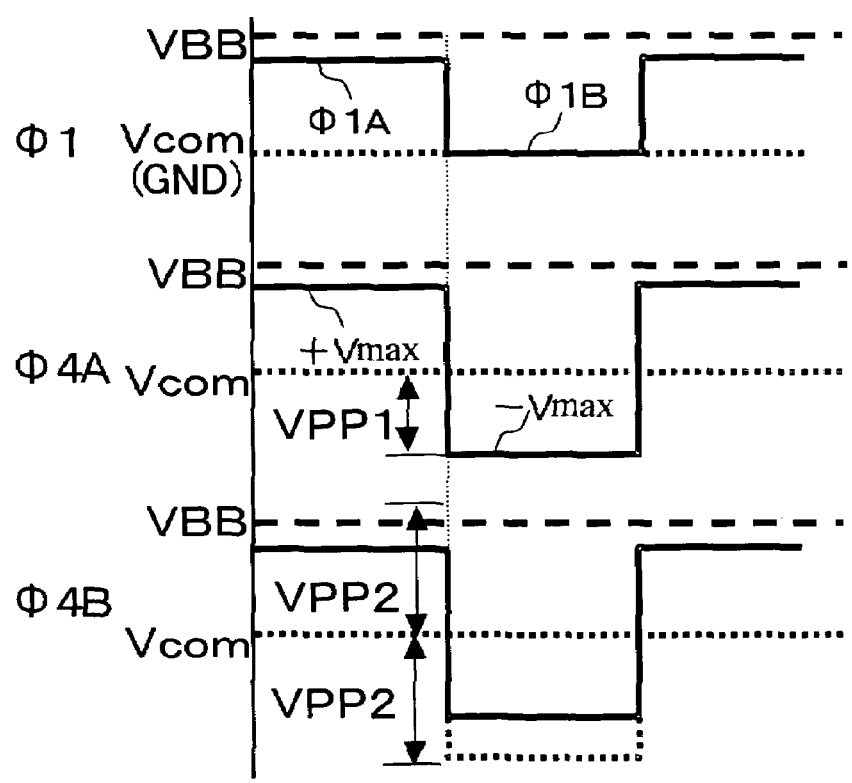

Next, the relationship between the voltage VPP supplied to the pixel capacitance and the substrate potential VBB is explained in conjunction with FIG. 19A and FIG. 19B. FIG. 19A indicates an inverter circuit which constitutes an output circuit 69.

In FIG. 19A, numeral 32 indicates a channel region of a p-type transistor, wherein an n-type well is formed in a silicon substrate 1 by a method such as ion implantation. The substrate voltage VBB is supplied to the silicon substrate 1 so that the potential of the n-type well 32 is set to VBB. The source region 34 and the drain region 35 are formed of a p-type semiconductor layer and these regions are formed on the silicon substrate 1 by a method such as ion implantation or the like. When a voltage having a potential lower than the substrate voltage VBB is applied to the gate electrode 36 of the p-type transistor 30, the source region 34 and the drain region 35 become conductive with each other.

In view of the fact that it is unnecessary to provide insulation portions and hence, the structure can be simplified in general, the common substrate potential VBB is applied to the transistors mounted on the same silicon substrate. In the liquid crystal display device of the present invention, transistors of the drive circuit portions and the transistors of the pixel portions are formed on the same silicon substrate 1. As described above, for adjusting the threshold value, the substrate voltage VBB of the same potential is applied to the p-type MIS transistors of the pixel portions in a depletion mode.

In the inverter circuit shown in FIG. 19A, the voltage VPP supplied to the pixel capacitance is applied to the source region 34. The source region 34 is a p-type semiconductor layer and a pn junction is formed between the source region 34 and the n-type well 32. When the potential of the source region 34 exceeds the potential of the n-type well 32, there arises a drawback that an electric current flows into the n-type well 32 from the source region 32. Accordingly, the voltage VPP is set to the potential lower than the substrate voltage VBB.

As mentioned previously, assuming the voltage written in the pixel electrode as V2, the liquid crystal capacitance as CL, the pixel capacitance as CC, and amplitudes of the pixel voltage control signal as VPP and VSS, the voltage of the pixel electrode after voltage drop is expressed by an equation V2−{CC/(CL+CC)}×(VPP−VSS). Here, when a GND potential is selected as VSS, the magnitude of the voltage change of the pixel electrodes is determined based on the voltage VPP, the liquid crystal capacitance CL and the pixel capacitance CC.

The relationship between the CC/(CL+CC) and the voltage VPP is explained in conjunction with FIG. 19B. Here, to simplify the explanation, the reference voltage Vcom is set to the GND potential. Further, a case which adopts a method in which a white display is performed when the voltage is not applied (normally white) and a gray scale voltage which produces a black display (minimum gray scale) is applied to the pixel electrodes is explained. Φ1 in FIG. 19B indicates the gray scale voltage which is written in the pixel electrodes from the voltage selection circuit 123. Φ1A is the gray scale voltage of positive polarity and Φ2A is the gray scale voltage of negative polarity. Since the black display is adopted, both gray scale voltages Φ1A, Φ1B are set such that the potential difference between the reference voltage Vcom and the gray scale voltage written in the pixel electrode assumes a maximum value. In FIG. 19B, since the gray scale voltage Φ1A is a signal for positive polarity, the gray scale voltage Φ1A is set to +Vmax such that the potential difference between the reference voltage Vcom and the gray scale voltage Φ1A takes the maximum value in the same manner as the conventional technique, while the gray scale voltage Φ1B is written in the pixel electrode as the reference voltage Vcom (GND) and, thereafter, is lowered using the pixel capacitance.

Both of Φ4A, Φ4B indicate the voltages of pixel electrodes, wherein the voltage Φ4A shows a case in which CC/(CL+CC)=1 is ideal and the voltage Φ4B indicates a case in which CC/(CL+CC) is equal to or less than 1. When the voltage Φ4A has negative polarity, since the reference voltage Vcom (GND) is written in the gray scale voltage Φ1B, −Vmax which is lowered in accordance with the amplitude VPP of the pixel voltage control signal is set to −Vmax= −VPP based on the equation CC/(CL+CC)=1.

To the contrary, with respect to the voltage Φ4B of the pixel electrodes, since CC/(CL+CC) is equal to or less than 1, it is necessary to supply the pixel voltage control signal such that the relationship +Vmax<VPP2 is established. As mentioned previously, since it is necessary to satisfy the relationship VPP<VBB, the relationship +Vmax<VPP<VBB is established. Here, to provide the circuits having low dielectric strength, a method which lowers the pixel voltage is adopted. However, when the voltage VPP of the pixel voltage control signal assumes the high voltage, there arises a drawback that the substrate voltage VBB also assumes the high voltage and hence, circuits having high dielectric strength are provided. Accordingly, it is necessary to determine the values of CL and CC such that CC/(CL+CC) approaches 1 as close as possible. That is, the relationship CL<<CC is established.

Here, in the conventional liquid crystal display device which forms thin film transistors on a glass substrate, it is necessary to make the pixel electrodes as wide as possible (so-called high numerical aperture) and hence, the relationship which can be realized is CL=CC at best. Further, since the drive circuit portions and the pixel portions are formed on the same silicon substrate according to the liquid crystal display device of the present invention, the liquid crystal display device has a drawback that when the substrate potential VBB assumes the high voltage, lowering of dielectric strength cannot be realized.

As shown in FIG. 19, since the pixel voltage control signal can be set using the power source voltage of the inverter circuit and hence, with respect to the voltage VPP, it is possible to form the optimum voltage within the circuit and it is also possible to supply the voltage VPP from the outside and to adjust the voltage VPP to the maximum voltage.

In this embodiment, the AC driving is performed with the low voltage and hence, the video signal having the same polarity with the reference voltage is written in the pixel electrodes and the video signal having the inverse polarity is generated using the pixel potential control signal. Since it is sufficient to use the video signal of single polarity, it is possible to use an inexpensive circuit which is operated with the single polarity as the circuit which supplies the video signal to the liquid crystal display device from the outside.

However, as explained in conjunction with FIG. 19, when the amplitude VPP of the pixel voltage control signal is increased, the substrate voltage VBB is also increased and hence, the lowering of voltage becomes difficult. Accordingly, to decrease the amplitude VPP of the pixel voltage control signal, the pixel capacitance CC is sufficiently increased with respect to the liquid crystal capacitance CL thus approximating CC/(CL+CC) to 1. In this case, the amplitude VPP of the pixel voltage control signal approaches the amplitude of the video signal which is outputted from the horizontal drive circuit 120 and, at the same time, the substrate voltage VBB can be also lowered.

Here, returning back to FIG. 4B again, the relationship between the video signal which is outputted from the horizontal drive circuit 120 and the substrate voltage VBB is studied. Assuming the maximum value of the voltage applied to the semiconductor substrate as the substrate voltage VBB and the minimum value as the reference voltage VSS (the minimum value being set to 0V to enable driving with single polarity), the ideal maximum width of the signal amplitude of the video signal outputted from the horizontal drive circuit 120 assumes a value between VSS and VBB.

However, the ON resistance value and the OFF resistance value of the MIS transistor 30 of the pixel portion have the characteristics shown in FIG. 4B and hence, the amplitude of the video signal which the horizontal drive circuit 120 outputs is determined by adding a constant margin to the maximum width which allows the MIS transistor 30 to assume the sufficient ON resistance value and OFF resistance value.

In this embodiment, when the amplitude of the scanning signal is changed between VSS and VBB by adjusting the threshold value of the MIS transistor 30 and the substrate voltage VBB, by adjusting the ON resistance value of the MIS transistor 30 to $1\times10^5\Omega$ or less and the OFF resistance value of the MIS transistor 30 to $1\times10^6\Omega$ or more within a ranged of amplitude of the input signal, the characteristics shown in FIG. 4B are obtained.

In driving the liquid crystal display device with the single polarity and the low-voltage driving using the pixel potential control signal, it is also possible to use an inexpensive circuit for low voltage driving also as the circuit which supplies the video signal to the liquid crystal display device from the outside. For example, when a rated power source voltage of the liquid crystal display device is set such that VSS is 0V and VBB is 8V, it is possible to use an inexpensive low-voltage driving circuit in an external circuit.

However, even when the amplitude of the scanning signal is changed between VSS (0V) and VBB (8V), when an absolute value of the threshold value is set to 1.5V, a margin amounting to 1V is taken from a low-voltage side and a high-voltage side respectively thus taking 2V in total as the margin, the amplitude of the video signal which can be outputted from the horizontal drive circuit 120 becomes 4.5V in view of a formula 8V−1.5V−2V is 4.5V. This amplitude is a limit value with respect to the desired signal amplitude which is obtained from the characteristics of the transmissivity with respect to the applied voltage of a liquid crystal layer.

Accordingly, the threshold value of the MIS transistor 30 and the substrate voltage VBB are adjusted, as shown in FIG. 4B, such that the ON resistance value of the MIS transistor 30 becomes $1\times10^5\Omega$ or less and the OFF resistance value of the MIS transistor 30 becomes $1\times10^6\Omega$ or more within the amplitude range of the input signal. However, it is necessary to accurately control the concentration of impurities which adjusts the threshold value and the voltage value of the substrate voltage VBB.

In this embodiment, to accurately supply the substrate voltage VBB to the MIS transistor 30 of the pixel portion, the substrate voltage supply line 106 is extended to the inside of the display region 110 and the through hole 290 is formed in the pixel portion thus supplying the substrate voltage VBB to the vicinity of the MIS transistor 30.

Figure 20:
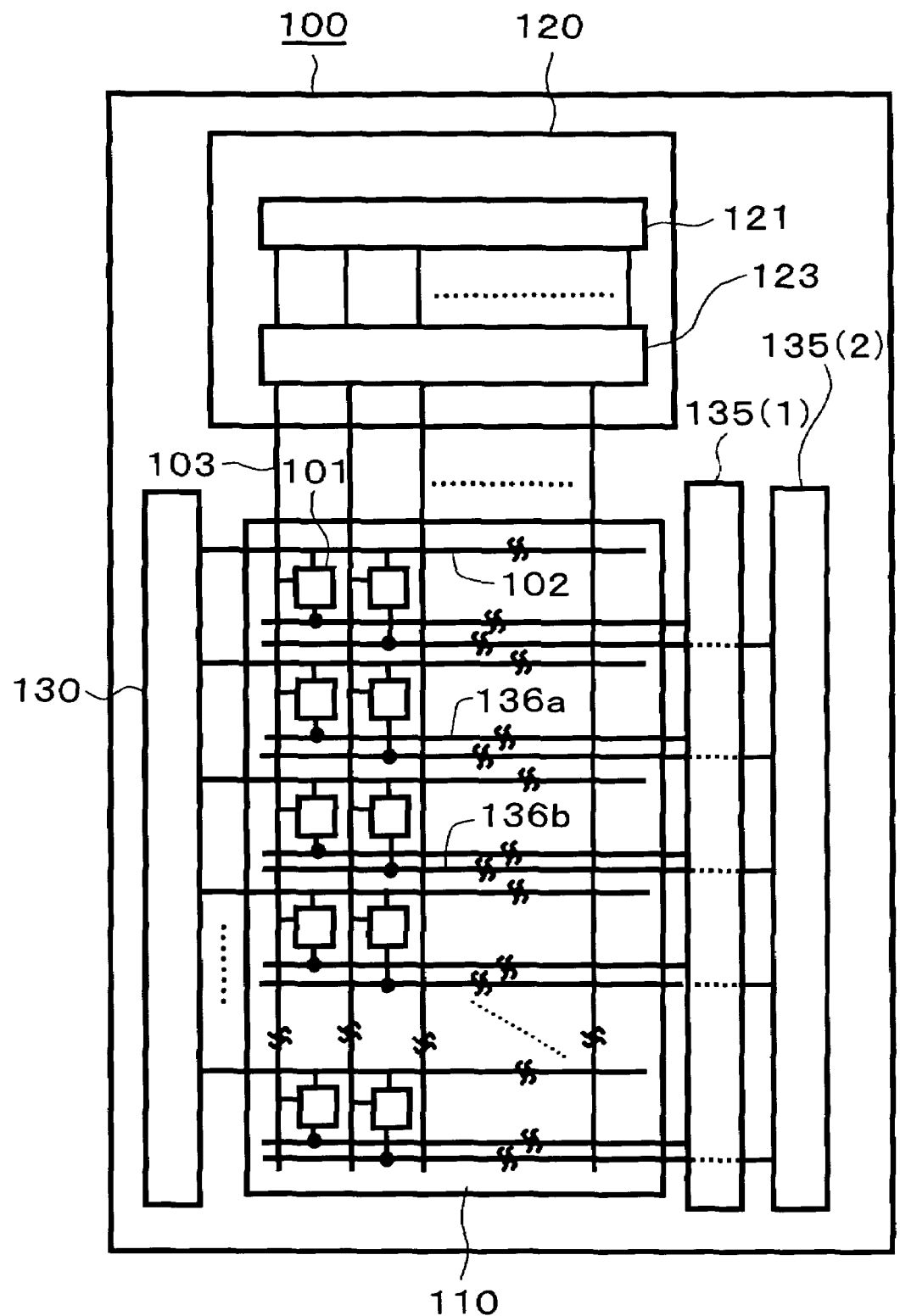
FIG. 20 is a schematic plan view showing the liquid crystal display device of the embodiment of the present invention.

Next, an embodiment in which the dot inversion driving is performed using the pixel potential control signal is explained in conjunction with FIG. 20. The liquid crystal display device 100 shown in FIG. 20 includes an odd-numbered-column pixel potential control circuit 135(1) and an even-numbered-column pixel potential control circuit 135(2). In the dot inversion driving, when the gray scale voltage of positive polarity is written in the pixel electrodes of one line, for example, the pixel electrodes in the odd-numbered column are driven as it is with the positive polarity, while the pixel electrodes in the even-numbered column are driven based on the AC driving using the pixel potential control signal. By providing the pixel potential control signal circuits for odd-numbered columns and even-numbered columns as shown in FIG. 20, it is possible to alternately output the pixel potential control signal thus realizing the dot inversion driving.

Subsequently, the reflection-type liquid crystal display device is explained. As one of operation principles of liquid crystal display element, there has been known an electrically controlled birefringence mode. This electrically controlled birefringence mode makes use of an birefringence effect which is generated attributed to phase difference between a normal light and an abnormal light of lights which pass through the liquid crystal layer. By applying a voltage between two electrodes which sandwich the liquid crystal layer therebetween, the molecular arrangement (orientation of optical axis) of the liquid crystal composition is changed and, eventually, the refractive index anisotropy is changed in the liquid crystal panel. The electrically controlled birefringence mode forms images by making use of the change of the refractive index anisotropy as the change of the optical transmittance.

Figure 21A:
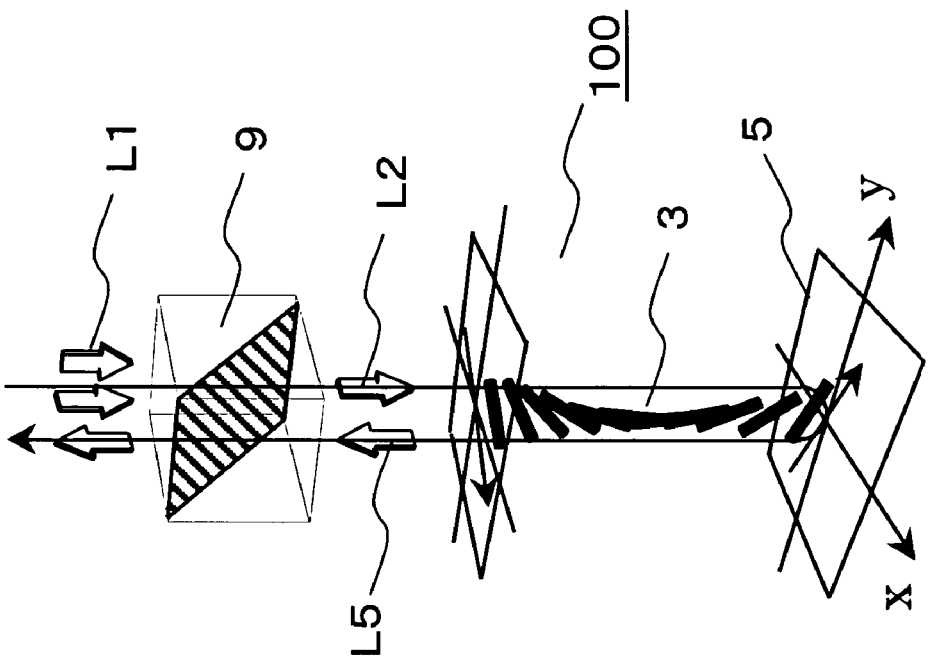
FIG. 21 is a schematic view showing the liquid crystal display device of the embodiment of the present invention.
Figure 21B:
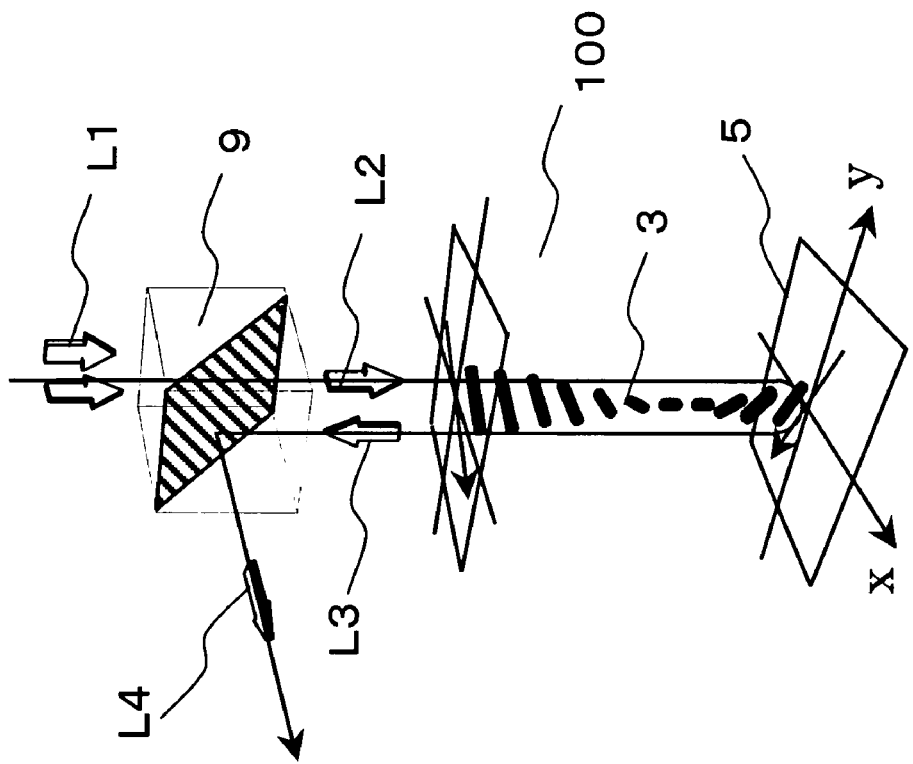

Further, using FIG. 21A and FIG. 21B, a single polarizer twist nematic mode (SPTN) which constitutes one of the electrically controlled birefringence modes is explained. Numeral 9 indicates a polarized beam splitter which divides an incident light L1 from a light source (not shown in the drawing) into two polarized lights and irradiates light L2 which is formed into linear polarized light. Although light (P wave) which penetrates the polarization beam splitter 9 is used as light to be incident on the liquid crystal panel 100 in FIG. 21A and FIG. 21B, it is possible to use light (S wave) which is reflected on the polarization beam splitter 9. The liquid crystal composition 3 has a long axis of liquid crystal molecules arranged parallel to a drive circuit substrate 1 and a transparent substrate 2 (homogeneous alignment) and adopts nematic liquid crystal having positive dielectric anisotropy. Further, the liquid crystal molecules are oriented in a state that they are twisted by approximately 90 degrees due to the orientation films 7, 8.

First of all, a case in which the voltage is not applied is shown in FIG. 21A. Light which is incident on the liquid crystal panel 100 is formed into an elliptical polarized light due to birefringence of the liquid crystal composition 3 and is formed into a circular polarized light on a surface of the reflection electrode 5. The light which is reflected on the reflection electrode 5 again passes the inside of the liquid crystal composition 3 and is formed into the elliptical polarized light again and returns to the linear polarized light at the time of irradiation and thereafter, is irradiated as the light L3 (S wave) whose phase is rotated by 90 degrees with respect to the incident light L2. Although the irradiated light L3 is again incident on the polarization beam splitter 9, the irradiated light L3 is reflected on the polarization surface and is formed into the irradiated light L4. This irradiated light L4 is radiated to a screen or the like for performing a display. In this case, a so-called normally white (normally open) display method is adopted in which light is radiated when the voltage is not applied.

To the contrary, a case in which the voltage is applied to the liquid crystal composition 3 is shown in FIG. 21B. When the voltage is applied to the liquid crystal composition 3, the liquid crystal molecules are arranged in the electric field direction and hence, a rate that the birefringence is generated in the liquid crystal is reduced. Accordingly, the light L2 incident on the liquid crystal panel 100 due to the linear polarization is directly reflected on the reflection electrode 5 and light L5 having the same polarization direction as incident light L2 is irradiated. The irradiation light L5 passes the polarization beam splitter 9 and returns to the light source. Accordingly, light is not irradiated to the screen or the like thus the black display is performed.

In the single polarizer twist nematic mode, the orientation direction of the liquid crystal is parallel to the substrate and hence, it is possible to use the general orientation method and favorable process stability is obtained. Further, to use the liquid crystal display device in the normally white mode, it is possible to have tolerance with respect to a defective display which occurs at the low voltage side. That is, in the normally white method, the dark level (black display) is obtained in a state that the high voltage is applied. In the case of this high voltage, most of the liquid crystal molecules are arranged in the electric field direction vertical to the substrate surface and hence, the display of dark level does not largely depend on the initial orientation direction at the time of low voltage. Further, human eyes recognize the brightness irregularities as the relative rate of brightness and has a reaction which approximates a logarithmic scale with respect to the brightness. Accordingly, human eyes are sensitive to the change of dark level. Due to such a reason, the normally white method is an advantageous display method for brightness irregularities attributed to the initial orientation state.

In the above-mentioned electric-field controlled birefringence mode, the high accuracy of cell gaps is required. That is, the electric-field controlled birefringence mode makes use of the phase difference between the abnormal light and the normal light which are generated during the period in which the light passes the inside of the liquid crystal and hence, the intensity of the transmitting light depends on the retardation $\Delta n \cdot d$ between the abnormal light and the normal light. Here, $\Delta n$ is the birefringence anisotropy and d is the cell gap between the transparent substrate 2 and the drive circuit substrate 1 formed by the spacers 4.

Accordingly, in this embodiment, the cell gap accuracy is set to a value equal to or less than $\pm 0.5$ μm by taking the display irregularities into consideration. Further, in the reflection-type liquid crystal display device, the light which is incident on the liquid crystal is reflected on the reflection electrodes and again passes the liquid crystal and hence, when the liquid crystal having the same birefringence anisotropy $\Delta n$ is used, the cell gap d is halved compared to the transmission-type liquid crystal display device. While the cell gap d is set to 5 to 6 μm with respect to the generally available transmission type liquid crystal display element, the cell gap d is approximately 2 μm in this embodiment.

In this embodiment, to cope with the demand for higher cell gap accuracy and narrower cell gap, a method which forms columnar spacers on the drive circuit substrate 1 in place of a conventional bead scattering method is adopted.

Figure 22:
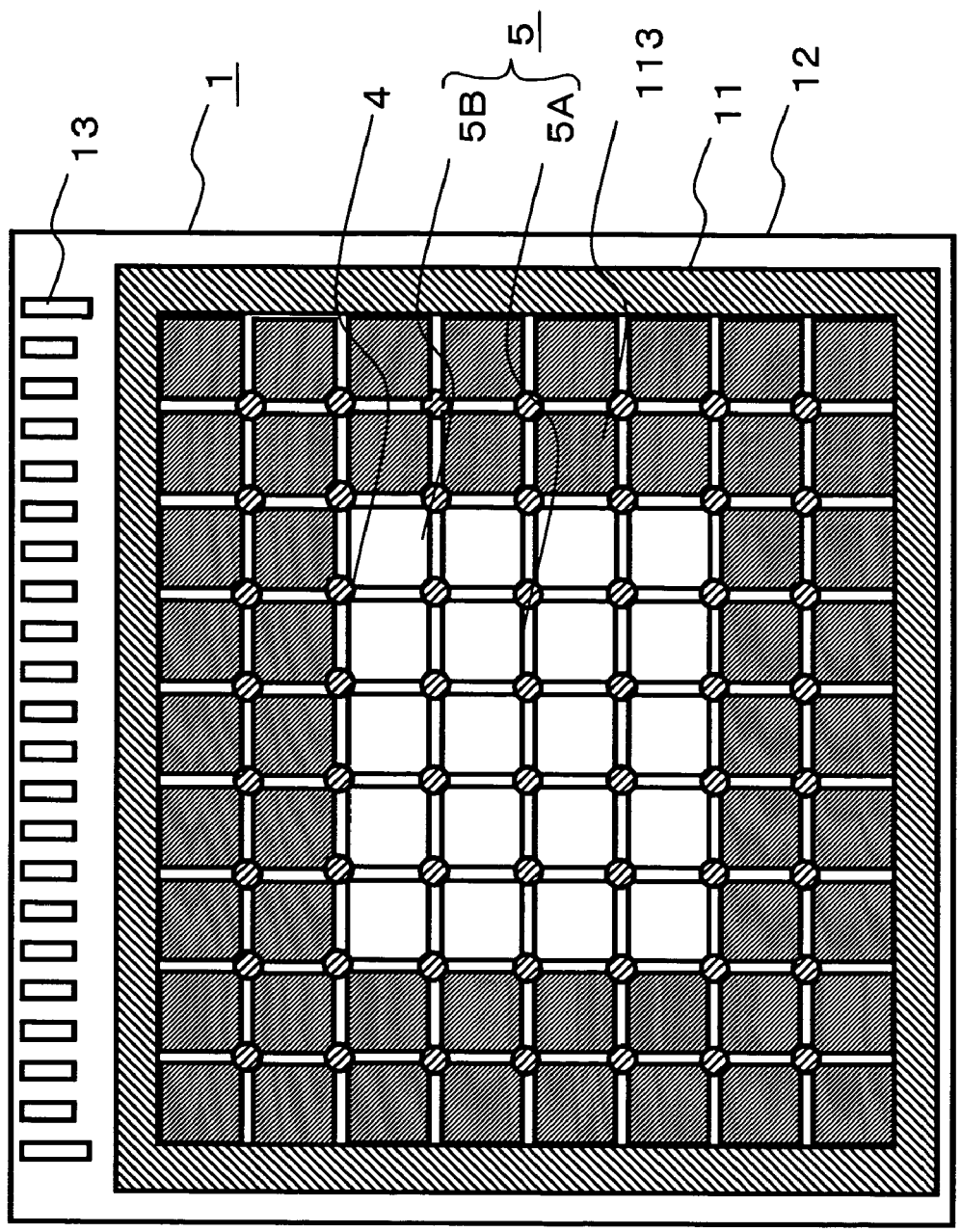
FIG. 22 is a schematic plan view showing the liquid crystal panel of the liquid crystal display device of the embodiment of the present invention.

FIG. 22 is a schematic plan view for explaining the arrangement of the reflection electrodes 5 and the spacers 4 mounted on the drive circuit substrate 1. A large number of spacers 4 are formed in a matrix array on the whole surface of the drive circuit substrate to hold the fixed distance or gap. The reflection electrode 5 is a minimum pixel of an image which the liquid crystal display element forms. In FIG. 22, for the sake of brevity, four pixels are shown in the longitudinal direction and five pixels are shown in the lateral direction by symbols 5A, 5B.

In FIG. 22, the pixels which are arranged in a matrix formed of four pixels in the longitudinal direction and five pixels in the lateral direction form the display region. An image to be displayed by the liquid crystal display element is formed on this display region. Outside the display region, dummy pixels 113 are provided. A peripheral frame 11 which is formed of the same material as the spacers 4 is provided to the periphery of the dummy pixels 113. Further, to the outside the peripheral frame 11, a sealing material 12 is applied. Numeral 13 indicates an external connection terminal which is served for supplying external signals to the liquid crystal panel 100.

A resin material is used as a material of the spacers 4 and the peripheral frame 11. To an upper surface of the drive circuit substrate 1 on which the reflection electrodes 5 are formed, a resist material is applied by a spin coating method or the like and the resist is exposed into a pattern of the spacers 4 and the peripheral frame 11 using a mask. Thereafter, the resist is developed using a removing agent so as to form the spacers 4 and the peripheral frame 11.

By forming the spacers 4 and the peripheral frame 11 using the resist material or the like as the raw material, it is possible to control the height of the spacers 4 and the peripheral frame 11 by adjusting a film thickness of the applying material so that the spacers 4 and the peripheral frame 11 can be formed with high accuracy. Further, positions of the spacers 4 can be determined using the mask pattern and hence, it is possible to accurately mount the spacers 4 at desired positions. In a liquid crystal projector, when the spacers 4 are present on the pixels, there may arise a drawback that shadows attributed to the spacers may appear in an enlarged projected image. By forming the spacers 4 by exposure and developing using the mask pattern, it is possible to mount the spacers 4 at positions which do not cause such a drawback when the image is displayed.

Further, since the peripheral frame 11 is simultaneously formed with the spacers 4, as a method for filling the liquid crystal composition 3 into a space defined between the drive circuit substrate 1 and the transparent substrate 2, a method in which the liquid crystal composition 3 is dropped onto the drive circuit substrate 1 and, thereafter, the transparent substrate 2 is laminated to the drive circuit substrate 1 can be used.

After arranging the liquid crystal composition 3 between the drive circuit substrate 1 and the transparent substrate 2 and assembling the liquid crystal panel 100, the liquid crystal composition 3 is held in a region surrounded by the peripheral frame 11. Further, a sealing material 12 is applied to the outside of the peripheral frame 11 and hence, the liquid crystal composition 3 is sealed in the inside of the liquid crystal panel 100. As mentioned previously, since the peripheral frame 11 is formed using the mask pattern, it is possible to form the peripheral frame 11 on the drive circuit substrate 1 with high accuracy. Accordingly, it is possible to define the boundary of the liquid crystal composition 3 with high accuracy. Further, with the use of the peripheral frame 11, it is possible to define a boundary of the region in which the sealing material 12 is formed with high accuracy.

The sealing material 12 has a role of fixing the drive circuit substrate 1 and the transparent substrate 2 as well as a role of preventing the intrusion of substances harmful to the liquid crystal composition 3. When applying the sealing material 12 having fluidity, the peripheral frame 11 performs a role of stopper for the sealing material 12. By providing the peripheral frame 11 as the stopper for the sealing material 12, it is possible to ensure the sufficient design tolerance with respect to the boundary of the liquid crystal composition 3 and the boundary of the sealing material 12 so that it is possible to narrow a distance between a peripheral side to the display region of the liquid crystal panel 100 (narrowing of picture frame).

The dummy pixels 113 are arranged between the peripheral frame 11 and the display region. Further, since the peripheral frame 11 is formed such that the peripheral frame 11 surrounds the display region, at the time of applying the rubbing treatment to the drive circuit substrate 1, there arises a drawback that it is difficult to perform rubbing of the vicinity of the peripheral frame 11 due to the presence of the peripheral frame 11. To orient the liquid crystal composition 3 in a fixed direction, an orientation film is formed and the rubbing treatment is applied to the orientation film. In this embodiment, after forming the spacers 4 and the peripheral frame 11 on the drive circuit substrate 1, the orientation film 7 is applied. Thereafter, the rubbing treatment is performed such that the orientation film 7 is rubbed with a cloth to orient the liquid crystal composition 3 in the fixed direction.

In the rubbing treatment, since the peripheral frame 11 is projected from the drive circuit substrate 1, the orientation film 7 in the vicinity of the peripheral frame 11 is not sufficiently rubbed due to stepped portions formed by the peripheral frames 11. Accordingly, portions where the orientation of the liquid crystal composition 3 is not uniform are liable to be formed in the vicinity of the peripheral frame 11. Accordingly, to make the display irregularities attributed to the orientation defect of the liquid crystal composition 3 less apparent, several pixels arranged along the inner side of the peripheral frame 11 are formed as the dummy pixels 113 thus forming pixels which do not contribute to the display.

However, when the dummy pixels 113 are formed and the signals are supplied to the dummy pixels 113 in the same manner as the pixels 5A, 5B, since the liquid crystal composition 3 is present between the dummy pixels 113 and the transparent substrate 2, there arises a drawback that the display by the dummy pixels 113 is also observed. In using the liquid crystal display device in the normally white mode, when the voltage is not applied to the liquid crystal composition 3, the dummy pixels 113 are displayed in white. Accordingly, the boundary of the display region becomes indefinite and hence, the display quality is degraded. Although it may be considered to provide light shielding to the dummy pixels 113, since the gap between the pixels is several m, it is difficult to form light shielding frames on the boundary of the display region with high accuracy. Accordingly, in this embodiment, the voltage is applied to the dummy pixels 113 such that the dummy pixels 113 perform the black display whereby a black frame which surrounds the display region is observed.

Figure 23:
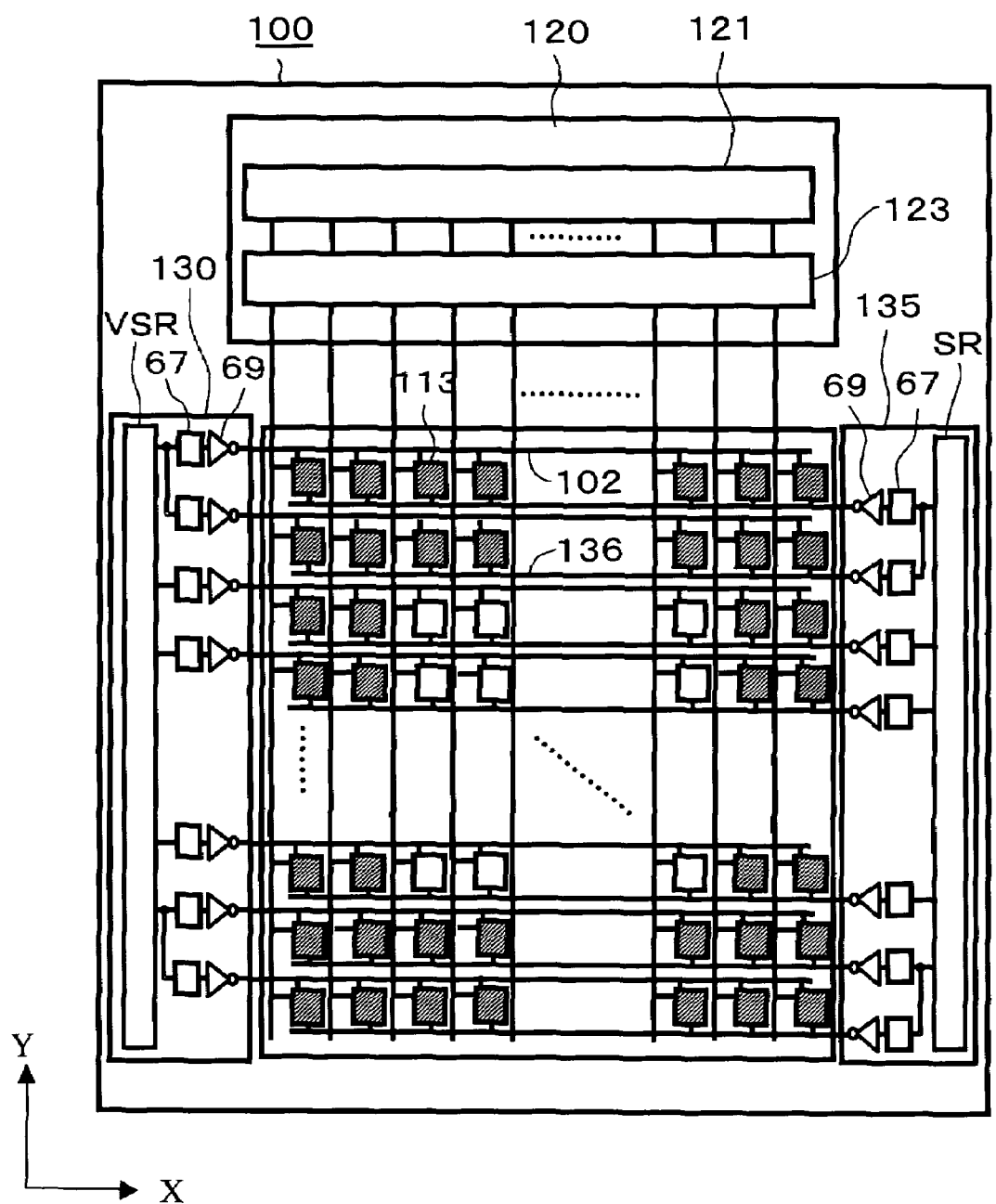
FIG. 23 is a schematic circuit diagram showing the liquid crystal display device of the embodiment of the present invention.

The method for driving the dummy pixels 113 is explained in conjunction with FIG. 23. To apply the voltage which makes the dummy pixels 113 perform the black display, the region where the dummy pixels 113 are provided is formed into a black display over the entire surface thereof. When the entire surface is turned into the black display, it is unnecessary to individually form the dummy pixels as in the case of the pixels formed in the display region. That is, it is possible to form an integral pixel by electrically connecting a plurality of dummy pixels. Further, to consider the time necessary for driving, it is wasteful to provide writing time for respective dummy pixels. Accordingly, it is possible to form one dummy pixel electrode by continuously forming electrodes of a plurality of dummy electrodes. However, when one dummy pixel is formed by connecting a plurality of dummy pixels, the area of pixel electrode is increased and hence, the liquid crystal capacitance is increased. As mentioned previously, when the liquid crystal capacitance is increased, the efficiency of lowering the pixel voltage using the pixel capacitance is deteriorated.

Accordingly, the dummy pixels are formed individually in the same manner as the pixels of the display region. However, when writing is performed for every one line in the same manner as the effective pixels, time necessary for driving a plural rows of newly provided dummy pixels is prolonged and hence, there arises a problem that time for performing writing in the effective pixels becomes short. To the contrary, in performing the display of high definition, since the fast video signals (signal having high dot clock) are inputted, the restriction on the writing time of the pixels is generated.

Accordingly, to save the writing time for several lines during the writing time of one screen, as shown in FIG. 23, with respect to the dummy pixels, timing signals for a plurality of rows are outputted from the vertical double-way shift register VSR of the vertical drive circuit 130 and are inputted to a plurality of level shifters 67 and an output circuit 69 so as to make the output circuit 69 output the scanning signals. Further, the timing signals for a plurality of rows are also outputted to the pixel voltage control circuit 135 from the double-way shift register SR in the same manner and are inputted to a plurality of level shifters 67 and the output circuit 69 so as to make the pixel voltage control circuit 135 output the pixel voltage control signals.

Figure 24:
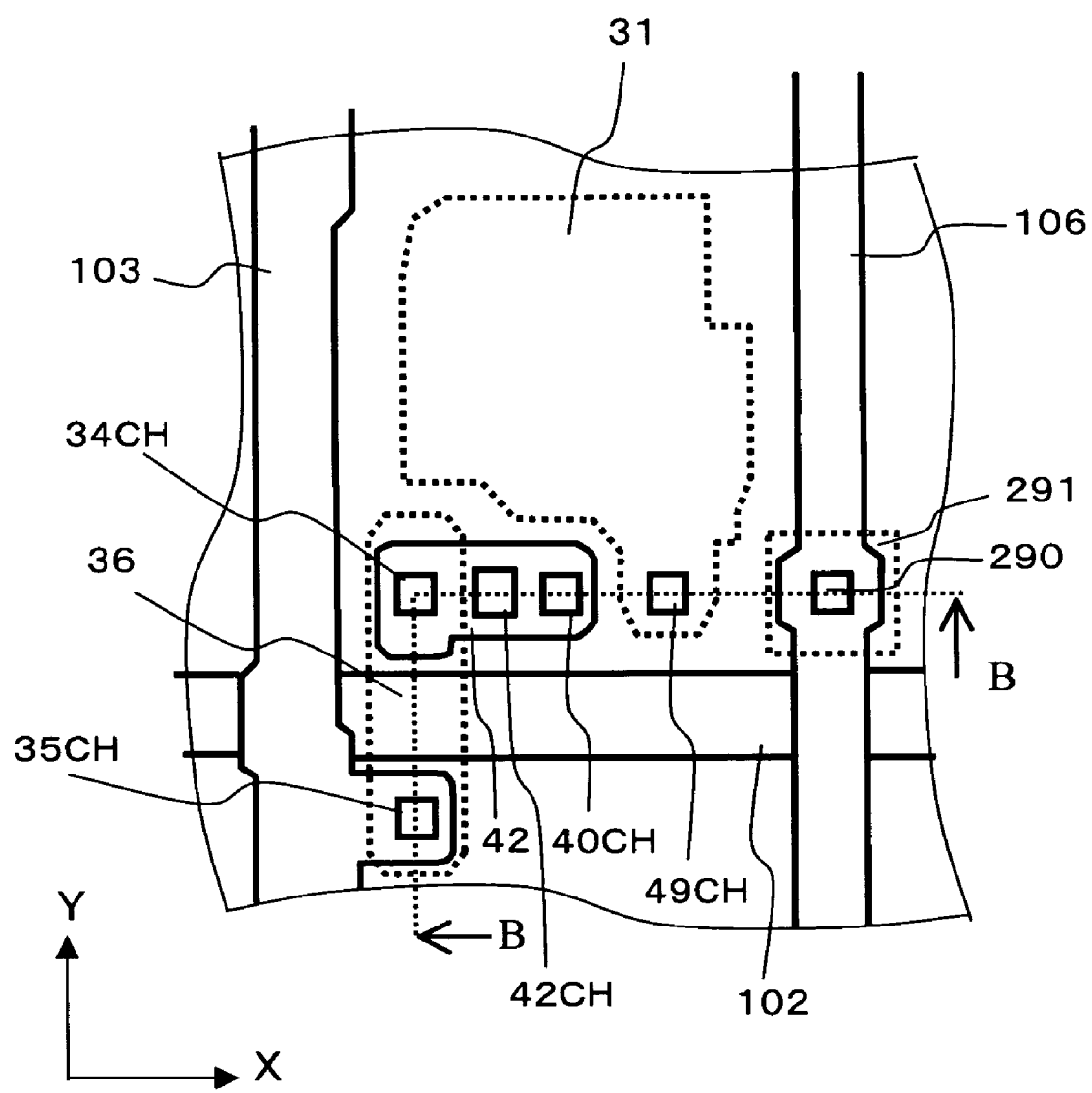
FIG. 24 is a schematic plan view of a periphery of an active element of the liquid crystal display device of the present invention.
Figure 25:
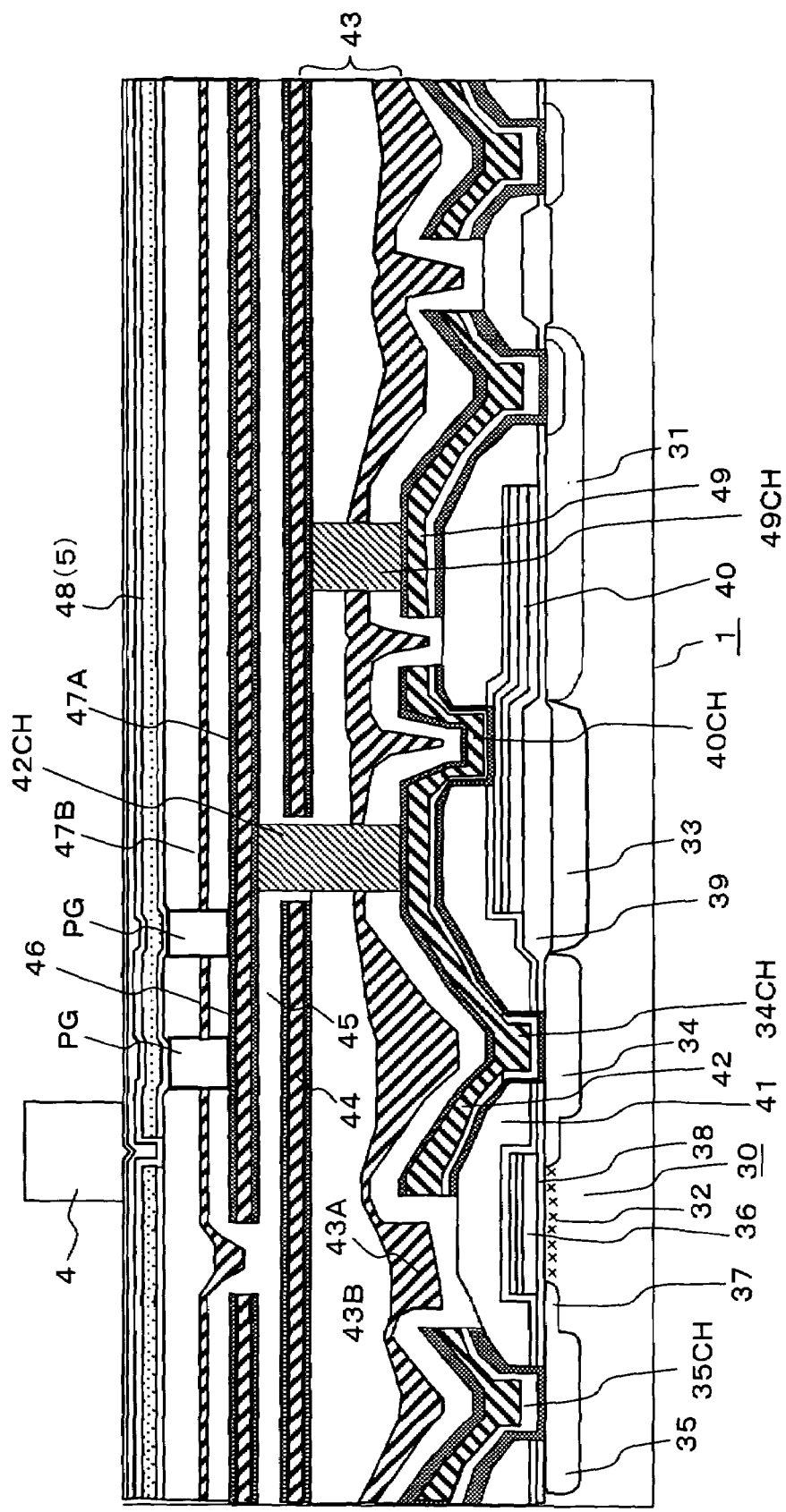
FIG. 25 is a schematic cross-sectional view of a periphery of an active element of the liquid crystal display device of the present invention.

Then, the constitution of the active element 30 formed on the drive circuit substrate 1 and the periphery thereof is explained in conjunction with FIG. 24 and FIG. 25. Symbols in FIG. 24 and FIG. 25 which are equal to symbols used in FIG. 5 have the identical constitution. Here, FIG. 24 is a schematic plan view showing the periphery of the active element 30 and FIG. 25 is a cross-sectional view taken along a line B-B in FIG. 24. However, it must be noted that FIG. 24 and FIG. 25 do not coincide with each other with respect to the distance between respective constitutions. Further, FIG. 25 is provided for showing the positional relationship among a scanning signal line 102, a gate electrode 36, a video signal line 103, a source region 35, a drain region 34, a first electrode 31 forming pixel capacitance, a first conductive layer 42, and contact holes 35CH, 34CH, 40CH, 42CH, 49CH, 290. Other constitutions are omitted from the drawing.

In FIG. 24, numeral 102 indicates a scanning signal line. In FIG. 24, the scanning signal lines 102 extend in the X direction and are arranged in parallel in the Y direction. Scanning signals which turn on/off the active element 30 are supplied to the scanning signal lines 102. As shown in FIG. 25, the scanning signal line 102 is formed of a two-layered film in the same manner as the gate electrode. For example, a two-layered film which is formed by laminating a polysilicon and tungsten silicide can be used. In FIG. 24, video signal lines 103 extend in the Y direction and are arranged in parallel in the X direction. Video signals which are written in the reflection electrodes 5 are supplied to the video signal lines 103. The video signal line 103 is formed of a multi-layered metal film in the same manner as the first conductive film 42. For example, a multi-layered metal film made of titanium tungsten and aluminum can be used.

The video signals pass the contact hole 35CH formed in the insulation film 38 and the first interlayer film 41 and are transmitted to the drain region 35 via the first conductive film 42. When the scanning signals are supplied to the scanning signal lines 102, the active elements 30 are turned on and the video signals are transmitted from the semiconductor region (Φp-type well) 32 to the source region 34, and then, are transmitted to the first conductive film 42 via the contact hole 34CH. The video signals transmitted to the first conductive film 42 are transmitted to the second electrode 40 having the pixel capacitance via the contact hole 40CH.

In FIG. 25, numeral 1 indicates a silicon substrate which constitutes a drive circuit substrate, numeral 32 indicates an impurity region formed on a surface of the silicon substrate 1 by ion implantation, and numeral 30 indicates the p-type MIS transistor in a depletion mode as mentioned previously. Numeral 33 indicates a channel stopper, numeral 34 indicates a drain region which is formed in the p-type well 32 and is made conductive by ion implantation, numeral 35 indicates a source region which is formed in the p-type well 32 by ion implantation, and numeral 31 indicates a first electrode having pixel capacitance which is formed in the p-type well 32 and is made conductive by ion implantation. The first electrode 31 is a p-type impurity region which is formed by ion implantation of boron (B) or the like and forms a capacitor in a depletion mode. Here, although the active element 30 is constituted of a p-type transistor in this embodiment, the MIS transistor 30 may be formed of an n-type transistor.

Further, in these drawings, numeral 36 indicates the gate electrode, numeral 37 indicates an offset region which attenuates the intensity of electric field of an end portion of the gate electrode, numeral 38 indicates an insulation film, numeral 39 indicates a field oxide film which electrically separates between transistors, and numeral 40 indicates a second electrode which forms the pixel capacitance and forms the capacitance between the first electrode 21 formed on the silicon substrate 1 and the second electrode 40 by way of an insulation film 38. The gate electrode 36 and the second electrode 40 are formed of a two-layered film consisting of a conductive layer which is formed on the insulation layer 38 for lowering a threshold value of the active element 30 and a conductive layer having low resistance. As the two-layered film, it is possible to use a film made of polysilicon and tungsten silicide, for example. Numeral 41 indicates a first interlayer film and numeral 42 indicates a first conductive film. The first conductive film 42 is formed of a multi-layered film including a barrier metal which prevents contact failure and a conductive film having low resistance. As the first conductive film, for example, it is possible to use the multi-layered metal film made of titanium tungsten and aluminum which is formed by sputtering.

Further, as shown in FIG. 24, the video signals pass the interlayer contact portion 42CH and are transmitted to the reflection electrode 5. The interlayer contact portion 42CH is formed over the field oxide film 39. Since the field oxide film 39 has a large film thickness, an upper surface of the field oxide film 39 is positioned at a high level compared to other constitutions. By forming the interlayer contact hole 42CH over the field oxide film 39, it is possible to provide the interlayer contact portion 42CH at a position closer to the conductive film which constitutes an upper layer so that a length of a connection portion of the interlayer contact portion 42CH can be shortened. Here, FIG. 24 shows a case in which the interlayer contact portion 42CH is formed of a plug. The interlayer contact portion 42CH may be formed of a contact hole in the same manner as FIG. 5.

The second interlayer film 43 is insulated from the first conductive film 42 and the second conductive film 44. The second interlayer film 43 has a two-layered structure consisting of a leveling film 43A which embeds the surface irregularities formed by various constitutional elements and an insulation film 43B which covers the leveling film 43A. The leveling film 43A is formed by applying SOG (spin on glass). The insulation film 43B is a TEOS film which is a SiO2 film formed by CVD using TEOS (Tetraethylorthosilicate) as a reaction gas.

After forming the second interlayer film 43, the second interlayer film 43 is polished by CMP (Chemical Mechanical Polishing). Being polished by CMP, the second interlayer film 43 is leveled or smoothed. The first light shielding film 44 is formed on the leveled second interlayer film 42. The first light shielding film 44 is formed of a multi-layered metal film made of tungsten and aluminum in the same manner as the first conductive film 42.

The first light shielding film 44 covers substantially the whole surface of the drive circuit substrate 1 and an opening is merely constituted of the portion of interlayer contact portion 42CH shown in FIG. 25. On the first light shielding film 44, the third interlayer film 45 made of a TEOS film is formed. The second light shielding film 46 which is formed of a multi-layered film made of tungsten and aluminum in the same manner as the first conductive film 42 is formed on the third interlayer film 45. The second light shielding film 46 is connected to the first conductive film 42 via the interlayer contact portion 42CH. In the interlayer contact portion 42CH, to establish the connection, a metal film which constitutes the first light shielding film 44 and a metal film which constitutes the second light shielding film 46 are laminated to each other.

The first light shielding film 44 and the second light shielding film 46 are formed of a conductive film. By forming the third interlayer film 45 made of an insulation film (a dielectric film) between the first light shielding film 44 and the second light shielding film 46, by supplying the pixel potential control signal to the first light shielding film 44, and by supplying the gray scale voltage to the second light shielding film 46, it is possible to form the pixel capacitance by the first light shielding film 44 and the second light shielding film 46. Further, to take the dielectric strength of the third interlayer film 45 with respect to the gray scale voltage and the increase of capacitance by decreasing the film thickness of the third interlayer film 45 into consideration, the film thickness of the third interlayer film 45 is preferably 150 nm to 450 nm and, more preferably approximately 300 nm.

The connection between the second light shielding film 46 and the second conductive film 48 is established using a plug PG. The plug PG is formed by forming a through hole in the fourth interlayer film 47 and by filling the through hole with tungsten or the like. Accordingly, compared to the contact hole or the like, the surface irregularities of the film (reflection electrode 5) which is formed over the plug PG are reduced and hence, it is possible to form the reflection electrode 5 using a flat film. Since the surface irregularities of the reflection electrode 5 reduce the reflectance of the liquid crystal panel 100, conventionally, a contact hole which is served for connecting the reflection electrode 5 (second conductive film 48) and a layer below the reflection electrode 5 is formed such that one contact hole is formed for each pixel. However, by connecting the second light shielding film 46 and the second conductive film 48 (reflection electrode 5) using the plug PG, since the reflection electrode 5 above the plug PG is relatively flat, it is possible to form a plurality of plugs PG for each pixel.

Figure 26:
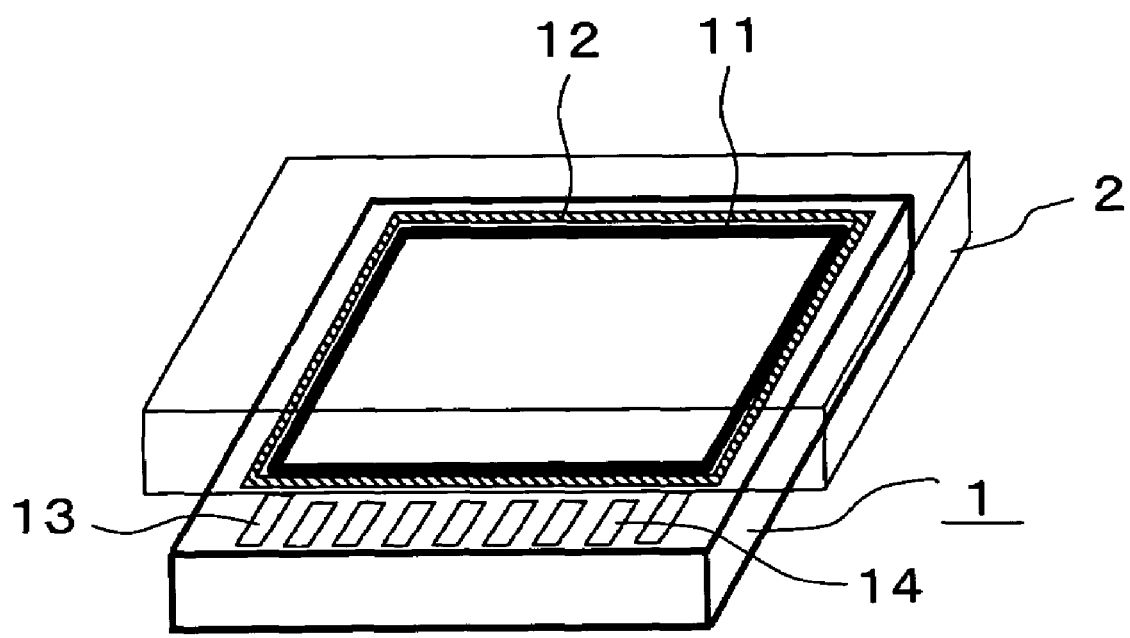
FIG. 26 is a schematic view showing the liquid crystal panel of the liquid crystal display device of the embodiment of the present invention.

Then, FIG. 26 shows a state in which the transparent substrate 2 is overlapped to the drive circuit substrate 1. On a peripheral portion of the drive circuit substrate 1, the peripheral frame 11 is formed. The liquid crystal composition 3 is held in a space surrounded by the peripheral frame 11, the drive circuit substrate 1 and the transparent substrate 2. Between the overlapped drive circuit substrate 1 and the transparent substrate 2 and outside the peripheral frame 11, a sealing material 12 is applied. By fixing the drive circuit substrate 1 and the transparent substrate 2 by adhesion using the sealing material 12, the liquid crystal panel 100 is formed. Numeral 13 indicates external connection terminals.

Figure 27A:
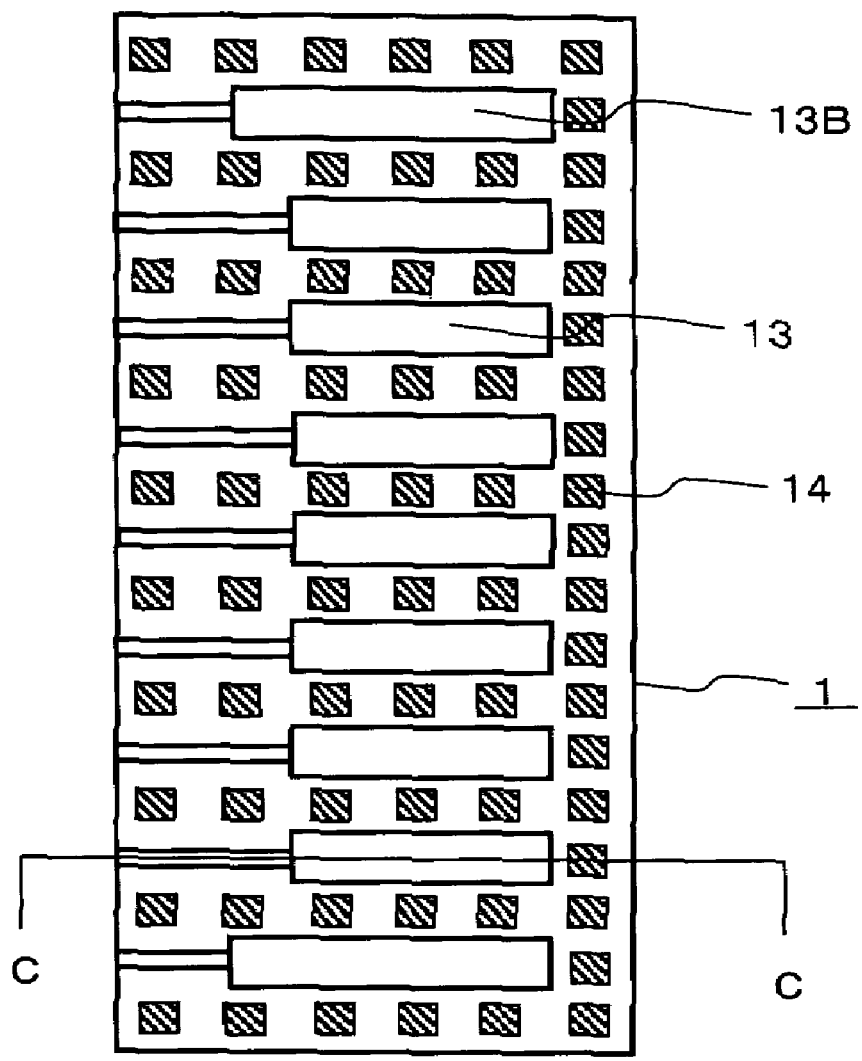
Figure 27B:
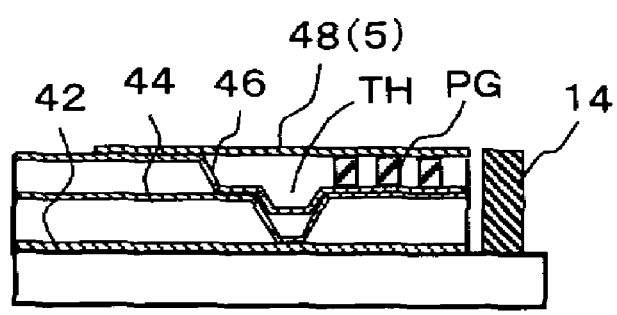

FIG. 27A and FIG. 27B schematically show the external connection terminals 13 in an enlarged form. FIG. 27A is a plan view and FIG. 27B is a cross-sectional view taken along a line C-C in FIG. 27A. In the drawing, numeral 13B indicates an external connection terminal which is formed longer than other terminals for facilitating the positioning at the time of connection. Further, numeral 14 indicates a dummy pattern which is formed in the periphery of the external connection terminals 13. In the inside of the drive circuit substrate 1, for preventing short-circuiting at the time of connecting between external connection terminals 13, the constitution other than the external connection terminal 13 is not provided. Accordingly, the pattern density is dense compared to other region in the drive circuit substrate 1. Portions where the pattern density is coarse give rise to a drawback that a polishing quantity of interlayer film is increased compared to other regions. Accordingly, the dummy pattern is provided in the periphery of the external connection terminals 13 so that the pattern density can be made uniform and thin and uniform films can be formed by polishing.

The conductive film which constitutes the terminal is, as shown in FIG. 27B, formed by laminating the first conductive film 42, the first light shielding film 44, the second light shielding film 46 and the second conductive film 48 (metal film forming the reflection electrode 5). The connection between the second light shielding film 46 and the second conductive film 48 at the connection portion is established using the plug PG in the same manner as the pixel portions.

With the use of the plug PG, it is possible to form the external connection terminals 13 in a relatively flat shape. Further, since the plug PG can be formed in close contact with them using metal such as tungsten or the like, even when conductive particles of the anisotropic conductive film penetrate the second conductive film 48 because of small thickness of the second conductive film 48, the conductive particles are brought into contact with the plug PG such that the conductive particles are embedded into the plug PG whereby the reliability of electric connection is ensured.

Figure 28:
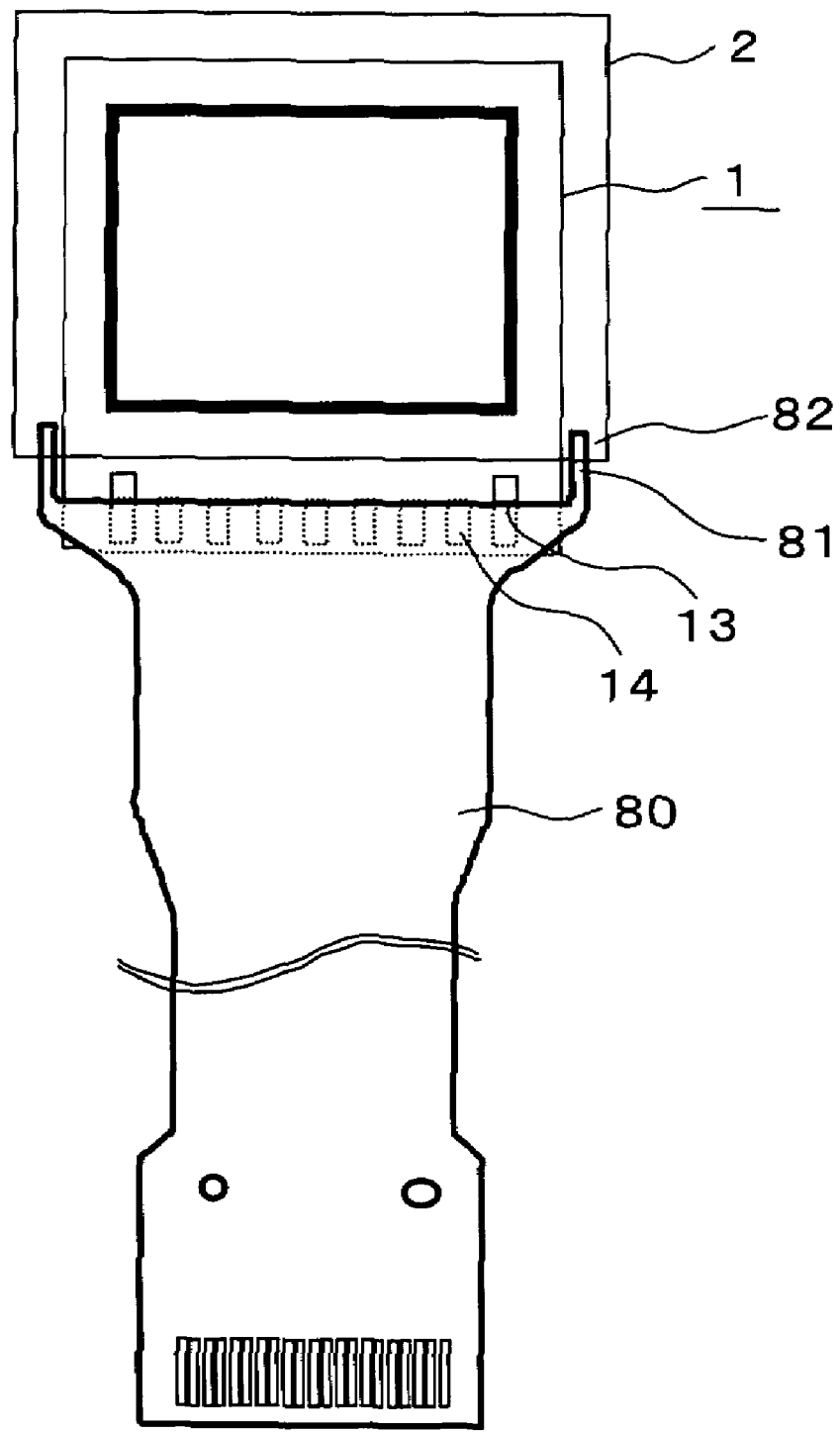
FIG. 28 is a schematic view showing a state in which a flexible printed circuit board is connected to the liquid crystal panel of a liquid crystal display device of the embodiment of the present invention.

Next, the manner in which the flexible printed circuit board 80 is connected is shown in FIG. 28. The flexible printed circuit board 80 is provided for supplying signals from the outside to the liquid crystal panel 100. As mentioned previously, the flexible printed circuit board 80 is connected to the external connection terminals 13 using an anisotropic conductive film (not shown in the drawing). Terminals of the flexible printed circuit board 80 which are positioned at both outer sides thereof are formed relatively long compared to other terminals and are connected to the counter electrodes 5 formed on the transparent substrate 2 thus forming terminals 81 for counter electrodes. That is, the flexible printed circuit board 80 is connected to both of the drive circuit substrate 1 and the transparent substrate 2.

Conventional wiring to the counter electrodes 5 is performed by connecting a flexible printed wiring board to external connection terminals formed on the drive circuit substrate 1 and hence, the flexible printed wiring board is connected to the counter electrodes 5 via the drive circuit substrate 1. To the transparent substrate 2 of this embodiment, the connection portion 82 with the flexible printed circuit board 80 is provided and hence, the flexible printed circuit board 80 and the counter electrodes 5 are directly connected to each other. That is, although the liquid crystal panel 100 is formed by overlapping the transparent substrate 2 and the drive circuit substrate 1, a portion of the transparent substrate 2 is projected outside of the drive circuit substrate 1 thus forming the connection portion 82 and the counter electrodes 5 and the flexible printed circuit board 80 are connected to each other at this projected portion of the transparent substrate 2.

Figure 29:
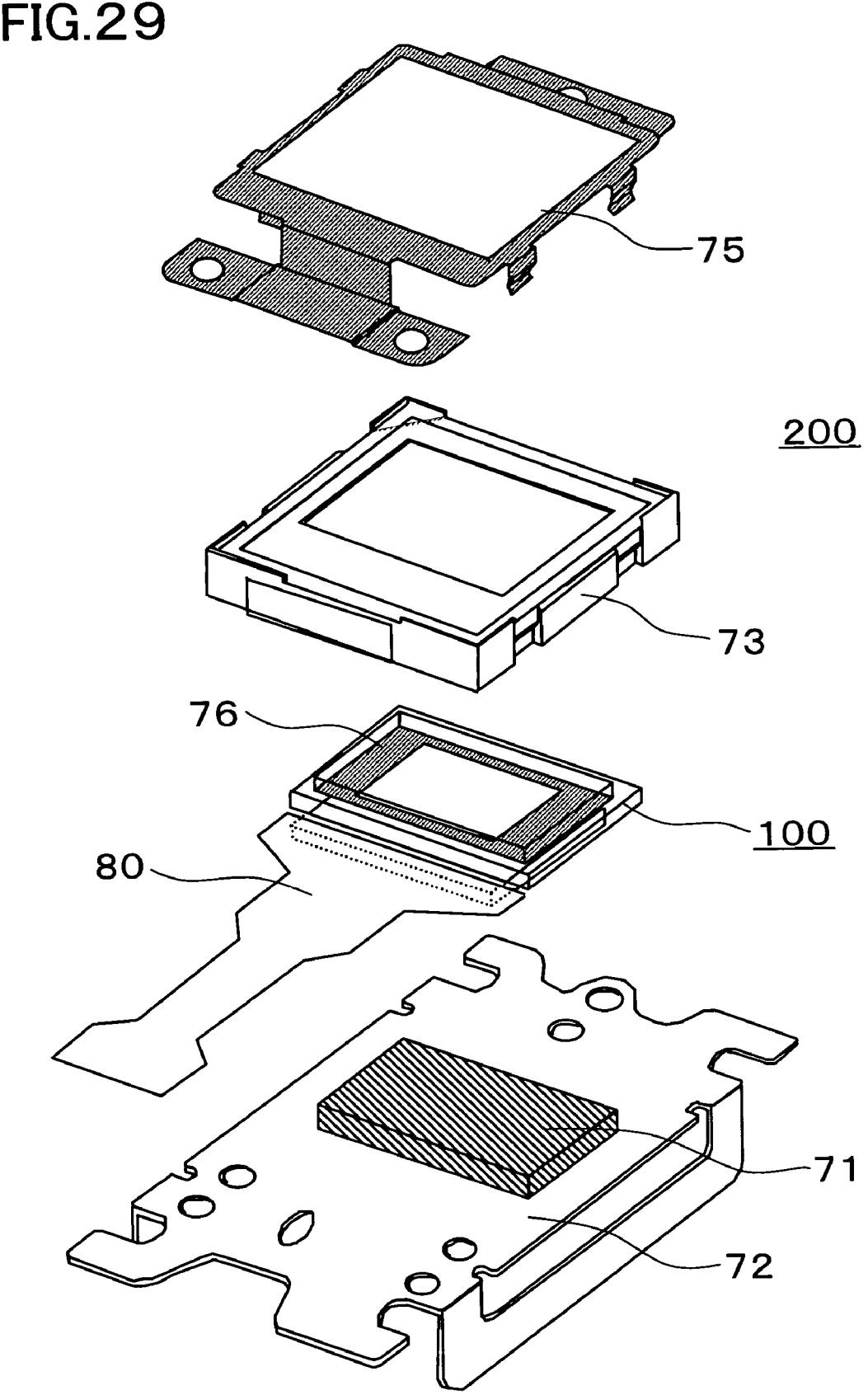
FIG. 29 is a schematic assembled view showing a liquid crystal display device of the embodiment of the present invention.
Figure 30:
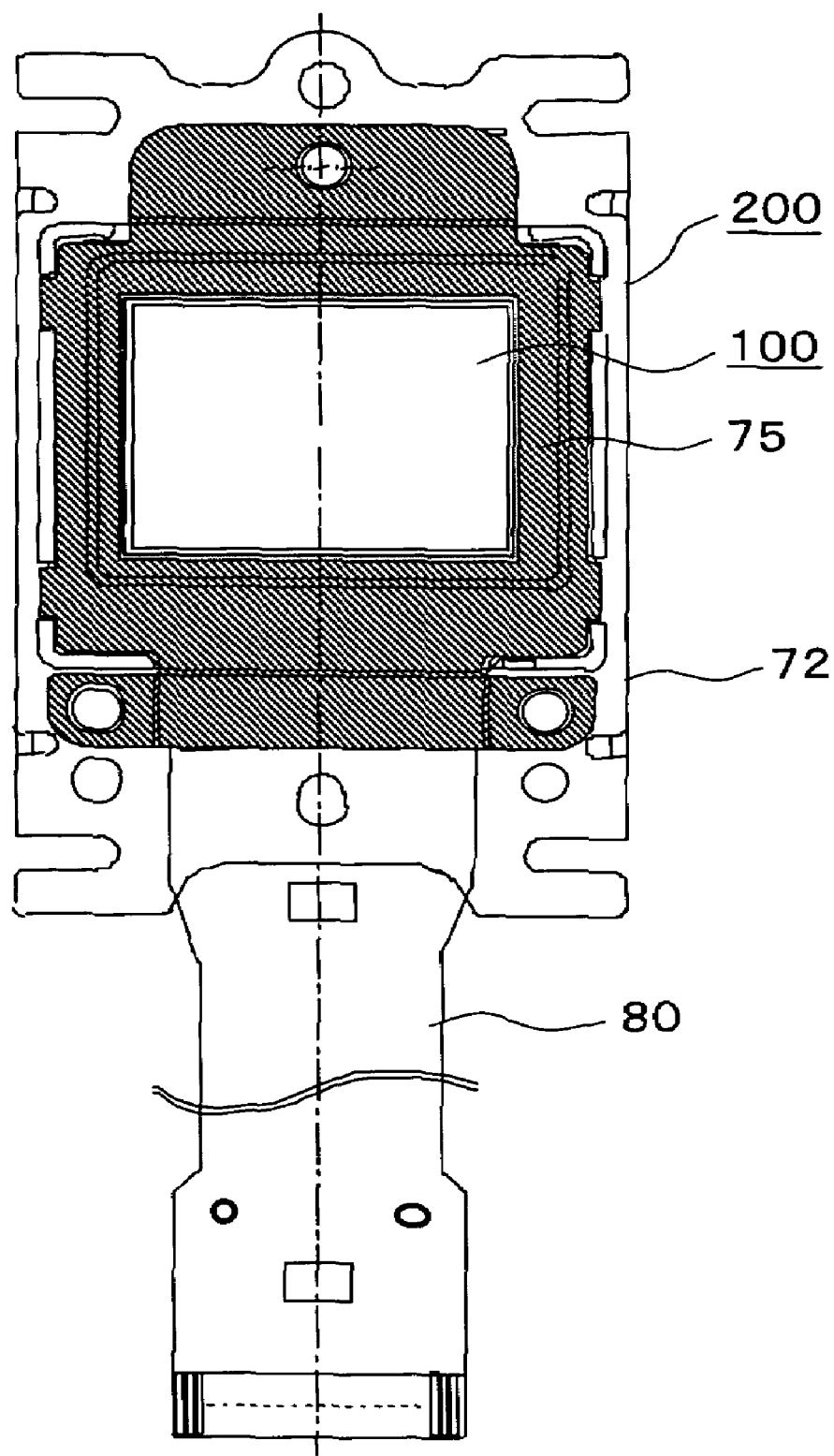
FIG. 30 is a schematic plan view showing a liquid crystal display device of the embodiment of the present invention.

FIG. 29 and FIG. 30 show the constitution of the liquid crystal display device 200. FIG. 29 is an exploded assembly view of respective constitutional parts or components which constitute the liquid crystal display device 200. Further, FIG. 30 is a plan view of the liquid crystal display device 200.

As shown in FIG. 29, the liquid crystal panel 100 to which the flexible printed circuit board 80 is connected is arranged on a radiator plate 72 while sandwiching a cushion material 71 therebetween. The cushion material 71 has high thermal conductivity and fills a gap defined between the radiator plate 72 and the liquid crystal panel 100 so as to play a role of facilitating the transfer of heat of the liquid crystal panel 100 to the radiator plate 72. Numeral 73 indicates a mold which is fixed to the radiator plate 72 by adhesion. Numeral 76 indicates a light shielding frame and displays an outer frame of the display region of the liquid crystal display device 200.

Further, as shown in FIG. 30, the flexible printed circuit board 80 passes through between the mold 73 and the radiator plate 72 and is pulled out to the outside of the mold 73. Numeral 75 indicates a light shielding plate and prevents light emitted from light source from being radiated to other parts which constitute the liquid crystal display device 200.

Although the inventions made by the inventors have been specifically explained in conjunction with the above-mentioned embodiments, it is needless to say that the present inventions are not limited to the above-mentioned embodiments and various modifications can be made without departing from the gist of the present invention.

What is claimed is:

1. A liquid crystal display device comprising:
a first substrate;
a second substrate;
a liquid crystal composition sandwiched between the first substrate and the second substrate;
a display region formed above the first substrate;
a plurality of pixel regions formed above the display region in a matrix array;
a plurality of pixel electrodes formed above the pixel regions;
a plurality of switching elements which supply video signals to the pixel electrodes;
a plurality of video signal lines which supply video signals to switching elements;
a plurality of scanning signal lines which supply scanning signals for controlling the switching elements;
a video signal circuit which outputs the video signals to the video signal lines;
a scanning signal circuit which outputs the scanning signals to the scanning signal lines;
a first substrate voltage supply line which is formed in a same layer as the video signal lines, is formed above a periphery of a display part, and supplies a substrate voltage to the first substrate; and
a second substrate voltage supply line which is formed in the same layer as the video signal lines, is formed in parallel to the video signal lines, and supplies a substrate voltage to the first substrate in the pixel regions;
wherein the switching elements make a electrically connection of the pixel electrodes and the video signal lines to each other when an output signal from the scanning signal circuit is stopped;
wherein a plurality of connection lines are provided between the video signal circuit and video signal lines and are formed in a different layer from the layer of the video signal lines; and
wherein the connection lines intersect the first substrate voltage supply line which is formed in the same layer as the video signal lines.

2. A liquid crystal display device according to claim 1, wherein the second substrate voltage supply line supplies the substrate voltage to the first substrate on the pixel region via a contact hole formed in the pixel region.

3. A liquid crystal display device according to claim 1, wherein the first substrate is a silicon substrate and the substrate voltage is supplied to the first substrate via an impurity region which is formed by implanting impurities into the silicon substrate.

* * * * *